US 8,213,541 B2

(12) United States Patent
Nakao et al.

(10) Patent No.: US 8,213,541 B2
(45) Date of Patent: Jul. 3, 2012

(54) RECEIVING METHOD FOR RECEIVING SIGNALS BY A PLURALITY OF ANTENNAS, AND A RECEIVING APPARATUS AND A RADIO APPARATUS USING THE SAME

(75) Inventors: Seigo Nakao, Yokosuka (JP); Yoshiyuki Otani, Gifu (JP); Kiyoshige Ito, Gifu (JP)

(73) Assignee: Hera Wireless S.A., Luxembourg (LU)

( * ) Notice: Subject to any disclaimer, the term of this patent is extended or adjusted under 35 U.S.C. 154(b) by 1148 days.

(21) Appl. No.: 11/854,227

(22) Filed: Sep. 12, 2007

(65) Prior Publication Data

US 2008/0063012 A1   Mar. 13, 2008

(30) Foreign Application Priority Data

Sep. 12, 2006   (JP) ................. 2006-247292
Sep. 12, 2006   (JP) ................. 2006-247293
Oct. 18, 2006   (JP) ................. 2006-284421

(51) Int. Cl.
   *H04L 27/06*   (2006.01)
   *H04L 1/02*   (2006.01)
(52) U.S. Cl. ....................... 375/316; 375/347
(58) Field of Classification Search .......... 375/260–261, 375/267, 273, 279, 316, 320, 323, 325, 329, 375/340, 347; 370/206, 282, 295, 302, 344, 370/370, 436, 464, 478, 480, 482, 484, 500; 455/130, 132, 137, 138, 139, 237.1, 562.1
See application file for complete search history.

(56) References Cited

U.S. PATENT DOCUMENTS

| | | | |
|---|---|---|---|
| 6,680,928 B1 * | 1/2004 | Dent | 370/342 |
| 7,079,593 B2 * | 7/2006 | Nakao et al. | 375/316 |
| 7,289,834 B2 * | 10/2007 | Sun et al. | 455/575.5 |
| 7,457,366 B2 * | 11/2008 | Maltsev et al. | 375/260 |
| 7,463,673 B2 * | 12/2008 | Fujii et al. | 375/211 |
| 2004/0252667 A1 * | 12/2004 | Dent | 370/335 |

(Continued)

FOREIGN PATENT DOCUMENTS

JP   2001-285161   10/2001

(Continued)

OTHER PUBLICATIONS

Fazel, K., Narrow-band Interference Rejection in Orthogonal Multi-Carrier Spread-Spectrum Communications, 1994, Third Annual International Conference on Universal Personal Communications, pp. 46-50.*

(Continued)

*Primary Examiner* — Lawrence B Williams
(74) *Attorney, Agent, or Firm* — DC Patent Lawyers, PLLC

(57) ABSTRACT

A weight vector computing unit derives amounts of phase rotation for a plurality of multicarrier signals, respectively, and rotates the phase of a weight vector. A combining unit weights respectively a plurality of multicarrier signals with the phase-rotated weight vector, combines weighting results, and determines a combined result. A receiving weight vector computing unit remodulates the determined result and derives a first phase difference between the plurality of multicarrier signals and a result of the remodulation. The receiving weight vector computing unit remodulates the values of pilot signals and derives a second phase difference between the plurality of multicarrier signals and a result of the remodulation. Further, the receiving weight vector derives phase rotation amounts based on the first phase difference and the second phase difference.

13 Claims, 32 Drawing Sheets

U.S. PATENT DOCUMENTS

| | | | |
|---|---|---|---|
| 2006/0120487 A1* | 6/2006 | Nakao et al. | 375/334 |
| 2006/0140297 A1* | 6/2006 | Maltsev et al. | 375/260 |
| 2006/0209979 A1* | 9/2006 | Sandell et al. | 375/267 |
| 2007/0014375 A1* | 1/2007 | Nakao | 375/260 |
| 2007/0053461 A1* | 3/2007 | Nakao | 375/267 |
| 2008/0112309 A1* | 5/2008 | Hamaguchi et al. | 370/208 |
| 2008/0117997 A1* | 5/2008 | Maltsev et al. | 375/267 |
| 2008/0192857 A1* | 8/2008 | Miyoshi et al. | 375/285 |
| 2009/0147869 A1* | 6/2009 | Duan et al. | 375/260 |
| 2009/0232233 A1* | 9/2009 | Duan et al. | 375/260 |
| 2010/0008437 A1* | 1/2010 | Kent et al. | 375/260 |

FOREIGN PATENT DOCUMENTS

| | | |
|---|---|---|
| JP | 2005-102075 | 4/2005 |
| JP | 2006-165969 | 6/2006 |
| JP | 2006-191238 | 7/2006 |

OTHER PUBLICATIONS

Ihara et al., Fast Antenna-Weights Tracking Algorithm of Adaptive Antenna Array Diversity Receiver in W-CDMA Reverse Link, 2000, Vehicular Technology Conference Proceedings, 2000. VTC 2000-Spring Tokyo. 2000 IEEE 51st, vol. 2, pp. 961-965.*

Pribylov, A Trchnique for the Energy Efficiency Estimation of Wireless Local Area Network IEEE 802.11 Protocols, 2004, Electron Devices and Materials, 2004. Proceedings. 5$^{th}$ Annual. 2004 International Siberian Workshop on, pp. 87-91.*

Japanese Notification of Reason(s) for Refusal, w/ English translation thereof, issued in Japanese Patent Application No. JP 2006-247292 dated Nov. 16, 2010.

* cited by examiner

FIG.9A

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | -HT-LTF -600ns | -HT-LTF -600ns | DATA 4 -600ns |

FIG.9B

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |

FIG.9C

| L-STF | L-LTF | L-SIG | HT-SIG | HT-STF | HT-LTF | HT-LTF | DATA 1 |
|---|---|---|---|---|---|---|---|
| L-STF -50ns | L-LTF -50ns | L-SIG -50ns | HT-SIG -50ns | HT-STF -400ns | HT-LTF -400ns | -HT-LTF -400ns | DATA 2 -400ns |

FIG.19A

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | -HT-LTF -600ns | -HT-LTF -600ns | DATA 4 -600ns |

FIG.19B

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |

FIG.19C

| L-STF | L-LTF | L-SIG | HT-SIG | HT-STF | HT-LTF | HT-LTF | DATA 1 |
|---|---|---|---|---|---|---|---|
| L-STF -50ns | L-LTF -50ns | L-SIG -50ns | HT-SIG -50ns | HT-STF -400ns | HT-LTF -400ns | -HT-LTF -400ns | DATA 2 -400ns |

FIG.31A

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |
| L-STF -150ns | L-LTF -150ns | L-SIG -150ns | HT-SIG -150ns | HT-STF -600ns | HT-LTF -600ns | HT-LTF -600ns | -HT-LTF -600ns | -HT-LTF -600ns | DATA 4 -600ns |

FIG.31B

| L-STF | L-LTF | L-SIG | HT-SIG | HT-STF | HT-LTF | -HT-LTF | HT-LTF | -HT-LTF | DATA 1 |
|---|---|---|---|---|---|---|---|---|---|
| L-STF -50ns | L-LTF -50ns | L-SIG -50ns | HT-SIG -50ns | HT-STF -400ns | HT-LTF -400ns | HT-LTF -400ns | HT-LTF -400ns | HT-LTF -400ns | DATA 2 -400ns |
| L-STF -100ns | L-LTF -100ns | L-SIG -100ns | HT-SIG -100ns | HT-STF -200ns | HT-LTF -200ns | -HT-LTF -200ns | -HT-LTF -200ns | HT-LTF -200ns | DATA 3 -200ns |

FIG.31C

| L-STF | L-LTF | L-SIG | HT-SIG | HT-STF | HT-LTF | HT-LTF | DATA 1 |
|---|---|---|---|---|---|---|---|
| L-STF -50ns | L-LTF -50ns | L-SIG -50ns | HT-SIG -50ns | HT-STF -400ns | HT-LTF -400ns | -HT-LTF -400ns | DATA 2 -400ns |

RECEIVING METHOD FOR RECEIVING SIGNALS BY A PLURALITY OF ANTENNAS, AND A RECEIVING APPARATUS AND A RADIO APPARATUS USING THE SAME

CROSS-REFERENCE TO RELATED APPLICATIONS

This application is based upon and claims the benefit of priority from the prior Japanese Patent Applications No. 2006-247292, filed Sep. 12, 2006, the prior Japanese Patent Application No. 2006-247293, filed Sep. 12, 2006 and the prior Japanese Patent Application No. 2006-284421, filed Oct. 18, 2006, the entire contents of which are incorporated herein by reference.

BACKGROUND OF THE INVENTION

1. Field of the Invention

The present invention relates to a receiving technology, and it particularly relates to a receiving method for receiving signals by a plurality of antennas and a receiving apparatus and a radio apparatus using said method.

2. Description of the Related Art

In wireless communications, it is generally desired that the limited frequency resources be used effectively. One of the technologies that effectively utilize the frequency resources is adaptive array antenna technology. In the adaptive array antenna technology, the amplitude and phase of signals to be received and transmitted by a plurality of antennas are so controlled as to form directional patterns of the antennas. That is, an apparatus provided with adaptive array antennas varies respectively the amplitude and phase of signals received by a plurality of antennas and sums up a plurality of the thus varied received signals. This corresponds to receiving the signals equivalent to the signals received by the antenna having the directional pattern corresponding to a variation in said amplitude and phase (hereinafter referred to as "weight"). Also, the signals are transmitted in the directional pattern of the antenna corresponding to the weight.

One example of weight computation in the adaptive array antenna technology is a processing based on the MMSE (Minimum Mean Square Error) method. In the MMSE method, the Wiener solution is known to be a condition for an optimum weight value. Also known is a recurrence formula whose amount of calculation is smaller than directly obtaining the Wiener solution. For such a recurrence formula, adaptive algorithms, such as RLS (Recursive Least Squares) algorithm and LMS (Least Mean Squares) algorithm, are used.

In general, there is phase error called "frequency offset" between a signal oscillated by a local oscillator included in a transmitting apparatus and a signal oscillated by a local oscillator included in a receiving apparatus. For example, in a case when QPSK (Quadrature Phase Shift Keying) or the like is used as a modulation scheme preset between the transmitting apparatus and the receiving apparatus, the constellation of signals received by the receiving apparatus is rotated due to the phase error. Since such a rotation of signal points degrades the transmission quality of signals, the receiving apparatus is usually provided with an AFC (Automatic Frequency Controller) to prevent this undesired rotation.

In adaptive algorithms and the like, weights are generally computed in a known reference signal period and are combined by weighting data signals subsequent to the reference signal. However, a plurality of local oscillators are provided respectively for a plurality of antennas constituting an adaptive array. If the frequency stability of a plurality of local oscillators is low, a difference of phase error between a plurality of signal periods will be larger with time. As a result, it may well be that a plurality of signals, which can be in-phase combined in a reference signal period, will not be in-phase combined in an end of data signal. When an OFDM (Orthogonal Frequency Division Multiplex) modulation scheme is used, a combining gain drops due to such phase error and therefore the transmission quality of signals deteriorates significantly. Also, the phase error differs on a subcarrier-by-subcarrier basis due to Doppler shift or frequency selective fading. In order to reduce such phase error, the weight may be adaptively updated even after the reference signal period has elapsed. However, a method for adaptively updating the weight generally entails a rise in calculation amount, thus leading to an increase in circuit scale and a rise in circuit cost. Hereinbelow, differences in antenna-related frequency offset over a plurality of antennas are called "interantenna frequency offset error".

SUMMARY OF THE INVENTION

The present invention has been made in view of the foregoing circumstances and an advantage of the present invention is to provide a technology by which to correct phase errors contained in signals received respectively by a plurality of antennas. Another advantage of the present invention is to provide a receiving technology by which to correct the interantenna frequency offset error. Still another advantage of the present invention is to provide a receiving technology by which to correct frequency offsets contained among signals received by a plurality of antennas.

In order to resolve the above problems, a receiving apparatus according to one embodiment of the present invention comprises: a receiver which receives a plurality of multicarrier signals corresponding respectively to a plurality of antennas wherein a pilot signal is assigned to at least one subcarrier in the multicarrier signals; a derivation unit which derives amounts of phase rotation for the plurality of multicarrier signals received in the receiver, respectively; a rotation unit which rotates the phase of weight vectors to be multiplied by the plurality of multicarrier signals received in the receiver, by the amounts of phase rotation derived in the derivation unit; and a combining unit which weights respectively the plurality of multicarrier signals received in the receiver, with the weight vectors rotated by the rotation unit and which combines results of weightings. The combining unit determines the combined results, and the derivation unit includes: means for executing remodulation based on the results determined by the combining unit and a channel characteristic and deriving a first phase difference between the plurality of multicarrier signals received in the receiver and a result of the remodulation; means for executing remodulation based on a value of the pilot signal and the channel characteristic and deriving a second phase difference between the plurality of multicarrier signals received in the receiver and a result of the remodulation; and means for deriving an amount of phase rotation based on the first phase difference and the second phase difference.

According to this embodiment, the amount of phase rotation is derived based on a result where the pilot signal has been remodulated and a result where an array-synthesized result is remodulated. Hence, the accuracy of a phase rotation amount can be improved and the accuracy of correcting the phase error can be enhanced.

The multicarrier signal received by the receiver may be formed of a plurality of streams; the derivation unit may derive a common phase rotation amount over the streams; the weight vectors to be rotated in the rotation unit may correspond respectively to the plurality of streams; and the combining unit may perform weighting, combining and decision on the plurality of streams, respectively. In such a case, the processing according to the number of streams is performed and thus a plurality of streams can be dealt with.

The derivation unit may derive the first phase difference by associating respectively with the plurality of subcarriers and derive the second phase difference by expanding a phase difference in a subcarrier to which the pilot signal is assigned, to the plurality of subcarriers. In such a case, two phase differences having different properties are derived, so that the phase errors whose occurrence causes differ can be corrected.

The derivation unit may derive the phase rotation amount, based on the second phase difference derived in a predetermined symbol and the first phase difference derived in a symbol before the symbol from which the second phase difference has been derived. In such a case, the derivation timing for two phase difference may differ, so that two phase differences can be derived by using different derivation methods.

Another embodiment of the present invention relates to a radio apparatus. This apparatus comprises: a plurality of antennas; a receiver which receives a plurality of multicarrier signals corresponding respectively to a plurality of antennas wherein a pilot signal is assigned to at least one subcarrier in the multicarrier signals; a derivation unit which derives amounts of phase rotation for the plurality of multicarrier signals received in the receiver, respectively; a rotation unit which rotates the phase of weight vectors to be multiplied by the plurality of multicarrier signals received in the receiver, by the amounts of phase rotation derived in the derivation unit; and a combining unit which weights respectively the plurality of multicarrier signals received in the receiver, with the weight vectors rotated by the rotation unit and which combines results of weighting. The combining unit determines the combined results, and the derivation unit includes: means for executing remodulation based on the results determined by the combining unit and a channel characteristic and deriving a first phase difference between the plurality of multicarrier signals received in the receiver and a result of the remodulation; means for executing remodulation based on a value of the pilot signal and the channel characteristic and deriving a second phase difference between the plurality of multicarrier signals received in the receiver and a result of the remodulation; and means for deriving an amount of phase rotation based on the first phase difference and the second phase difference.

According to this embodiment, the phase rotation amounts are derived based on the result obtained after the pilot signals have been remodulated and that after the array-synthesized result has been remodulated. Hence, the accuracy of phase rotation amounts can be enhanced and the correction accuracy of phase error can be enhanced.

Still another embodiment of the present invention relates to a receiving method. This method comprises: receiving a plurality of multicarrier signals corresponding respectively to a plurality of antennas wherein a pilot signal is assigned to at least one subcarrier in the multicarrier signals; deriving amounts of phase rotation for the received plurality of multicarrier signals, respectively; rotating the phase of weight vectors to be multiplied by the received plurality of multicarrier signals, by the amounts of phase rotation derived in the deriving; and weighting respectively the received plurality of multicarrier signals with the weight vectors rotated by the rotating and combining results of weighting. The combining determines the combined results, and the deriving includes: executing remodulation based on the determined results and a channel characteristic and deriving a first phase difference between the received plurality of multicarrier and a result of the remodulation; executing remodulation based on a value of the pilot signal and the channel characteristic and deriving a second phase difference between the received plurality of multicarrier signals and a result of the remodulation; and deriving an amount of phase rotation based on the first phase difference and the second phase difference.

The multicarrier signal received in the receiving may be formed by a plurality of streams; the deriving may derive a common phase rotation amount over the streams; the weight vectors to be rotated in the rotating may correspond respectively to the plurality of streams; and the combining may perform weighting, combining and decision on the plurality of streams, respectively.

The deriving may derive the first phase difference by associating respectively with the plurality of subcarriers and derive the second phase difference by expanding a phase difference in a subcarrier to which the pilot signal is assigned, to the plurality of subcarriers. The deriving may derive the phase rotation amount, based on the second phase difference derived in a predetermined symbol and the first phase difference derived in a symbol before the symbol from which the second phase difference has been derived.

In order to resolve the above problems, a receiving apparatus according to one embodiment of the present invention comprises: a receiver which receives a plurality of multicarrier signals corresponding respectively to a plurality of antennas wherein a pilot signal is contained in a predetermined subcarrier in the multicarrier signals; a derivation unit which derives, per antenna, amounts of phase rotation for the plurality of multicarrier signals, by using the pilot signal contained in the multicarrier signals received in the receiver; a rotation unit which rotates the phase of weight vectors per subcarrier according to the phase rotation amounts, by associating the phase rotation amounts derived by the derivation unit per antenna with the weight vectors which are to be multiplied per subcarrier by the multicarrier signals received in the receiver, the weight vectors being formed by components corresponding respectively to the plurality of antennas; and a combining unit which weights per antenna and per subcarrier the plurality of multicarrier signals received in the receiver, with the weight vectors rotated by the rotation unit per subcarrier and which combines results of weighting per subcarrier. The pilot signal contained in the multicarrier signals received in the receiver is formed by repeating a predetermined pattern, and the derivation unit derives per antenna the phase rotation amounts by use of the repeated pattern.

"Combining" may indicate that only the phases of a plurality of signals are combined or the phases and amplitudes thereof are combined. According to this embodiment, the phase rotation amounts are derived by use of the pilot signals which are formed by repeating a predetermined pattern. Thus, the interantenna frequency offset error can be corrected without relying on the derivation of weight vectors.

The multicarrier signal received in the receiver may be formed by a plurality of streams; the weight vector which is to be phase-rotated in the rotation unit per subcarrier may be formed by components corresponding respectively to the plurality of streams; the combining unit may perform the weighting per antenna, per subcarrier and per stream and performs the combining per subcarrier and per stream; and the derivation unit may derive phase rotation amounts for the multicarrier signals per antenna, regardless of the number of streams. In such a case, although the multicarrier signal is formed by a plurality of streams, the phase rotation amounts can be derived without relying on the derivation of weight vectors.

Hence, the phase rotation amounts can be derived before the separation of a plurality of streams.

Still another embodiment of the present invention relates also to a receiving apparatus. This apparatus comprises: a receiver which receives a plurality of multicarrier signals, formed by a plurality of streams, corresponding respectively to a plurality of antennas wherein a pilot signal is contained in a predetermined subcarrier in the multicarrier signals; a derivation unit which derives, per antenna, amounts of phase rotation for the plurality of multicarrier signals, by using the pilot signal contained in the multicarrier signals received in the receiver; a rotation unit which rotates the phase of the multicarrier signals according to the phase rotation amounts, by associating the phase rotation amounts derived by the derivation unit per antenna with the multicarrier signals received in the receiver; and a combining unit which weights per antenna, per subcarrier and per stream the multicarrier signals which have been phase-rotated by the rotation unit, with a weight vector per subcarrier formed by components corresponding respectively to the plurality of antennas and the plurality of streams and which combines results of weighting per subcarrier and per stream. The pilot signal contained in the multicarrier signals received in the receiver is formed by repeating a predetermined pattern, and regardless of the number of streams the derivation unit derives per antenna the phase rotation amounts by use of the repeated patterns.

According to this embodiment, the phase rotation amounts are derived by use of the pilot signal which is formed by repeating a predetermined pattern. Thus, the interantenna frequency offset error can be corrected before separating a plurality of streams by the weight vector.

The derivation unit may include: means for classifying one of the rotation amounts per antenna as a reference amount and classifying the remaining rotation amounts per antenna as amounts to be processed; and means for outputting error between the amount to be processed and the reference amount as a per-antenna phase rotation amount. The rotation unit may rotate the phase of an antenna which has been classified, as the amount to be processed, by the derivation unit. In such a case, the interantenna frequency offset error can be corrected in such a manner as to maintain a phase relation among signals corresponding respectively to a plurality of antennas.

Still another embodiment of the present invention relates to a radio apparatus. This apparatus comprises: a plurality of antennas; a receiver which receives a plurality of multicarrier signals, which contain a pilot signal in a predetermined subcarrier, corresponding respectively to the plurality of antennas; a derivation unit which derives, per antenna, amounts of phase rotation for the plurality of multicarrier signals, by using the pilot signal contained in the multicarrier signals received in the receiver; a rotation unit which rotates the phase of a weight vector per subcarrier according to the phase rotation amounts, by associating the phase rotation amounts derived by the derivation unit per antenna with a per-subcarrier weight vector which is to be multiplied by the multicarrier signals received in the receiver and which is formed by components corresponding respectively to the plurality of antennas; and a combining unit which weights per antenna and per subcarrier the multicarrier signals received in the receiver with the weight vector which has been phase-rotated by the rotation unit per subcarrier and which combines results of weighting per subcarrier. The pilot signal contained in the multicarrier signals received in the receiver is formed by repeating a predetermined pattern, and the derivation unit derives per antenna the phase rotation amounts by use of the repeated patterns.

According to this embodiment, the phase rotation amounts are derived by use of pilots signals formed by repeating a predetermined pattern. Thus, the interantenna frequency offset error can be corrected without relying on the derivation of weight vectors.

Still another embodiment of the present invention relates to a receiving method. This method comprises: receiving a plurality of multicarrier signals, which contain a pilot signal in a predetermined subcarrier, corresponding respectively to a plurality of antennas; deriving, per antenna, amounts of phase rotation for the plurality of multicarrier signals, by using the pilot signal contained in the received multicarrier signals; rotating the phase of a weight vector per subcarrier according to the phase rotation amounts, by associating the phase rotation amounts derived per antenna with a per-subcarrier weight vector which is to be multiplied by the received multicarrier signals and which is formed by components corresponding respectively to the plurality of antennas; and weighting per antenna and per subcarrier the received multicarrier signals with the weight vector which has been phase-rotated per subcarrier and combining results of weighting per subcarrier. The pilot signal contained in the multicarrier signals received in the receiving is formed by repeating a predetermined pattern, and the deriving derives per antenna the phase rotation amounts by use of the repeated patterns.

The multicarrier signal received in the receiving may be formed by a plurality of streams; a per-subcarrier weight vector which is to be rotated in the rotating may be formed by components corresponding respectively to a plurality of streams; in the combining, the weighting may be executed per antenna, per subcarrier and per stream and the combining may be executed per subcarrier and per stream; and the deriving may derive the amounts of rotation for the multicarrier signals, regardless of the number of streams.

Still another embodiment of the present invention relates also to a receiving method. This method comprises: receiving a plurality of multicarrier signals, formed by a plurality of streams, corresponding respectively to a plurality of antennas wherein a pilot signal is contained in a predetermined subcarrier in the multicarrier signals; deriving, per antenna, amounts of phase rotation for the plurality of multicarrier signals, by using the pilot signal contained in the received multicarrier signals received; rotating the phase of the multicarrier signals according to the phase rotation amounts, by associating the phase rotation amounts derived per antenna with the multicarrier signals received in the receiver; and weighting per antenna, per subcarrier and per stream the multicarrier signals which have been phase-rotated in the rotating, with a weight vector per subcarrier formed by components corresponding respectively to the plurality of antennas and the plurality of streams and combining results of weighting per subcarrier and per stream. The pilot signal contained in the multicarrier signals received in the receiving is formed by repeating a predetermined pattern, and regardless of the number of streams the deriving derives per antenna the phase rotation amounts by use of the repeated patterns.

The deriving may be such that one of the rotation amounts per antenna is classified as a reference amount, the remaining rotation amounts per antenna are classified as amounts to be processed and error between the amount to be processed and the reference amount is outputted to the rotating as a per-antenna phase rotation amount; and the rotating may rotate the phase of an antenna which has been classified, as the amount to be processed, by the deriving.

In order to resolve the above problems, a receiving apparatus according to one embodiment of the present invention comprises: a receiver which receives signals corresponding respectively to a plurality of antennas; a derivation unit which derives, per antenna, amounts of phase rotation for the signals received in the receiver; a rotation unit which rotates the phase of a weight vector according to the phase rotation amounts by associating, per antenna, the phase rotation amounts derived by the derivation unit per antenna with a per-subcarrier weight vector which is to be multiplied by the signals received in the receiver and which is formed by components corresponding respectively to the plurality of antennas; and a combining unit which weights per antenna the signals received in the receiver with the weight vector which has been phase-rotated by the rotation unit and which combines results of weighting. The combining unit determines a combined result; and the derivation unit executes remodulation per antenna based on the result determined by the combining unit and a channel characteristic per antenna, and derives per antenna the phase rotation amount by deriving per antenna a phase difference between the signals received in the receiver and a result of the remodulation.

According to this embodiment, the remodulation is performed on the result of array synthesis and the phase rotation amount is derived by taking the remodulated result as a reference signal. Thus, the accuracy of the phase rotation amount can be improved and the accuracy of correcting the frequency offset can be improved.

Another embodiment of the present invention relates also to a receiving apparatus. This apparatus comprises: a receiver which receives multicarrier signals corresponding respectively to a plurality of antennas; a derivation unit which derives, per antenna, amounts of phase rotation for the multicarrier signals received in the receiver; a rotation unit which rotates the phase of a weight vector per subcarrier according to the phase rotation amounts by associating, per antenna, the phase rotation amounts derived by the derivation unit per antenna with a per-subcarrier weight vector which is to be multiplied by the multicarrier signals received in the receiver and which is formed by components corresponding respectively to the plurality of antennas; and a combining unit which weights per antenna and per subcarrier the multicarrier signals received in the receiver with the weight vector which has been phase-rotated by the rotation unit per subcarrier and which combines results of weighting per subcarrier. The combining unit determines a combined result per subcarrier; and the derivation unit executes remodulation per antenna by associating, per subcarrier, the result determined per subcarrier by the combining unit and a channel characteristic per antenna and per subcarrier, and derives per antenna the phase rotation amount by deriving per antenna a phase difference between the multicarrier signals received in the receiver and a result of the remodulation.

According to this embodiment, the remodulation is performed on the result of array synthesis and the phase rotation amount is derived by taking the remodulated result as a reference signal. Thus, the accuracy of the phase rotation amount can be improved and the accuracy of correcting the frequency offset can be improved.

The multicarrier signal received in the receiver may be formed by a plurality of streams; the weight vector which is to be phase-rotated in the rotation unit per subcarrier may be formed by components corresponding respectively to the plurality of streams; wherein the combining unit may perform the weighting per antenna, per subcarrier and per stream and make a decision per subcarrier and per stream; and the derivation unit may execute remodulation according to the number of streams, and derive the phase rotation amounts for the multicarrier signals per antenna, regardless of the number of streams. In such a case, the processing according to the number of streams is performed and thus a plurality of streams can be dealt with. And since the phase rotation amounts per antenna is derived regardless of the number of streams, the effect of noise on the phase rotation amounts can be reduced.

Still another embodiment of the present invention relates also to a receiving apparatus. This apparatus comprises: a receiver which receives signals corresponding respectively to a plurality of antennas: a derivation unit which derives, per antenna, amounts of phase rotation for the signals received in the receiver; a rotation unit which rotates the phase of the signals according to the phase rotation amounts by associating, per antenna, the phase rotation amounts derived by the derivation unit per antenna with the signals received in the receiver; and a combining unit which weights per antenna the signals which have been phase-rotate by the rotation unit with a weight vector formed by components corresponding respectively to the plurality of antennas and which combines results of weighting. The combining unit determines a combined result; and the derivation unit executes remodulation per antenna based on the result determined by the combining unit and a channel characteristic per antenna, and derives per antenna the phase rotation amount by deriving per antenna a phase difference between the signals received in the receiver and a result of the remodulation.

According to this embodiment, the remodulation is performed on the result of array synthesis and the phase rotation amount is derived by taking the remodulated result as a reference signal. Thus, the accuracy of the phase rotation amount can be improved and the accuracy of correcting the frequency offset can be improved.

The derivation unit may include: means for classifying one of the rotation amounts per antenna as a reference amount and classifying the remaining rotation amounts as amounts to be processed; and means for outputting error between the amount to be processed and the reference amount as a per-antenna phase rotation amount. The rotation unit may rotate the phase of an antenna which has been classified, as the amount to be processed, by the derivation unit. In such a case, the frequency offset error can be corrected in such a manner as to maintain a phase relation among signals corresponding respectively to a plurality of antennas.

Still another embodiment of the present invention relates to a radio apparatus. This apparatus comprises: a plurality of antennas; a receiver which receives signals corresponding respectively to the plurality of antennas; a derivation unit which derives, per antenna, amounts of phase rotation for the signals received in the receiver; a rotation unit which rotates the phase of a weight vector per subcarrier according to the phase rotation amounts by associating, per antenna, the phase rotation amounts derived by the derivation unit per antenna with a weight vector which is to be multiplied by the signals received in the receiver and which is formed by components corresponding respectively to the plurality of antennas; and a combining unit which weights per antenna the signals received in the receiver with the weight vector which has been phase-rotated by the rotation unit and which combines results of weighting. The combining unit determines a combined result; and the derivation unit executes remodulation per antenna based on the result determined by the combining unit and a channel characteristic per antenna, and derives per antenna the phase rotation amount by deriving per antenna a phase difference between the signals received in the receiver and a result of the remodulation.

Still another embodiment of the present invention relates to a receiving method. This method comprises: receiving signals corresponding respectively to a plurality of antennas; deriving, per antenna, amounts of phase rotation for the received signals; rotating the phase of a weight vector per subcarrier according to the phase rotation amounts by associating, per antenna, the phase rotation amounts derived per antenna with a weight vector which is to be multiplied by the received signals and which is formed by components corresponding respectively to the plurality of antennas; and weighting per antenna the received signals with the weight vector which has been phase-rotated in the rotating and combining results of weighting. The combining determines a combined result; and the deriving executes remodulation per antenna based on the determined result and a channel characteristic per antenna, and derives per antenna the phase rotation amount by deriving per antenna a phase difference between the received signals received and a result of the remodulation.

Still another embodiment of the present invention relates also to a receiving method. This method comprises: receiving multicarrier signals corresponding respectively to a plurality of antennas; deriving, per antenna, amounts of phase rotation for the received multicarrier signals; rotating the phase of a weight vector per subcarrier according to the phase rotation amounts by associating, per antenna, the derived phase rotation amounts per antenna with a per-subcarrier weight vector which is to be multiplied by the received multicarrier signals and which is formed by components corresponding respectively to the plurality of antennas; and weighting per antenna and per subcarrier the received multicarrier signals with the weight vector which has been phase-rotated by said rotating per subcarrier and combining results of weighting per subcarrier. The combining determines a combined result per subcarrier, and the deriving executes remodulation per antenna by associating, per subcarrier, the result determined per subcarrier and a channel characteristic per antenna and per subcarrier, and derives per antenna the phase rotation amount by deriving per antenna a phase difference between the received multicarrier signals received and a result of the remodulation.

The multicarrier signal received in the receiving may be formed by a plurality of streams; the weight vector which is to be phase-rotated in the rotating per subcarrier may be formed by components corresponding respectively to the plurality of streams; the combining may perform the weighting per antenna, per subcarrier and per stream and make a decision per subcarrier and per stream; and the deriving may execute remodulation according to the number of streams, and derive the phase rotation amounts for the multicarrier signals per antenna, regardless of the number of streams.

Still another embodiment of the present invention relates also to a receiving method. This method comprises: receiving signals corresponding respectively to a plurality of antennas; deriving, per antenna, amounts of phase rotation for the received signals; rotating the phase of the signals according to the phase rotation amounts by associating, per antenna, the phase rotation amounts derived by said deriving per antenna with the received signals; and weighting per antenna the signals which have been phase-rotate by the rotating with a weight vector formed by components corresponding respectively to the plurality of antennas and combining results of weighting. The combining determines a combined result; and the deriving executes remodulation per antenna based on the determined result and a channel characteristic per antenna, and derive per antenna the phase rotation amount by deriving per antenna a phase difference between the received signals and a result of the remodulation.

The deriving may be such that one of the rotation amounts per antenna is classified as a reference amount, the remaining rotation amounts per antenna are classified as amounts to be processed, and error between the amount to be processed and the reference amount is outputted to the rotating as a per-antenna phase rotation amount; and the rotating may rotate the phase of an antenna which has been classified as the amount to be processed.

It is to be noted that any arbitrary combination of the aforementioned constituting elements, and the implementation of the present invention in the form of a method, an apparatus, a system, a recording medium, a computer program and so forth may also be effective as and encompassed by the embodiments of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 9A to 9C illustrate formats of packet signals according to a modification of an exemplary embodiment;

FIGS. 19A to 19C illustrate formats of packet signal according to a modification of an exemplary embodiment;

FIGS. 31A to 31C illustrate packet formats according to another modification of an exemplary embodiment;

DETAILED DESCRIPTION OF THE INVENTION

Figure 1:
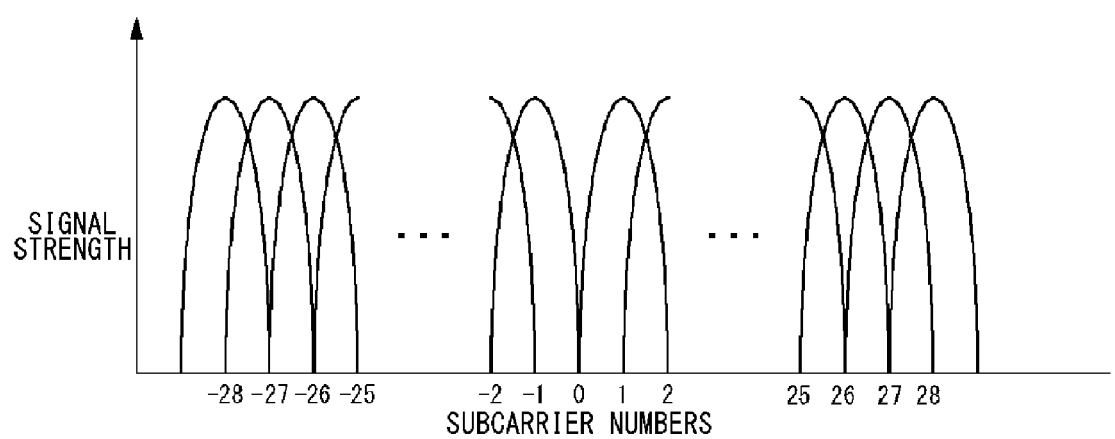
FIG. 1 illustrates a spectrum of a multicarrier signal according to an exemplary embodiment of the present invention.

The invention will now be described by reference to the preferred embodiments. This does not intend to limit the scope of the present invention, but to exemplify the invention.

Before describing the present invention in detail, an outline of the present invention will be described first. An exemplary embodiment of the present invention relates to a communication system, such as a wireless LAN (Local Area Network), comprised of a base station apparatus and a terminal apparatus. In the communication system, an OFDM modulation scheme is used. The base station apparatus according to the exemplary embodiment of the present invention is comprised of a plurality of antennas and local oscillators corresponding respectively to the plurality of antennas. The base station apparatus receives multicarrier signals received from a terminal apparatus to be communicated with, by a plurality of antennas, and the thus received multicarrier signals are subjected to quadrature detection by the local oscillator. Further, the base station apparatus computes weight factors from a plurality of quadrature-detected multicarrier signals, for each antenna and for each carrier. Hereinafter, a generic term for the thus computed weight factors or a set of weight factors in units of carrier is called "receiving weight vector" but no clear distinction will be made therebetween.

The base station apparatus performs an adaptive array signal processing on the received multicarrier signals by using the computed receiving weight vectors. Multicarrier signals from the terminal apparatus constitute a packet signal, and a known signal (also called "training signal") is assigned to a header portion of the packet signal. Subsequence to this training signal, a data signal is assigned. In a period where the training signal is contained in the received packet signal, the base station apparatus computes a receiving weight vector. The stability of frequency in a plurality of local oscillators is not high. Thus the respective frequencies are considered to have deviated from one another. As a result thereof, in a data signal period, a phase error difference is caused among a plurality of received signals. Also, the received multicarrier signals suffer the influence of Doppler shift or frequency selective fading.

In a training signal period, the base station apparatus according to an embodiment of the present invention derives channel characteristics from the received multicarrier signal and derives a receiving weight vector from the thus derived channel characteristics. After the completion of the training signal period, the base station apparatus extracts a pilot signal from the received multicarrier signal and derives, for each of the antennas, phase error common to a plurality of subcarriers, based on the thus extracted pilot signal. Using the receiving weight vector which is phase-rotated in response to the thus derived phase error, the base station apparatus weights the received multicarrier signals and thereby performs array synthesis thereon. The base station apparatus determines the array combined signal and remodulates the determined signal by the channel characteristics. Based on the received multicarrier signal and remodulated signal, the base station apparatus derives the phase error on a subcarrier-by-subcarrier basis and for each of the antennas. The base station apparatus further rotates the phase of the receiving weight vector in response to the phase error.

FIG. 1 illustrates a spectrum of a multicarrier signal according to an exemplary embodiment of the present invention. In particular, FIG. 1 shows a spectrum of a signal in the OFDM modulation scheme. One of a plurality of carriers in an OFDM modulation scheme is generally called a subcarrier. Herein, each subcarrier is designated by a "subcarrier number". For example, in a communication system complying with the IEEE802.11n standard (such a communication system as this will be hereinafter referred to as "MIMO system"), 56 subcarriers, namely, subcarrier numbers "−28" to "28" are defined. It is to be noted that the subcarrier number "0" is set to null so as to reduce the effect of a direct current component in a baseband signal. On the other hand, 52 subcarriers, namely, subcarrier numbers "−26" to "26" are defined in a communication system which is not compatible with a MIMO (such a communication system as this will be hereinafter referred to as a "legacy system"). One example of legacy systems is a wireless LAN complying with the IEEE802.11a standard.

The unit of each signal composed of a plurality of subcarriers, which is also the unit of each signal in the time domain, will be called "OFDM symbol". The respective subcarriers are modulated by a modulation scheme which is set variably. Used here is any of modulation schemes among BPSK (Binary Phase-Shift Keying), QPSK (Quadrature Phase-Shift Keying), 16-QAM (Quadrature Amplitude Modulation) and 64-QAM. Here, pilot signals are assigned to four subcarriers whose subcarrier numbers are "21", "−7", "7" and "21". The pilot signal assigned to a subcarrier has a pattern such that the pattern has the identical value every four OFDM symbols.

Figure 2:
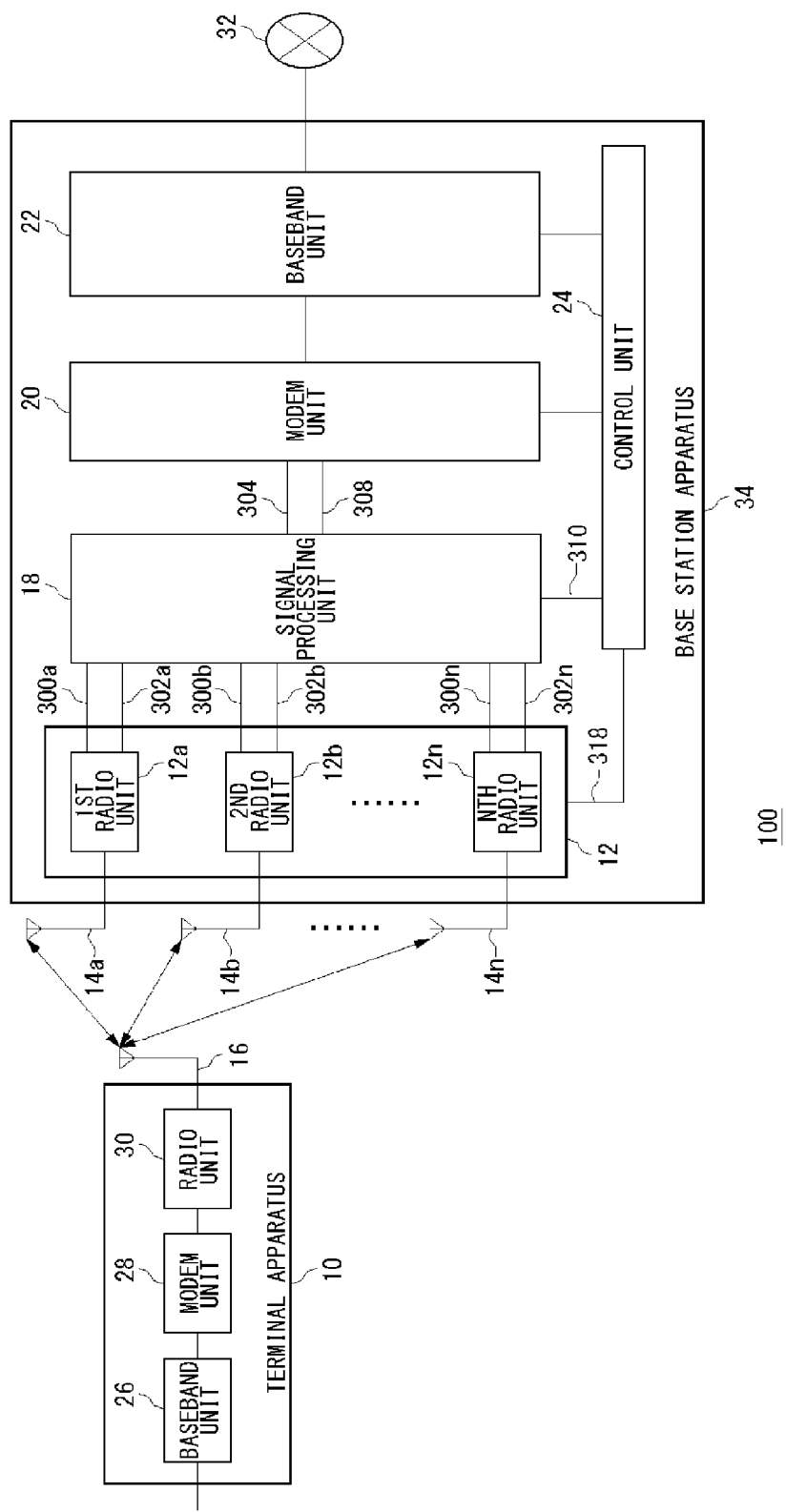
FIG. 2 illustrates a structure of a communication system according to an exemplary embodiment of the present invention.

FIG. 2 illustrates a structure of a communication system 100 according to an embodiment of the present invention. The communication system 100 includes a terminal apparatus 10, a base station apparatus 34, and a network 32. The terminal apparatus 10 includes a baseband unit 26, a modem unit 28, a radio unit 30, and an antenna 16 for use with the terminal (hereinafter referred to as "terminal antenna 16" also). The base station apparatus 34 includes a first basestation antenna 14a, a second basestation antenna 14b, . . . and an Nth basestation antenna 14n, which are generically called "antenna 14 for use with base station apparatus" or "basestation antenna 14", a first radio unit 12a, a second radio unit 12b, . . . and an Nth radio unit 12n, which are generically called "radio unit 12", a signal processing unit 18, a modem unit 20, a baseband unit 22 and a control unit 24. Signals involved include a first digital received signal 300a, a second digital received signal 300b, . . . and an Nth digital received signal 300n, which are generically called "digital received signal 300", a first digital transmitted signal 302a, a second digital transmitted signal 302b, . . . and an Nth digital transmitted signal 302n, which are generically called "digital transmitted signal 302", a composite signal 304, a pre-separation signal 308, a signal processor control signal 310 and a radio-unit control signal 318.

The terminal apparatus 10 is connected to the base station apparatus 34, and performs communications with the base station apparatus 34. The baseband unit 26 is an interface with a PC connected to the terminal apparatus 10 or with an application inside the terminal apparatus 10, and performs receive/transmit processing of information signals which are to be transmitted in the communication system 100. Error correction or automatic retransmission processing may also be carried out, but the description of such processings is omitted here. As a transmission processing, the modem unit 28 executes mapping to the above-described BPSK or the like, IFFT (Inverse Fast Fourier Transform) and quadrature modulation so as to generate a transmission signal.

On the other hand, the modem unit 28 performs quadrature detection, FFT and demodulation as a receiving processing and thereby reproduces the information signals transmitted from the base station apparatus 34. Here, a signal outputted from the modem unit 28 in the transmission processing and a signal inputted to the modem unit 28 in the receiving processing constitute multicarrier signals as in an OFDM signal. The multicarrier signals constitute a packet signal. The radio unit 30 performs frequency conversion processing. The radio unit 30 also performs amplifying processing and A-D or D-A conversion processing. The radio unit 30 receives and transmits radiofrequency signals (hereinafter referred to "RF signals" also) from and to the base station apparatus 34 via the terminal antenna 16.

There are provided a plurality of basestation antennas 14. Here, assume that the number of basestation antennas 14 is N. As a receiving operation, the radio unit 12 carries out frequency conversion of the radiofrequency multicarrier signals so as to derive baseband signals. As described above, the multicarrier signals constitute a packet signal, and training signals are contained contiguously in the header portion of the packet signal. Also, in the multicarrier signal, a pilot signal is contained in a predetermined subcarrier. The pilot signal is formed by repeating a predetermined pattern. Here, each of a plurality of multicarrier signals correspond to any of a plurality of basestation antennas 14. Local oscillators corresponding respectively to a plurality of basestation antennas 14 are contained in a plurality of radio units 12. The radio unit 12 performs frequency conversion on each of a plurality of multicarrier signals by a local signal outputted from the local oscillator.

The radio unit 12 outputs the baseband signals to the signal processing unit 18 as the digital received signals 300. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included.

As a transmission operation, the radio unit 12 carries out frequency conversion of baseband signals from the signal processing unit 18 so as to derive radiofrequency signals. Here, the baseband signal from the signal processing unit 18 is indicated as the digital transmitted signals 302. The radio unit 12 outputs the radiofrequency signals to the basestation antennas 14. A PA (Power Amplifier) and a D-A conversion unit are also included in the radio unit 12. The digital transmitted signal 302 is s a multicarrier signal converted to the time domain and is a digital signal.

As a receiving operation, the signal processing unit 18 converts a plurality of digital received signals 300 into those in the frequency domain and performs adaptive array signal processing on the frequency-domain signals. The signal processing unit 18 outputs a result of the adaptive array signal processing as a composite signal 304. As a transmission operation, the signal processing unit 18 inputs from the modem unit 20 the pre-separation signal 308 which is a signal in the frequency domain, converts frequency-domain signals into time-domain signals, and outputs them as the digital transmitted signals 302 by associating them with a plurality of basestation antennas 14, respectively. It is assumed herein that the composite signal 304 and the pre-separation signal 308, which are signals in the frequency domain, each contains a plurality of subcarrier components as shown in FIG. 1. For the clarity of figure, the frequency-domain signal is arranged in the order of the subcarrier numbers, and forms serial signals.

Figure 3:
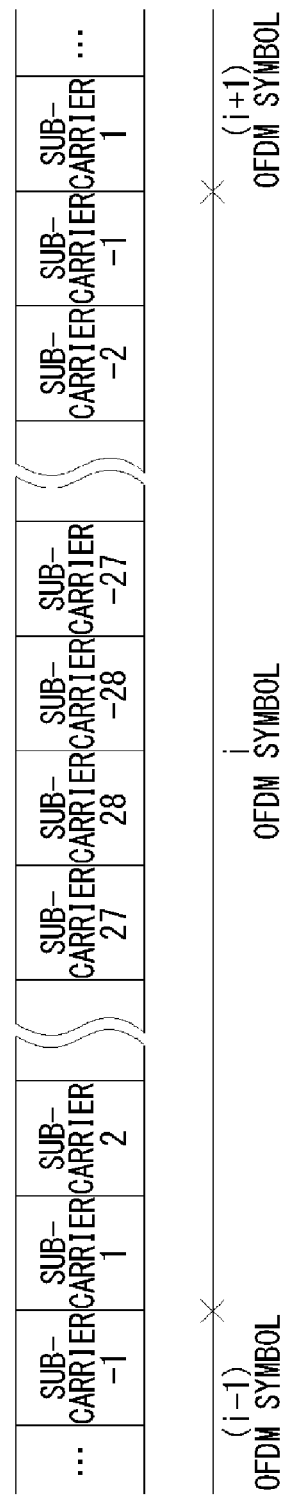
FIG. 3 illustrates a structure of a frequency-domain signal in FIG. 2.

FIG. 3 illustrates a structure of a frequency-domain signal. Assume herein that a combination of subcarrier numbers "−28" to "28" shown in FIG. 1 constitutes a so-called "OFDM symbol". Note that the unit of each frequency-domain signal is also called "OFDM symbol" here. An "i"th OFDM symbol is such that subcarriers components are arranged in the order of subcarrier numbers "1" to "28" and subcarrier numbers "−28" to "−1". Assume also that an "(i−1)"th OFDM symbol is placed before the "i"th OFDM symbol, and an "(i+1)"th OFDM symbol is placed after the "i"th OFDM symbol. Note that, in a legacy system, a combination of the subcarrier numbers "−26" to "26" is used for each "OFDM symbol". Now refer back to FIG. 2.

A further detail on the receiving processing in the signal processing unit 18 is now described. The signal processing unit 18 derives receiving weight vectors 300 for a plurality of digital received signals 300, over a training signal period of a packet signal. A receiving weight vector is derived based on a channel characteristic. The channel characteristic includes a signal loss (attenuation) and an amount of phase rotation in a channel between the terminal antenna 16 and the basestation antenna 14. Accordingly, the channel characteristic has components corresponding to the number of combinations of the terminal antenna 16 and the basestation antenna 14 and a result obtained after having multiplied by the subcarrier numbers. For example, in the case of FIG. 2, there are a single terminal antenna 16 and N basestation antennas 14 and therefore the channel characteristic for each subcarrier contains N components.

The receiving weight vector derived from the channel characteristic also has the same number of components as that of channel characteristics. That is, a receiving weight vector corresponding to a subcarrier has components corresponding respectively to the basestation antennas 14. Hereinbelow, the receiving weight vector corresponding to a subcarrier will be called "receiving weight vector for each of the basestastion antennas 14" and in other occasions the term "basestation antenna 14 unit" or the like will also be used under the same meaning. After the completion of a training signal period, the signal processing unit 18 performs (1) correction of phase error by a feedforward control and (2) correction of phase error by a feedback control for the purpose of correcting the phase error in the receiving weight vector. In (1), the correction is performed using different rotation amounts in the basestation antenna 14 unit. In (2), the correction is performed using different rotation amounts on a subcarrier-by-subcarrier basis in addition to in the basestation antenna 14 unit.

(1) Phase Error Correction by Feedforward Control

The signal processing unit 18 extracts a pilot signal from the digital received signal 300. The signal processing unit 18 generates a replica signal from the values of pilot signals stored in advance and the channel characteristics, and derives phase error between the generated replica signal and the extracted pilot signal. The signal processing unit 18 derives an amount of phase rotation from the derived phase error. Here, the amount of phase rotation is derived in the basestation antenna 14 unit (for each of the basestation antennas 14) so that the amount of phase rotation has a common value for one basestation antenna 14. That is, the amount of phase rotation is derived in a manner that the phase error derived in units of pilot signal is so extended to have a common value for all of subcarriers. Hereinafter this phase rotation amount will be referred to as "common phase rotation amount" also. Further, the signal processing unit 18 rotates the receiving weight vector by the common rotation amount.

(2) Phase Error Correction by Feedback Control

The signal processing 18 weights the digital received signal 300 with the rotated receiving weight vector, and combines the weighting result. That is, array synthesis is carried out. Here, the weighting is performed by associating the basestation antennas 14 and the subcarriers, respectively, and the combining is performed on a result of a plurality of weightings corresponding respectively to the basestation antennas 14, on a subcarrier-by-subcarrier basis. Finally, the signal processing unit 18 outputs the combined result as a composite signal 304. The signal processing unit 18 determines the composite signal 304 for each subcarrier. The signal processing unit 18 executes remodulation by associating a decision result per subcarrier and the channel characteristic with each subcarrier.

That is, the remodulation result has components the number of which corresponds to that of a multiplication result of the basestation antennas 14 and the subcarriers. The signal processing unit 18 derives a phase rotation amount (hereinafter referred to as "individual phase rotation amount") by deriving the phase error between the digital received signal 300 and the remodulation result. The individual phase rotation amount has components the number of which corresponds to that of the multiplication result of the basestation antennas 14 and the subcarrier. When the individual phase rotation amount is derived, the signal processing unit 18 derives the phase rotation amount in consideration of individual phase rotation amounts in addition to the common phase rotation amount, and rotates the phase of the receiving weight vector by the derived phase rotation amount. As described above, the signal processing unit 18 performs array synthesis by the phase-rotated weight vector. Note that the control of (1) and the control (2) are performed for each OFDM symbol.

As a receiving processing, the modem unit 20 executes demodulation and deinterleaving. The demodulation is carried out per subcarrier. The modem unit 20 outputs the demodulated signal to the baseband unit 22. As a transmission processing, the modem unit 20 carries out interleaving and modulation. The modem unit 20 outputs the modulated signal to the signal processing unit 18 as a pre-separation signal 308. When the transmission processing is carried out, the modulation scheme is specified by the control unit 24. The baseband unit 22 serves as an interface between the signals to be processed in the base station apparatus 34 and the network 32. The control unit 24 controls the timing and the like of the base station apparatus 34.

In terms of hardware, this structure can be realized by a CPU, a memory of an arbitrary computer and other LSIs. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 4:
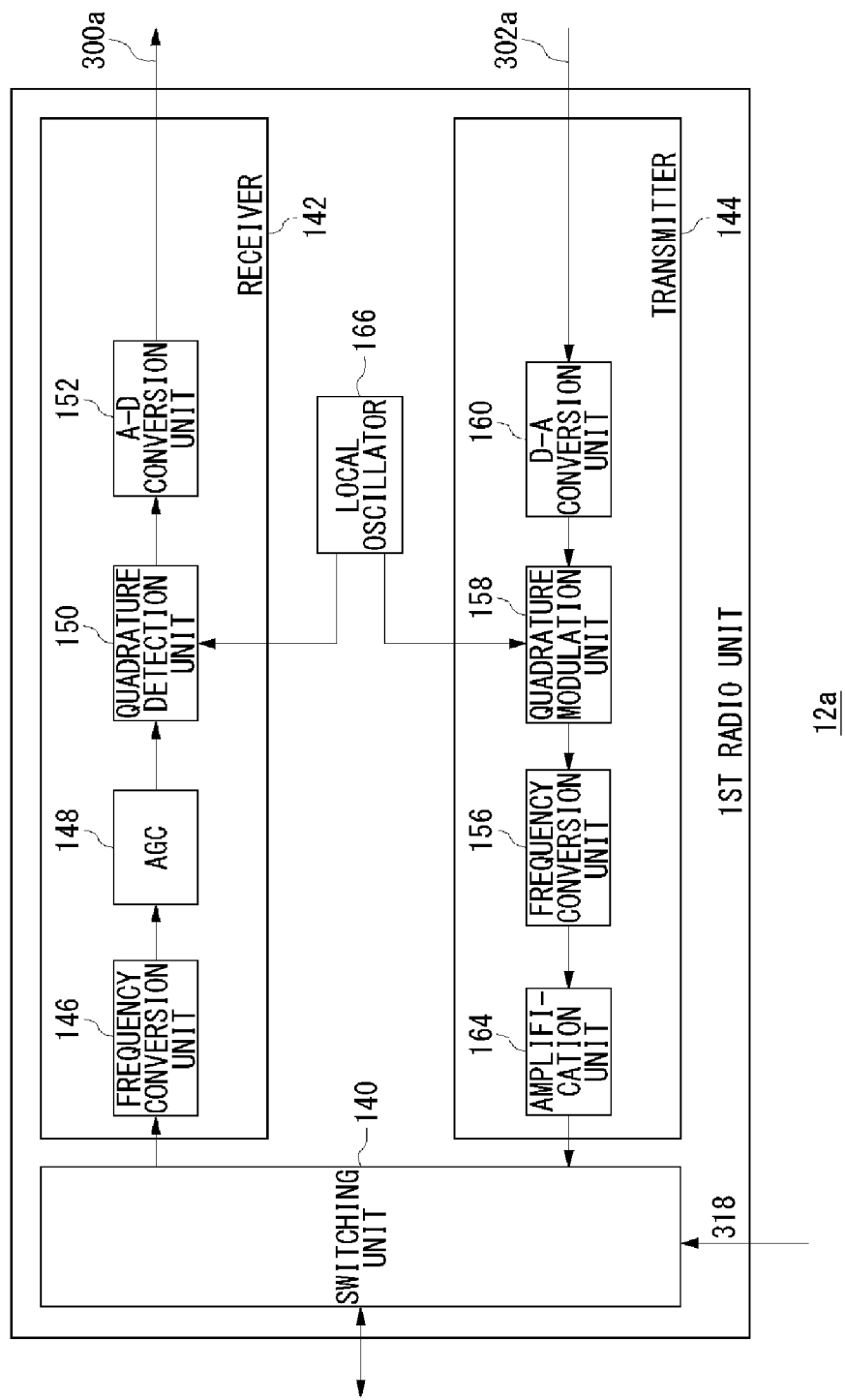
FIG. 4 illustrates a structure of a first radio unit shown in FIG. 2.

FIG. 4 illustrates a structure of a first radio unit 12a. The first radio unit 12a includes a switching unit 140, a receiver 142, a transmitter 144, and a local oscillator 166. The receiver 142 includes a frequency conversion unit 146, an AGC (Automatic Gain Control) unit 148, a quadrature detection unit 150 and an A-D conversion unit 152. The transmitter 144 includes an amplification unit 164, a frequency conversion unit 156, a quadrature modulation unit 158 and a D-A conversion unit 160.

The switching unit 140 switches input/output of signals to/from the receiver 142 and the transmitter 144 based on the radio-unit control signals 318 from the control unit 24, which is not shown in FIG. 4. That is, the switching unit 140 selects the signal from the transmitter 144 at the time of transmission, whereas it selects the signal to the receiver 142 at the time of receiving. The frequency conversion unit 146 in the receiver 142 and the frequency conversion unit 156 in the transmitter 144 perform frequency conversion on targeted signals between radiofrequencies and intermediate frequencies.

The AGC unit 148 amplifies a received signal by so controlling gain automatically as to make the amplitude of the received signal an amplitude which is within the dynamic range of the A-D conversion unit 152. The quadrature detection unit 150 generates baseband analog signals by performing quadrature detection on intermediate-frequency signals. On the other hand, the quadrature modulation unit 158 generates intermediate-frequency signals by performing quadrature modulation on the baseband analog signals.

The local oscillator 166 supplies a local signal having a predetermined frequency to the quadature detection unit 150 and the quadrature modulation unit 158. As shown in FIGS. 2 and 4, each radio unit 12 is provided with each local oscillator 166. Thus, a plurality of local oscillators 166 are provided for a plurality of radio units 12. The A-D conversion unit 152 converts baseband analog signals into digital signals, whereas the D-A conversion unit 160 converts baseband digital signals into analog signals. The amplification unit 164 amplifies radiofrequency signals to be transmitted.

Figure 5:
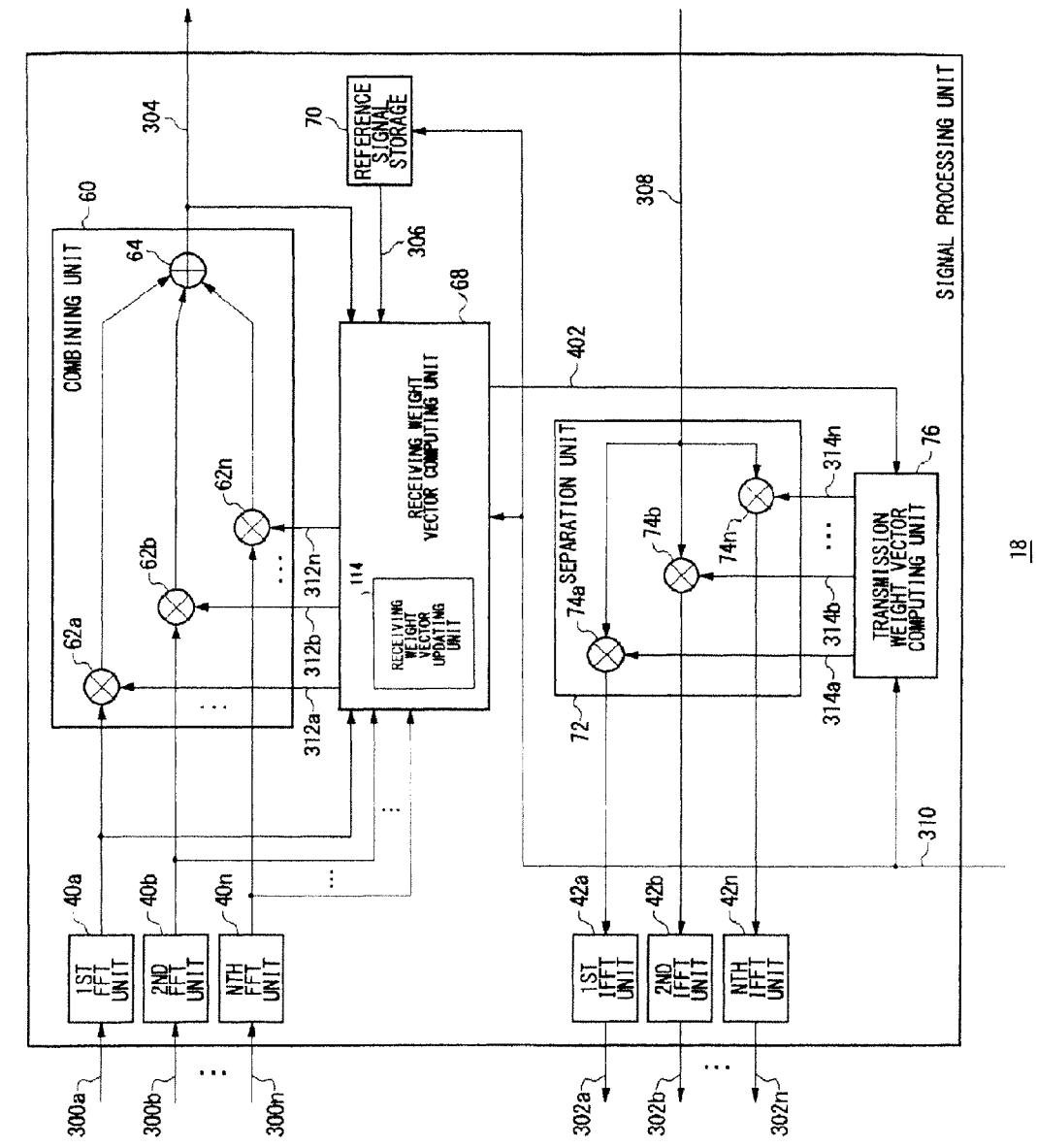
FIG. 5 illustrates a structure of a signal processing unit shown in FIG. 2.

FIG. 5 illustrates a structure of a signal processing unit 18. The signal processing unit 18 includes a first FFT unit 40a, a second FFT unit 40b, . . . and an Nth FFT unit 40n, which are generically referred to as "FFT unit 40", a combining unit 60, a receiving weight vector computing unit 68, a reference signal storage 70, a separation unit 72, a transmission weight vector computing unit 76, and a first IFFT unit 42a, a second IFFT unit 42b, . . . and an Nth IFFT unit 42n, which are generically referred to as "IFFT unit 42". The combining unit 60 includes a first multiplier 62a, a second multiplier 62b, . . . and an Nth multiplier 62n, which are generically referred to as "multiplier 62", and an adder 64. The separation unit 72 includes a first multiplier 74a, a second multiplier 74b, . . . and an Nth multiplier 74n, which are generically referred to as "multiplier 74".

Signals involved include a reference signal 306, an output receiving weight vector signal 402, a first receiving weight vector signal 312a, a second receiving weight vector signal 312b, . . . and an Nth receiving weight vector signal 312n, which are generically referred to as "receiving weight vector signal 312", and a first transmission weight vector signal 314a, a second transmission weight vector signal 314b, . . . and an Nth transmission weight vector signal 314n, which are generically referred to as "transmission weight vector signal 314".

The FFT unit 40 performs FFT on the inputted digital received signal 300. That is, the FFT unit 40 converts a time-domain signal into a frequency-domain signal. Here, the signal converted to the frequency domain is also indicated as the digital received signal 300. Also, the digital received signal 300 which has been converted to the frequency domain is structured as shown in FIG. 3. Here, the digital received signals 300 are a plurality of multicarrier signals corresponding to a plurality of basestation antennas 14. And a pilot signal is assigned to at least one of subcarriers in the plurality of multicarrier signals.

In the multiplier 62, the combining unit 60 weights the digital received signal 300 with the receiving weight vector signal 312 for each of the basestation antennas 14 and for each subcarrier, and then adds up the result thereof by the adder 64 so as to output a composite signal 304. Note that the multiplication in each multiplier 62 is done per subcarrier and the composite signal 304 is structured as shown in FIG. 3. The reference signal storage 70 outputs a known training signal stored beforehand during the training signal period, as the reference signal 306.

The receiving weight vector computing unit 68 derives channel characteristics from the digital received signal 300 and the reference signal 306, over a training signal period. Since any known technique is preferably employed to derive the channel characteristics, the explanation thereof is omitted here. As described above, the channel characteristics have components corresponding respectively to a plurality of basestation antennas 14 and a plurality of subcarriers, where each component has an in-phase component and a quadrature component. Also, the receiving weight vector computing unit 68 derives the receiving weight vector signal 312 from the channel characteristics. Since any known technique is preferably employed to derive the receiving weight vector signal 312, the explanation thereof is omitted here. The weight vector signal 312 is formed by the same number of components as that of channel characteristics. On the other hand, after the completion of the training signal period, the receiving weight vector computing unit 68 updates the receiving weight vector signal 312. An updating method will be discussed later in detail. The receiving weight vector signal 312 is outputted as an output receiving weight vector signal 402, too.

Based on the output receiving weight vector signal 402, the transmission weight vector computing unit 76 derives a transmission weight vector signal 314 necessary for weighting the pre-separation signal 308, for each basestation antenna 14 and for each subcarrier. To simplify the processing, the receiving weight vector signal 312 and the transmission weight vector signal 314 may be identical to each other. The separation unit 72 weights the pre-separation signal 308 with the transmission weight vector signal 314, for each basestation antenna 14 and for each subcarrier and then outputs the weighted pre-separation signal as a digital transmitted signal 302. The IFFT unit 42 performs IFFT on the digital transmitted signal 302 from the multipliers 74. That is, the IFFT unit 42 converts a frequency-domain signal into a time-domain signal. Here, the signal which has been converted to the time domain is represented by the digital transmitted signal 302, too.

Figure 6:
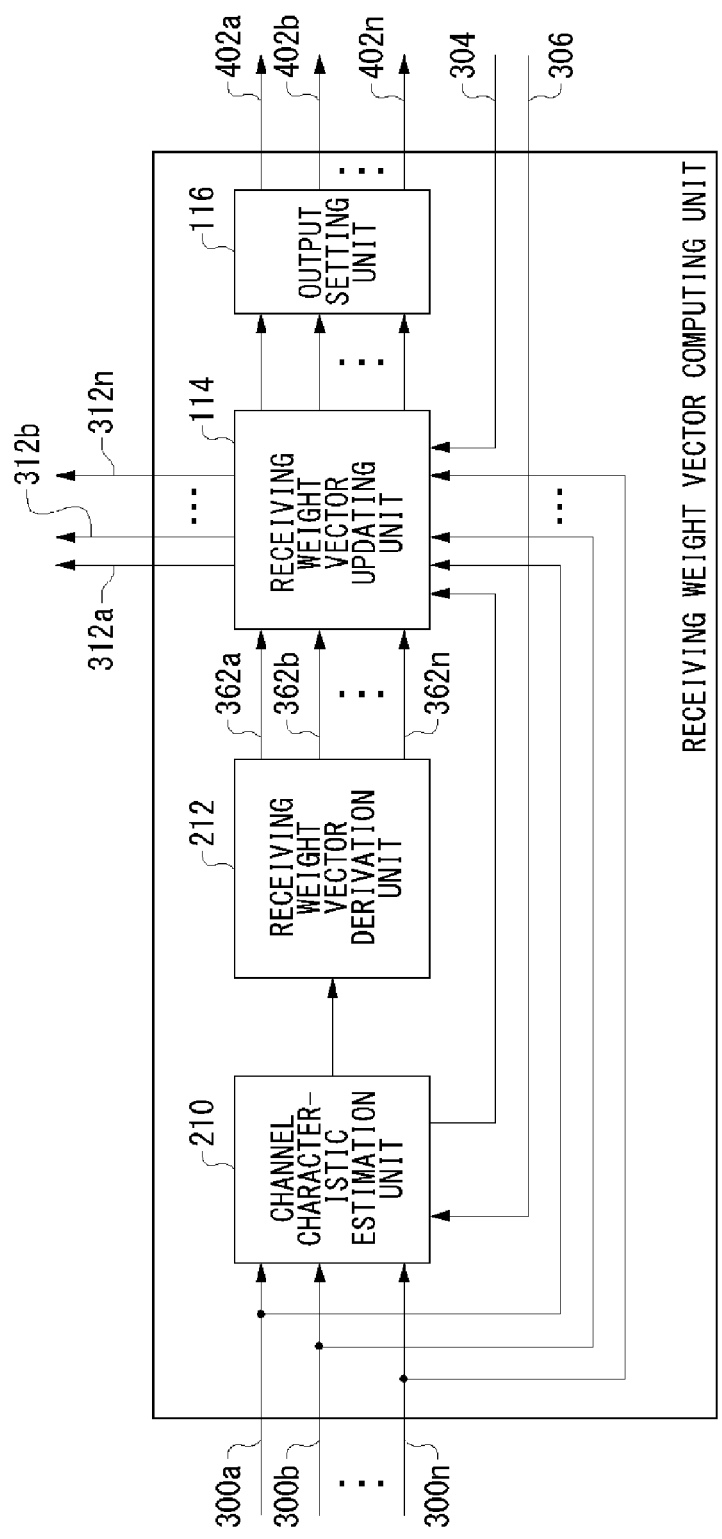
FIG. 6 illustrates a structure of a receiving weight vector computing unit shown in FIG. 5.

FIG. 6 illustrates a structure of the receiving weight vector computing unit 68. The receiving weight vector computing unit 68 includes a channel characteristic estimation unit 210, a receiving weight vector derivation unit 212, a receiving weight vector updating unit 114, and an output setting unit 116. Signals involved include a first initial weight vector signal 362a, a second initial weight vector signal 362b, ... and an Nth initial weight vector signal 362n, which are generically referred to as "initial weight vector signal 362", and a first output receiving weight vector signal 402a, a second output receiving weight vector signal 402b, ... and an Nth output receiving weight vector signal 402n, which are generically referred to as "output receiving weight vector signal 402".

In a training signal period, the channel characteristic estimation unit 210 derives channel characteristics based on the reference signal 306 and the digital received signal 300. Since the reference signal 306 and the digital received signal 300 are both frequency-domain signals, the channel characteristics can be derived by performing correlation processing per subcarrier. As described above, the channel characteristic has components the number of which corresponds to that of a multiplication result of the basestation antennas 14 and the subcarriers. The channel characteristic estimation unit 210 outputs the estimated channel characteristic to the receiving weight vector derivation unit 212 and the receiving weight vector updating unit 114. Note that the channel characteristic is outputted at the end timing of the training signal.

The receiving weight vector derivation unit 212 derives the initial weight vector signal 362, based on the channel characteristic obtained from the channel characteristic estimation unit 210. Here, the first initial weight vector signal to the Nth initial weight vector signal 362n are associated respectively with the first basestation antenna 14a to the Nth basestation antenna 14n which are not shown in FIG. 6. Each initial weight vector signal 362 is constituted as shown in FIG. 3.

After the end of a training signal period the receiving weight vector updating unit 114 updates the receiving weight vector signals 312 wherein the initial weight vector signals 362 serve as initial values. The updating is performed by a phase rotation using common phase rotation amount and individual phase rotation amounts. First, the phase is rotated by the individual phase amounts. Then the phase rotation using the individual phase rotation amounts and the phase rotation using the common phase rotation amount are performed sequentially. A receiving weight vector on which the phase rotation has been done by the common phase rotation amount is outputted as a receiving weight vector signal 312.

As described above, the common phase rotation amount has a different value for each of the basestation antennas 14 but it has an identical value for a plurality of subcarriers corresponding to one basestation antenna 14. Accordingly, the common phase rotation amount corresponds to a phase rotation amount used to correct the difference in frequency offsets among a plurality of local oscillators 166 (not shown). On the other hand, the individual phase rotation amount has a different value for each of subcarriers. Accordingly, the individual phase rotation amount corresponds to a phase rotation amount used to correct the phase offset due to a Doppler shift or frequency selective fading. As described above, the digital received signal 300 and the channel characteristic from the channel characteristic estimation unit 210 are used to derive the common phase rotation amount, whereas the digital received signal 300, the channel characteristic from the channel characteristic estimation unit 210 and the composite signal 304 are used to derive the individual phase rotation amounts. A detailed description of the receiving weight vector updating unit 114 is given later.

The output setting unit 116 outputs the receiving weight vector signal 312 as the output receiving weight vector signal 402. The output setting unit 116 may continuously output the output receiving weight vector signals 402 or output an output receiving weight vector signal 402 at one particular instant, for example, the receiving weight vector signal 312 at the instant when a packet signal ends.

Figure 7:
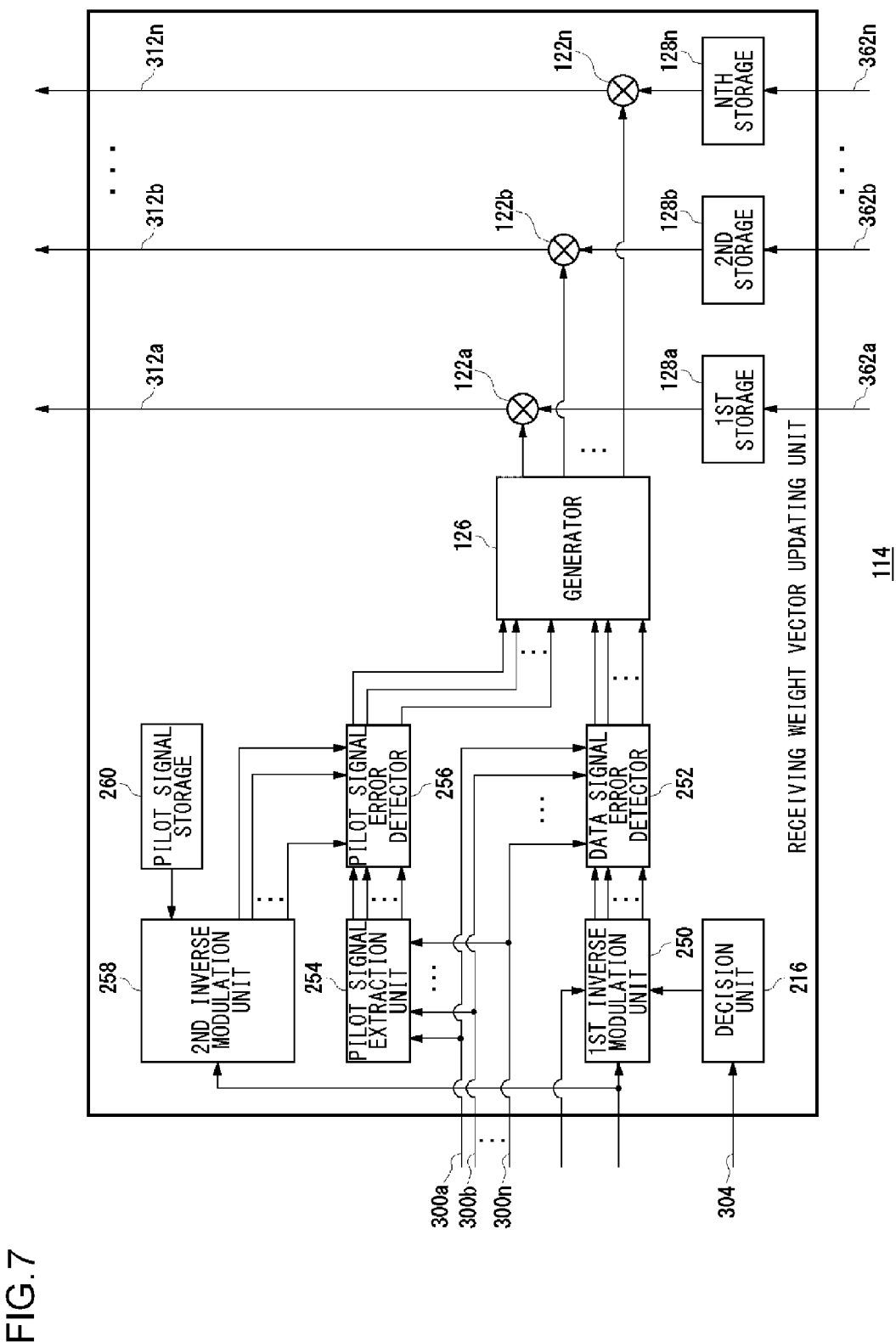
FIG. 7 illustrates a structure of a receiving weight vector updating unit in FIG. 6.

FIG. 7 illustrates a structure of the receiving weight vector updating unit 114. The receiving weight vector updating unit 114 includes a decision unit 216, a first inverse modulation unit 250, a data signal error detector 252, a pilot signal extraction unit 254, a pilot signal error detector 256, a second inverse modulation unit 258, a pilot signal storage 260, a generator 126, a first multiplier 122a, a second multiplier 122b, . . . and an Nth multiplier 122n, which are generically referred to as "multiplier 122", and a first storage 128a, a second storage 128b, . . . and an Nth storage 128n, which are generically referred to as "storage 128".

Here, the above-described feedforward control is performed by the pilot signal extraction unit 254, the pilot signal error detector 256, the second inverse modulation unit 258 and the pilot signal storage 260, whereas the above-described feedback control is performed by the decision unit 216, the first inverse modulation unit 250 and the data signal error detector 252. The decision unit 216 determines the composite signal 304. Since the composite signal 304 is constituted by components corresponding respectively to a plurality of subcarriers as shown in FIG. 3, the decision unit 216 performs hard-decision per subcarrier.

The first inverse modulation unit 250 performs an inverse modulation, based on the channel characteristics from the channel characteristic estimation unit 210 (not shown in FIG. 7) and a decision result from the decision unit 216. The inverse modulation is carried out in a manner that the channel characteristics and the decision results are brought into correspondence with each other per subcarrier and then the thus associated channel characteristics and decision results are multiplied together. Also, the channel characteristics have components different for each of the basestation antennas 14, and inverse modulation results corresponding respectively to the basestation antennas 14 are derived by varying a channel characteristic which is to be multiplied to a decision result in a subcarrier. That is, the inverse modulation results have components the number of which is equal to the number of subcarriers and the number of basestation antennas 14.

The data signal error detector 252 receives an inverse modulation result from the first inverse modulation unit 250 and a digital received signal 300. Both the inverse modulation result and the digital received signal 300 have components the number of which corresponds to the number of subcarriers and the number of basestation antennas 14. Thus, the both the inverse modulation result and the digital received signal 300 are brought into correspondence for every combination of one subcarrier and one basestation antenna 14. The data signal error detector 252 derives phase errors of the both which have been associated with each other. Here, since both the inverse modulation result and the subcarriers have in-phase components and quadrature components, the phase error is derived by multiplying complex conjugate values of the inverse modulation result by the digital received signals 300. As a result, the phase errors are not only associated respectively with a plurality of basestation antennas 14 but also associated respectively with a plurality of subcarriers. The data signal error detector 252 outputs the derived phase errors to the generator 126.

The pilot signal extraction unit 254 extracts pilot signals from the digital received signals 300. As described above, the subcarrier numbers to which the pilot signals are assigned are known and therefore the pilot signal extraction unit 254 extracts a component corresponding to a predetermined subcarrier number, from the digital received signal 300. The pilot signal extraction unit 254 outputs the extracted pilot signals to the pilot signal error detector 256. Note that each OFDYM symbol contains four pilot signals.

The pilot signal storage 260 stores the values of the pilot signals beforehand. The second inverse modulation unit 258 performs inverse modulation, based on the channel characteristics from the channel characteristic estimation unit 210 (not shown in FIG. 7) and the values of the pilot signals from the pilot signal storage 260. The inverse modulation is done in a manner that the channel characteristic and the value of pilot signal are associated with each other per subcarrier and the channel characteristic and the value of pilot signal which have been associated with each other are multiplied together. The channel characteristics have different components per basestation antenna 14, and inverse modulation results corresponding respectively to the basestation antennas 14 are derived by varying the channel characteristic which is to be multiplied to each value of pilot signal. That is, the inverse modulation results have components the number of which corresponds to the number of pilot signals and the number of basestation antennas 14.

The pilot signal error detector 256 receives the input of the inverse modulation results from the second inverse modulation units 258 and the digital received signals 300 so as to derive the phase error between them. The operation of the pilot signal error detector 256 is similar to that of the data signal error detector 252 and therefore the description thereof is omitted here. Here, the phase errors derived by the pilot signal error detector 256 are not only associated respectively with a plurality of basestation antennas 14 but also associated respectively with a plurality of subcarriers to which the pilot signals are assigned. The pilot signal error detector 256 outputs the derived phase errors to the generator 126.

The generator 126 derives a phase rotation amount, based on the phase error from the pilot signal error detector 256 and the phase error from the data signal error detector 252. For the clarity of explanation, a description is here given in three separate sections, namely, (1) generation of common phase rotation amount, (2) generation of individual phase rotation amount and (3) generation of final phase rotation amount.

(1) Generation of Common Phase Rotation Amount

The generator 126 generates a common phase error amount from the phase error derived by the pilot signal error detector 256. More specifically, the generator 126 accumulates the phase errors for four subcarriers in one OFDM symbol. Note that the accumulation is done if the values of phase error is indicated by a vector value. And if the values of phase error are indicated by phase values, the generator 126 will perform averaging processing. With such processings, a value common to all subcarriers is derived and this corresponds to the averaging of phase errors by a plurality of subcarriers and therefore the effect of noise can be reduced. The accumulation processing is expressed by the following Equation (1).

$$\Delta\theta_i = \arctan\left(\sum_j E_{ij}\right) \quad (1)$$

In Equation (1) $E_{ij}$ is a phase error corresponding to an Ith basestation antenna 14i and a subcarrier number j and $E_{ij}$ is represented as a vector value. j takes values of "−21", "−7", "7"and "21". $\Delta\theta_i$ is an accumulated value of phase error corresponding to the Ith basestation antenna 14i. Though $\Delta\theta_i$ is indicated as a phase value but may be a vector value. Further, the generator 126 receives $\Delta\theta_i$ and derives—$\Delta\theta_i$ as a common phase rotation amount. If $\Delta\theta_i$ is a vector value, the generator 126 may derive a complex conjugate thereof. In this manner, the common phase rotation amount is derived by extending the phase error in a subcarrier to which the pilot signal is assigned, to a plurality of subcarriers.

(2) Generation of Individual Phase Rotation Amount

The generator 126 generates individual phase error amounts from the phase amount derived by the data signal error detector 252. As described above, the phase error derived by the data signal error detector 252 has components corresponding to a combination of a plurality of basestation antennas 14 and a plurality of subcarriers. The generator 126 generates individual phase rotation amounts in a manner that the phase corresponding to each component rotates in the opposite direction. For example, when the phase error is "x degrees", the phase rotation amount is "−x degrees".

(3) Generation of Final Phase Rotation Amount

The generator 126 derives a final phase rotation amount, based on the common phase rotation amount and the individual phase rotation amounts. For example, a final phase rotation amount $\theta_{ij}^F$ is derived as follows.

$$\theta_{ij}^F = \theta_{ij}^D + \theta_i^C \quad (2)$$

where $\theta_{ij}^D$ corresponds to an individual phase rotation amount, and $\theta_i^C$ corresponds to the common phase rotation amount and $\theta_i^C$ also corresponds to $-\Delta\theta_i$. In this manner, the generator 126 derives phase rotation amounts corresponding respectively to a plurality of digital received signals 300.

Note here that, in contrast to the common phase rotation amount which is derived by the feedforward control, the individual phase rotation amounts are derived by the feedback control. Hence, the individual phase rotation amounts are derived in an OFDM symbol positioned prior to the OFDM symbol in which the common phase rotation amount has been derived. Here the timing at which the individual phase rotation amounts are derived is delayed by a delay amount due to the feedback processing, as compared with the timing at which the common phase rotation amount is derived. As a result, at an initial stage, namely at the timing when the common rotation amount has already derived but the individual rotation amount has not yet been derived, the generator 126 uses the common phase rotation amount as the final phase rotation amount.

The multipliers 122 outputs a receiving weight vector signal 312 by phase-rotating an initial weight vector signal 362 stored in the storage 128 by a phase rotation amount outputted from the generator 126. The storage 128 stores the initial weight vector signal 362 at the time when a training signal period ends, whereas the storage 128 outputs the initial weight vector signal 362 after the training signal period has ended.

Figure 8:
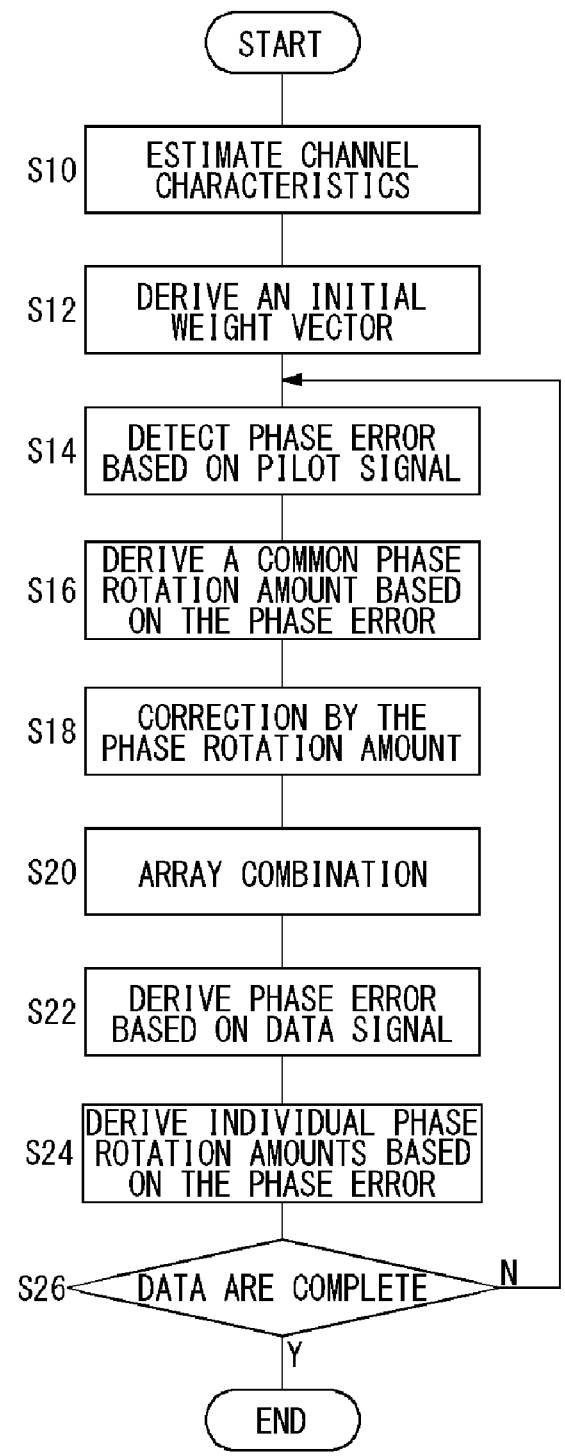
FIG. 8 is a flow chart showing a signal processing procedure by a signal processing unit of FIG. 5.

An operation of the signal processing unit 18 structured as above will now be described. FIG. 8 is a flow chart showing a signal processing procedure by the signal processing unit 18. Assume here that the timing at which the individual phase rotation amounts are derived is delayed by one OFDM symbol compared with the timing at which the common phase rotation amount is derived. The channel characteristic estimation unit 210 estimates the channel characteristics (S10). The receiving weight vector derivation unit 212 derives an initial weight vector signal 362 (S12). The pilot signal extraction unit 254, the pilot signal error detector 256, the second inverse modulation unit 258 and the pilot signal storage 260 derive phase error (S14).

The generator 126 derives a common phase ration amount, based on the phase error (S16). The multipliers 122 corrects the initial weight vector signal 362 by the phase rotation amount (S18) and outputs a receiving weight vector signal 312. The combining unit 60 carries out array synthesis (S20). The decision unit 216, the first inverse modulation unit 250 and the data signal error detector 252 derive the phase error, based on a data signal (S22). The generator 126 derives individual phase rotation amounts, based on the phase error (S24). If the data are not completed (N of S26), return to Step 14. At this time, in Step 18 a combined value of the common phase rotation value and the individual phase rotation values is used as the phase rotation value. If the data are completed (Y of S26) the processing is terminated.

A modification of the present embodiment is now described hereinbelow. Although the communication system 100 is assumed to be a legacy system in the above embodiment of the present invention, the communication system 100 in this modification of the present embodiment is assumed to be a MIMO system instead. A packet signal in the MIMO system is constituted by a plurality of streams. In order to be compatible with this, the terminal apparatus 10 is provided with a plurality of terminal antennas 16, a plurality of radio units 30, and a plurality of modem units 28. Also, the base station apparatus 34 includes a plurality of signal processing units 18 and a plurality of modem units 20. In such a structure, the terminal apparatus 10 and the base station apparatus 34 process a plurality of streams in parallel. A description is first given of the packet signal in a case when the MIMO system is applied.

FIGS. 9A to 9C illustrate formats of packet signals according to a modification of the present embodiment. FIG. 9A represents a case where the number of streams is "4", FIG. 9B a case where the number of streams is "3", and FIG. 9C a case where the number of streams is "2". In FIG. 9A, data contained in four streams are to be transmitted, and the packet formats corresponding to the first to fourth streams are shown in order from the top to the bottom level.

In a packet signal corresponding to the first stream, "L-STF", "HT-LTF" and the like are assigned as preamble signals. "L-STF", "L-LTF", "L-SIG" and "HT-SIG" correspond to a known signal for AGC setting, a known signal for channel estimation and a control signal compatible with a legacy system, and a control signal compatible with a MIMO system, respectively. The control signal compatible with a MIMO system contains information on the number of streams or a destination of a data signal, for example. "HT-STF" and "HT-LTF" corresponds to a known signal for AGC setting and a known signal for channel estimation compatible with a MIMO system, respectively. The above-described training signal corresponds to any of "L-STF", "HT-LTF", "HT-STF" and "HT-LTF" or an arbitrary combination thereof. On the other hand, "Data 1" is a data signal. Note that L-LTF and HT-LTF are used not only for AGC setting but also for timing setting.

In the packet signal corresponding to the second stream, "L-STF(−50 ns)", "HT-LTF(−400 ns)" and the like are assigned as preamble signals. And, in the packet signal corresponding to the third stream, "L-STF(−100 ns)", "HT-LTF(−200 ns)" and the like are assigned as preamble signals. And, in the packet signal corresponding to the fourth stream, "L-STF(−150 ns)", "HT-LTF(−600 ns)" and the like are assigned as preamble signals.

Here, "−400 ns" and the like indicate the amounts of timing shift in CDD. The CDD is a processing where in a predetermined interval a time-domain waveform is shifted, by a shift amount, in a posterior direction and then the waveform pushed out from the rearmost part in the predetermined interval is assigned cyclically in a header portion of the predetermined interval. That is, "L-STF(−50 ns)" is "L-STF" given a cyclic timing shift by a delay of −50 ns. Note that L-STF and HT-STF are each structured by a repetition of an 800 ns duration and that the other parts such as HT-LTF and the like are each constituted by a repetition of a 3.2 μs duration. It is also to be noted that "DATA 1" to "DATA 4" are also subjected to CDD and the amounts of timing shift are of the same values as those for HT-LTFs assigned anterior thereto.

In the first stream, HT-LTFs are assigned in the order of "HT-LTF", "−HT-LTF", "HT-LTF" and "−HT-LTF" from the top. Here, these in this order are called "a first component", "a second component", "a third component" and "a fourth component" in all the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. The receiving apparatus extracts a desired signal for the third stream by computing "first component−second component−third component+fourth component" for received signals of all the streams. The receiving apparatus extracts a desired signal for the fourth stream by computing "first component+second component−third component−fourth component" for received signals of all the streams. These are equivalent to the fact that the orthogonality relation holds for a combination of signs of predetermined components, among the streams. Note that the addition and subtraction processing is done by vector operation. 104 As with a legacy system, "52" subcarriers are used for the part from "L-LTF" to "HT-SIG" and so forth. Note that "4" subcarriers out of the "52" subcarriers correspond to pilot signals. On the other hand, the part of "HT-LTF" or the like and thereafter uses "56" subcarriers.

In FIG. 9A, the sign of "HT-LTF" is defined as follows. The signs are arranged in order from the top of the first stream as "+ (plus)", "− (minus)", "+" and "−"; the signs are arranged in order from the top of the second stream as "+", "+", "+" and "+"; the signs are arranged in order from the top of the third stream as "+" "−" a "−" and "+"; and the signs are arranged in order from the top of the fourth stream as "+", "+", "−" and "−". However, the signs may be defied as follows. The signs are arranged in order from the top of the first stream as "+", "−", "+" and "+"; the signs are arranged in order from the top of the second stream as "+", "+", "−" and "+"; the signs are arranged in order from the top of the third stream as "+", "+", "+" and "−"; and the signs are arranged in order from the top of the fourth stream as "−", "+", "+" and "+". In such signs, too, the orthogonal relationship holds in the combination of signs of predetermined components.

FIG. 9B corresponds to the first to the third stream of FIG. 9A. FIG. 9C is similar to the first stream and second stream of the packet formats shown in FIG. 9A. Here, the assignment of "HT-LTFs" in FIG. 9C differs from that of "HT-LTFs" in FIG. 9A. That is, only the first components and the second components of HT-LTFs are contained. In the first stream, HT-LTFs are assigned in the order of "HT-LTF" and "HT-LTF" from the top thereof, whereas in the second stream, HT-LTFs are assigned in the order of "HT-LTF" and "−HT-LTF" from the top thereof. A receiving apparatus extracts a desired signal for the first stream by computing "first component+second component" for received signals of all the streams. Also, the receiving apparatus extracts a desired signal for the second stream by computing "first component−second component" for received signals of all the streams. As described above, the orthogonal relationship also holds between these.

Figure 10:
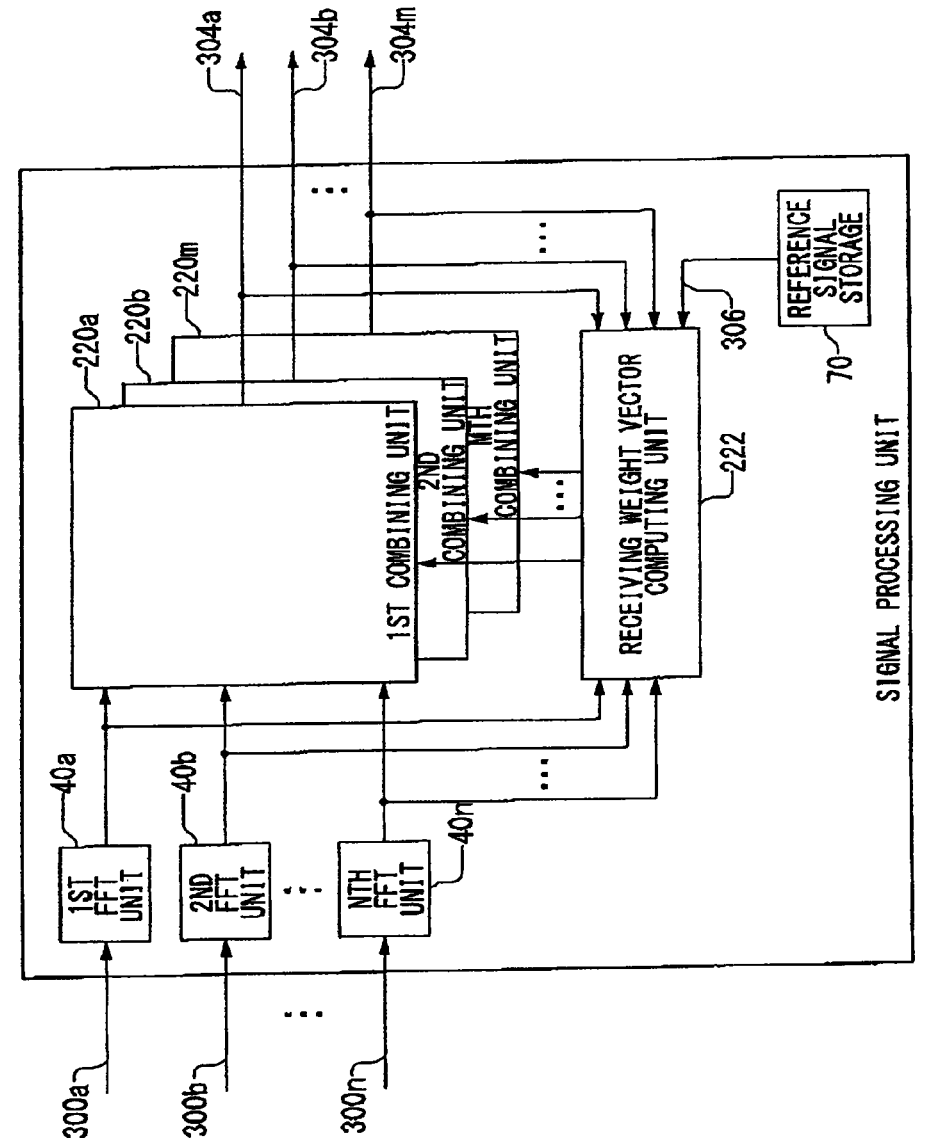
FIG. 10 illustrates a structure of a signal processing unit according to a modification of an exemplary embodiment.

The structure of the base station apparatus 34 according to the modification is of the same type as with FIG. 2 and therefore the repeated explanation is omitted here. FIG. 10 illustrates a structure of a signal processing unit 18 according to the modification of the present embodiment. The signal processing unit 18 includes a first FFT unit 40a, a second FFT unit 40b, . . . and an Nth FFT unit 40n, which are generically referred to as "FFT unit 40", a first combining unit 220a, a second combining unit 220b, . . . and an Mth combining unit 220m, which are generically referred to as "combining unit 220", a receiving weight vector computing unit 222 and a reference signal storage unit 70. Note that FIG. 10 shows a part that involves the receiving processing in the signal processing unit 18.

The signal processing unit 18 receives the input of digital received signals 300 corresponding respectively to a plurality of the basestation antennas 14 wherein the digital received signals 300 are composed of a plurality of streams as shown in FIGS. 9A to 9C. The FFT units 40 correspond to the FFT units 40 shown in FIG. 5. The combining unit 220 carries out array synthesis. To be consistent with the number of streams, M combining units 220 are provided. Each of the combining units 220 weights the digital received signal 300 per basestation antenna 14 and per subcarrier, and combines them per subcarrier. The processing of weighting and combining in each of the combining units 220 is performed in a similar manner to the combining unit 60.

The receiving weight vector computing unit 222 generates a receiving weight vector used in the weighting in the combining unit 220. Since M combining units 220 correspond respectively to M streams, the receiving weight vector computing unit 222 derives receiving weight vectors corresponding respectively to the M streams. Similar to the receiving weight vector signal 312 explained so far, a receiving weight vector corresponding to one combining unit 220 has components the number of which corresponds to the number of basestation antennas 14.

Similar to the receiving weight vector updating unit 114 shown in FIG. 6, the receiving weight vector computing unit 222 updates the receiving weight vector. In so doing, each component contained in the receiving weight vector updating unit 114 is extended to a processing for the M streams. That is, it is extended to the processing performed in units of stream. In the first inverse modulation unit 250 and the second inverse modulation unit 258, M inverse modulation results are derived for one combination of a basestation antenna 14 and a subcarrier. On the other hand, the M inverse modulation results are combined and then the combined result is taken as an inverse modulation result for this combination. Accordingly, even if the stream in question is a different stream, the common phase rotation amount will exhibit the same value as long as the basestation antenna 14 is the same. Also, even if the stream in question is a different stream, the individual phase rotation amount will exhibit the same value as long as the basestation antenna 14 and the subcarrier are the same.

According to the present embodiment and modifications, the phase rotation amount is derived based on the result of the remodulated pilot signal and the result of array synthesis. Thus, the accuracy of the phase rotation amount can be enhanced and therefore the accuracy of correction of phase error can be enhanced. Two rotation amounts of different properties are derived, so that the phase errors whose occurrence causes differ can be corrected. The remodulation is performed on the result of array synthesis and then the remodulated result is taken as a reference signal. Thus, the accuracy of the reference signal can be improved. Also, the phase rotation amount is derived using the reference signal whose accuracy has been improved, so that the estimation accuracy of the phase rotation amount can be enhanced. Since phase rotation amounts having different values are derived, per subcarrier, based on the result of array synthesis, the phase error due to a Doppler shift or frequency selective fading can be corrected.

The phase rotation amount whose value is common across a plurality of subcarriers is derived from the result where the pilot signal has been remodulated. Thus, the difference in frequency offset between local signals outputted from different local oscillators can be corrected. The phase rotation amount is derived by accumulating the phase errors derived for the pilot signals, so that the effect of noise on the phase rotation amounts can be reduced. Since the effect of noise is reduced, the estimation accuracy of the phase rotation amounts can be enhanced. Since the estimation accuracy of the phase rotation amounts is enhanced, the accuracy of correction of frequency offset can be enhanced. Since the accuracy of correction of frequency offset is enhanced, the receiving characteristics can be improved even if the frequency offset value differs for each of the basestation antennas. Since it is only necessary to rotate a receiving weight vector using the derived phase rotation amount, a simplified processing can be achieved.

Also, the derivation timing of two phase errors may differ, so that the two phase errors can be derived by using different derivation methods. Since the common phase rotation amount is derived by the feedforward control, the processing delay in derivation thereof can be reduced. Since the individual phase rotation amounts are derived by the feedback control, the derivation accuracy can be enhanced.

The present invention has been described based on an exemplary embodiment and its modifications. These are merely exemplary, and it is understood by those skilled in the art that various further modifications to the combination of each component and process thereof are possible and that such modifications are also within the scope of the present invention.

In the exemplary embodiment, the receiving weight vector computing unit 68 derives channel characteristics in order to estimate the receiving weight vector signal 312. However, this should not be considered as limiting and, for example, an adaptive algorithm may be executed in the receiving weight vector computing unit 68. Processings other than adaptive algorithms may be executed. For example, an adaptive algorithm such as LMS algorithm or RLS algorithm may be executed. Also, an arrival direction estimation may be executed using MUSIC (MUltiple SIgnal Classification) algorithm. According to this modification, various techniques for estimating a receiving weight vector is applicable to the embodiments. This and other modifications may be acceptable as long as a plurality of received signals are separated in the signal processing with an adaptive array antenna.

In the exemplary embodiment, the communication system 100 is applied to the CSMA-based communication system 100. This should not be considered as limiting and, for example, the base station apparatus 34 may be applied to a communication system other than the CSMA. The example of such a communication system other than the CSMA includes TDMA (Time Division Multiple Access), CDMA (Code Division Multiple Access), SDMA (Space Division Multiple Access) and the like. According to this modification, the present embodiment can be applied to various communication systems. That is, it suffices if the base station apparatus 34 is a base station apparatus that receives signals from the terminal apparatus 10.

In the exemplary embodiment, a description has been given of the base station apparatus 34 but this is not limited thereto, and the description may be applied to the terminal apparatus 10. In such a case, the terminal apparatus 10 will be structured the same way as the base station apparatus 34. Also, the description is not limited to the terminal apparatus 10 and the base station apparatus 34 but may be applied to a radio apparatus in general. According to this modification, the present embodiment is applicable to various types of radio apparatuses.

In the exemplary embodiment, the common phase rotation amount is derived from the phase error which has been derived for a pilot signal, so that the generator 126 accumulates the phase errors. However, this is not limited thereto and, for example, the generator 126 may do the accumulation while performing the weighting. For this weighting, the magnitude of components of the receiving weight vector signals 312 in the basestation antenna 14 and subcarriers corresponding to the phase errors are used. As the magnitude of components of the receiving weight vector signal 312 becomes larger, the magnitude of the digital received signal 300 to be multiplied by said component will be smaller. This is also equivalent to the reduced reliability of the phase error. Accordingly, if the magnitude of components of the receiving weight vector signal 312 is large, the phase error is accumulated while the weighting is kept small. A phase error $E_{ij'}$ which has been weighted for the Ith basestation antenna 14i and the subcarrier number j is expressed as follows.

$$E_{ij'} = \frac{E_{ij}}{|W_{ij}^H \cdot W_{ij}|} \qquad (3)$$

where $w_{ij}$ is a component corresponding to the Ith basestation antenna 14i and the subcarrier number j in a receiving weight vector. Based on the weighted phase error $E_{ij'}$, $\Delta\theta_i$ is derived as follows.

$$\Delta\theta_i = \arctan\left(\sum_j E_{ij'}\right) \qquad (4)$$

Note that even if the weighting operation is not executed, the generator 126 will monitor the magnitude of components of the receiving weight vector signal 312. And if the magnitude of components of the receiving weight vector signal 312 becomes larger than a threshold value, a phase error in a subcarrier corresponding to the component of said receiving weight vector signal 312 may be set aside from the accumulation. Note that the subcarriers here are subcarriers to which pilot signals are assigned. According to this modification, the effect of the phase error whose reliability is low is small, so that the accuracy of the accumulation can be enhanced. That is, it suffices if the effect of noise is reduced when the accumulation is executed.

Further, the generator 126 may interpolate the phase errors derived for a plurality of pilot signals in one OFDM symbol so as to derive the phase rotation amounts for the other subcarriers. For example, interpolation is executed to derive the phase errors between the subcarrier numbers "−21" and "−7", those between the subcarrier numbers "−7" and "7" and those between the subcarrier numbers "7" and "21"; and extrapolation is executed to derive the phase errors between the subcarrier numbers "−26" and "−21" and those between the subcarrier numbers "21" and 26". The value differs, per subcarrier, in the common phase rotation amount derived in such a processing as described above. According to this modification, the common phase rotation amount can be derived by taking the frequency characteristics for the phase error into account.

In the exemplary embodiment, the generator 126 derives phase rotation amounts, based on the phase error detected at a predetermined timing. However, this should not be considered as limiting and, for example, the generator 126 may derive a phase rotation amount used for phase rotation, from the phase rotation amount which has already been used and that which has been derived anew. This processing is expressed as follows, for example.

$$\theta_c = \alpha \theta_{new} + \beta \theta'_c \qquad (5)$$

where $\theta_{new}$ is a phase rotation which has been derived anew, $\theta'_c$ is a phase rotation amount which has already been used, and $\theta_c$ is a phase rotation amount used for phase rotation. Here, $\alpha$ and $\beta$ are each a coefficient less than or equal to 1. According to this modification, the phase rotation amounts in the past are also taken into account and therefore the effect of noise can be reduced.

(Second Embodiment)

Before describing the present invention in detail, an outline of the present invention will be described first. Another exemplary embodiment of the present invention relates to a base station apparatus, to which a terminal apparatus is accessible, such as one used in a communication system like a wireless LAN (Local Area Network). An OFDM modulation scheme is used in the communication system. The base station apparatus according to the exemplary embodiment of the present invention is comprised of a plurality of antennas and local oscillators corresponding respectively to the plurality of antennas. The base station apparatus receives multicarrier signals received from a terminal apparatus to be communicated with, by a plurality of antennas, and the thus received multicarrier signals are subjected to quadrature detection by the local oscillator. Further, the base station apparatus computes weight factors from a plurality of quadrature-detected multicarriers, for each antenna and for each carrier. Hereinafter, a generic term for the thus computed weight factors or a set of weight factors in units of carrier is called "receiving weight vector" but no clear distinction will be made therebetween.

The base station apparatus performs an adaptive array signal processing on the received multicarrier signals by using the computed receiving weight vectors.

Multicarrier signals from the terminal apparatus constitute a packet signal, and a known signal (also called "training signal") is assigned to a header portion of the packet signal. Subsequence to this training signal, a data signal is assigned. In a period where the training signal is contained in the received packet signal, the base station apparatus computes a receiving weight vector. The stability of frequency in a plurality of local oscillators is not high. Thus the respective frequencies are considered to have deviated from one another. As a result thereof, in a data signal period, a phase error is caused among a plurality of received signals.

The base station apparatus according the exemplary embodiment of the present invention selects a signal whose received power is maximum (hereinafter this signal will be referred to as "reference signal") among a plurality of multicarrier signals, and regards signals other this reference signal as those to be processed. Also, in a known signal period, a receiving weight vector corresponding to the reference signal (hereinafter this vector will be referred to as "reference receiving weight vector") and a receiving weight vector corresponding to the signals to be processed (hereinafter this vector will be referred to as "receiving weight vector to be processed" are derived. Here, even in a data signal period, a known signal (hereinafter referred to as "pilot signal") is contained in some of a plurality of subcarriers contained in a multicarrier signal.

The pilot signal in each subcarrier is constructed by the repetition of a predetermined pattern and the same value appears cyclically. Using the periodicity of the pilot signal, the base station apparatus derives an amount of phase rotation, due to the frequency offset, over a plurality of multicarrier signals for each antenna. Based on error between the phase rotation amount corresponding to the reference signal and that corresponding to the signal to be processed, a phase rotation amount which is a correction value is derived in units of signal to be processed. Further, the base station apparatus rotates phase of the receiving weight vector to be processed, by the correction value.

Figure 11:
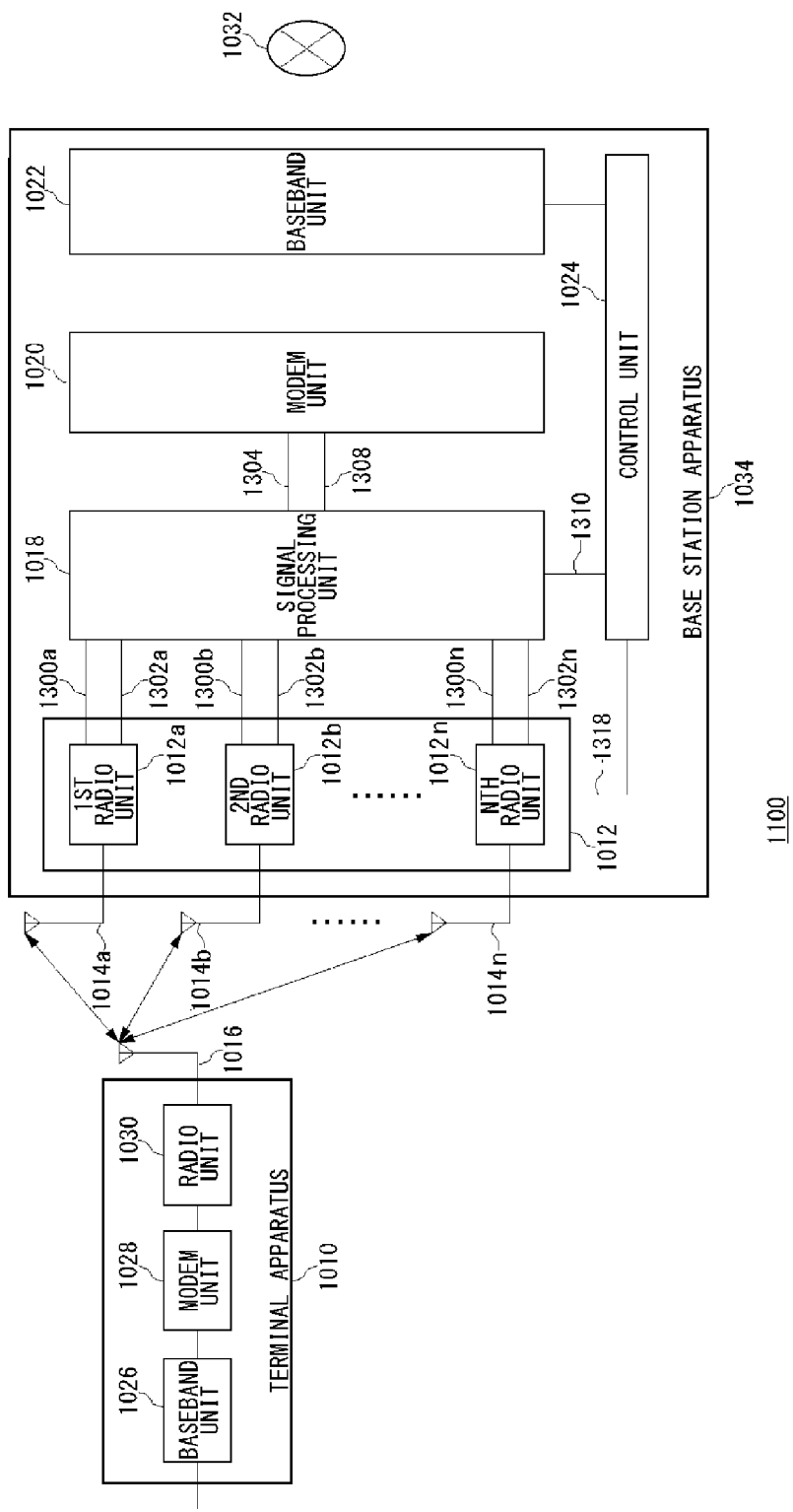
FIG. 11 illustrates a structure of a communication system according to a modification of an exemplary embodiment of the present invention.

FIG. 11 illustrates a structure of a communication system 1100 according to an exemplary embodiment of the present invention. The communication system 1100 includes a terminal apparatus 1010, a base station apparatus 1034, and a network 1032. The terminal apparatus 1010 includes a baseband unit 1026, a modem unit 1028, a radio unit 1030, and an antenna 1016 for use with the terminal (hereinafter referred to as "terminal antenna 1016" also). The base station apparatus 1034 includes a first basestation antenna 1014*a*, a second basestation antenna 1014*b*, ... and an Nth basestation antenna 1014*n*, which are generically called "antenna 1014 for use with base station apparatus" or "basestation antenna 1014", a first radio unit 1012*a*, a second radio unit 1012*b*, ... and an Nth radio unit 1012*n*, which are generically called "radio unit 1012", a signal processing unit 1018, a modem unit 1020, a baseband unit 1022 and a control unit 1024. Signals involved include a first digital received signal 1300*a*, a second digital received signal 1300*b*, ... and an Nth digital received signal 1300*n*, which are generically called "digital received signal 1300", a first digital transmitted signal 1302*a*, a second digital transmitted signal 1302*b*, ... and an Nth digital transmitted signal 1302*n*, which are generically called "digital transmitted signal 1302", a composite signal 1304, a pre-separation signal 1308, a signal processor control signal 1310 and a radio-unit control signal 1318.

The terminal apparatus 1010 is connected to the base station apparatus 1034, and performs communications with the base station apparatus 1034. The baseband unit 1026 is an interface with a PC connected to the terminal apparatus 1010 or with an application inside the terminal apparatus 1010, and performs receive/transmit processing of information signals which are to be transmitted in the communication system 1100. Error correction or automatic retransmission processing may also be carried out, but the description of such processings is omitted here. As a transmission processing, the modem unit 1028 executes mapping to the above-described BPSK or the like, IFFT (Inverse Fast Fourier Transform) and quadrature modulation so as to generate a transmission signal.

On the other hand, the modem unit 1028 performs quadrature detection, FFT and demodulation as a receiving processing and thereby reproduces the information signals transmitted from the base station apparatus 1034. Here, a signal outputted from the modem unit 1028 in the transmission processing and a signal inputted to the modem unit 1028 in the receiving processing constitute multicarrier signals as in an OFDM signal. The multicarrier signals constitute a packet signal. The radio unit 1030 performs frequency conversion processing. The radio unit 1030 also performs amplifying processing and A-D or D-A conversion processing. The radio unit 1030 receives and transmits radiofrequency signals from and to the base station apparatus 1034 via the terminal antenna 1016.

There are provided a plurality of basestation antennas 1014. Here, assume that the number of basestation antennas 1014 is N. As a receiving operation, the radio unit 1012 carries out frequency conversion of the radiofrequency multicarrier signals so as to derive baseband signals. As described above, the multicarrier signals constitute a packet signal, and training signals are contained contiguously in the header portion of the packet signal. Also, in the multicarrier signal, a pilot signal is contained in a predetermined subcarrier. The pilot signal is formed by repeating a predetermined pattern. Here, each of a plurality of multicarrier signals correspond to any of a plurality of basestation antennas 1014. Local oscillators corresponding respectively to a plurality of basestation antennas 1014 are contained in a plurality of radio units 1012. The radio unit 1012 performs frequency conversion on each of a plurality of multicarrier signals by a local signal outputted from the local oscillator.

The radio unit 1012 outputs the baseband signals to the signal processing unit 1018 as the digital received signals 1300. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included.

As a transmission operation, the radio unit 1012 carries out frequency conversion of baseband signals from the signal processing unit 1018 so as to derive radiofrequency signals. Here, the baseband signal from the signal processing unit 1018 is indicated as the digital transmitted signals 1302. The radio unit 1012 outputs the radiofrequency signals to the basestation antennas 1014. A PA (Power Amplifier) and a D-A conversion unit are also included in the radio unit 1012. The digital transmitted signal 1302 is s a multicarrier signal converted to the time domain and is a digital signal.

As a receiving operation, the signal processing unit 1018 converts a plurality of digital received signals 1300 into those in the frequency domain and performs adaptive array signal processing on the frequency-domain signals. The signal processing unit 1018 outputs a result of the adaptive array signal processing as a composite signal 1304. As a transmission operation, the signal processing unit 1018 inputs from the modem unit 1020 the pre-separation signal 1308 which is a signal in the frequency domain, converts frequency-domain signals into time-domain signals, and outputs them as the digital transmitted signals 1302 by associating them with a plurality of basestation antennas 1014, respectively. It is assumed herein that the composite signal 1304 and the pre-separation signal 1308, which are signals in the frequency domain, each contains a plurality of subcarrier components as shown in FIG. 1. For the clarity of figure, the frequency-domain signal is arranged in the order of the subcarrier numbers, and forms serial signals.

Figure 12:
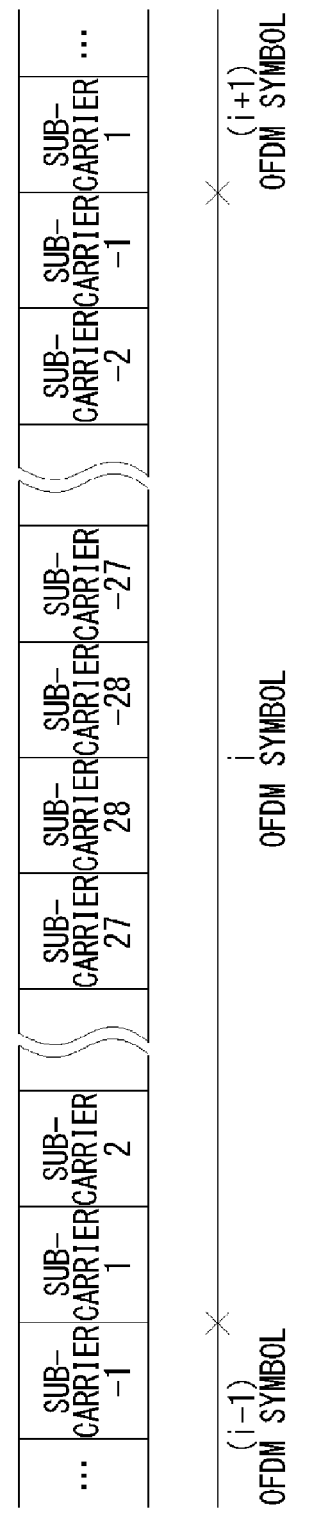
FIG. 12 illustrates a structure of a frequency-domain signal in FIG. 11.

FIG. 12 illustrates a structure of a frequency-domain signal. Assume herein that a combination of subcarrier numbers "−28" to "28" shown in FIG. 1 constitutes a so-called "OFDM symbol". An "i"th OFDM symbol is such that subcarriers components are arranged in the order of subcarrier numbers "1" to "28" and subcarrier numbers "−28" to "−1". Assume also that an "(i−1)" th OFDM symbol is placed before the "i"th OFDM symbol, and an "(i+1)" th OFDM symbol is placed after the "i"th OFDM symbol. Note that, in a legacy system, a combination of the subcarrier numbers "−26" to "26" is used for each "OFDM symbol". Now refer back to FIG. 11.

A further detail on the receiving processing in the signal processing unit 1018 is now described. The signal processing unit 1018 derives receiving weight vectors for a plurality of digital received signals 1300, over a training signal period in a packet signal. A receiving weight vector has components corresponding respectively to the basestation antennas 1014 and the subcarriers. In what is to follow, this will be called "component per basesation antenna 1014 and per subcarrier". Note that the "basestation antenna 1014 per basestation antenna 1014" corresponds to a basestation antenna 1014 that has received the digital received signal 1300. Here, a signal per basestation antenna 1014 is also called simply "basestation antenna 1014 unit", "per basestation antenna 1014" or the like. The signal processing unit 1018 performs a classification in such a manner that one of a plurality of digital received signals 1300 corresponding to each subcarrier is the reference signal and the remaining signals are the signals to be processed. As a result, the receiving weight vectors are classified into a reference receiving weight vector and receiving weight vectors to be processed, as described above.

Of the digital received signals 1300, the signal processing unit 1018 specifies a subcarrier to which a pilot signal is assigned. That is, four subcarriers are specified about the digital received signal 1300 for each basestation antenna 1014. While using the values in the specified subcarrier, the signal processing unit 1018 derives the phase rotation amount per unit time for the digital received signal 1300, per basestation antenna 1014. Here, the values in the specified subcarrier are formed by in-phase components and quadrature components. The phase rotation amount per unit time is derived by using the fact that a pilot signal is repeated for every 4 OFDM symbols. That is, a phase rotation amount in a 4-OFDM symbol period is derived, and the thus derived phase rotation amount is adjusted so that the derived phase rotation amount is an amount per unit time. For example, if the unit time is "1 OFDM symbol", the derived phase rotation amount will be divided by 4.

As a result of the above-described classification, one of the phase rotation amounts per basestation antenna 1014 corresponds to the reference signal (hereinafter this phase rotation amount will be referred to as "reference amount"). The remaining amounts of the phase rotation amounts per basestation antenna 1014 correspond to the signals to be processed (hereinafter these phase rotation amounts will be referred to as "amounts to be processed"). The signal processing unit 1018 derives error between an amount to be processed and the reference amount, as a phase rotation amount per basestation antenna 1014.

While associating, per basestation antenna 1014, the phase rotation amount per basestation antenna 1014 with the receiving weight vector, the signal processing unit 1018 rotates the receiving weight vector according to the phase rotation amount. Here, a receiving weight vector is formed on a sub-carrier-by-subcarrier basis. A receiving weight vector per subcarrier is formed by components corresponding respectively to a plurality of basestation antennas 1014. The phase rotation is applied to a receiving weight vector to be processed. The signal processing unit 1018 weights the digital received signal 1300 per basestation antenna 1014 and subcarrier with the phase-rotated receiving weight vector per subcarrier, and combines the weighting results per subcarrier. Here, the result combined per subcarrier also contains the pilot signal. Finally, the signal processing unit 1018 outputs the combined result as a composite signal 1304.

As a receiving processing, the modem unit 1020 corrects the phase error of the composite signal 1304 by using the pilot signal contained in the composite signal 1304 from the signal processing unit 1018. A known technique may be used for the correction of the phase error using the pilot error and thus the description thereof is omitted here. In the signal processing unit 1018, the phase correction by the phase rotation is performed on the receiving weight vector to be processed, whereas the phase correction is not performed on the reference receiving weight vector. This is equivalent to correcting a relative phase error between the reference receiving weight vector and the receiving weight vector to be processed. By performing such a correction as above, the phase error between the basestation antennas 1014 in the weighting result can retain an initial value. Hence, the deterioration of receiving characteristics by adaptive array signal processing can be suppressed. However, since the phase correction is not performed on the reference receiving weight vector, an absolute phase error is contained in the composite signal 1304. In order to correct such an absolute phase error, the modem unit 1020 corrects the phase error based on the pilot signal.

The modem unit 1020 also executes demodulation and deinterleaving. The demodulation is carried out per subcarrier. The modem unit 1020 outputs the demodulated signal to the baseband unit 1022. As a transmission processing, the modem unit 1020 carries out interleaving and modulation. The modem unit 1020 outputs the modulated signal to the signal processing unit 1018 as a pre-separation signal 1308. When the transmission processing is carried out, the modulation scheme is specified by the control unit 1024. The baseband unit 1022 serves as an interface between the signals to be processed in the base station apparatus 1034 and the network 1032. The control unit 1024 controls the timing and the like of the base station apparatus 1034.

In terms of hardware, this structure can be realized by a CPU, a memory of an arbitrary computer and other LSIs. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 13:
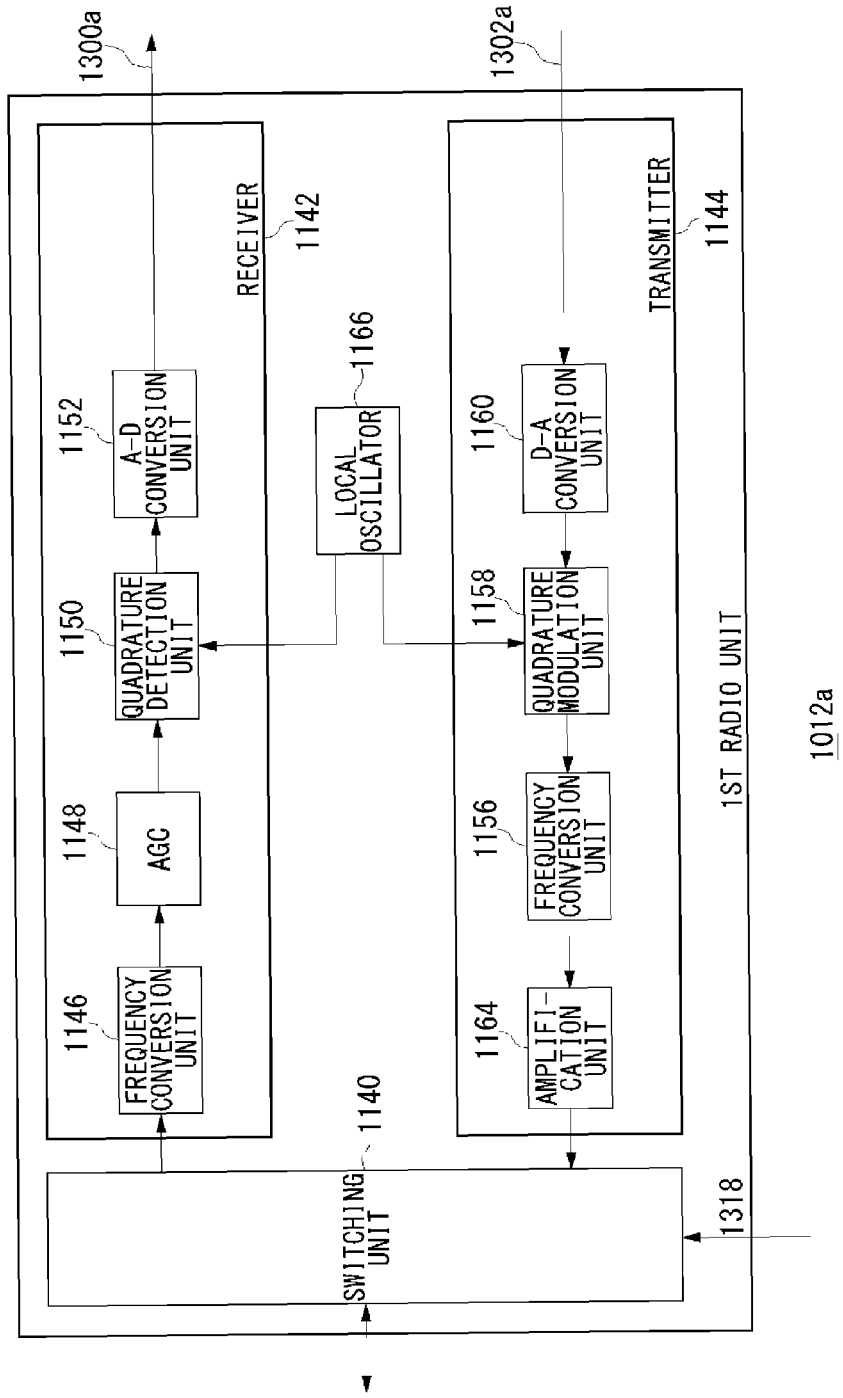
FIG. 13 illustrates a structure of a first radio unit shown in FIG. 11.

FIG. 13 illustrates a structure of a first radio unit 1012*a*. The first radio unit 1012*a* includes a switching unit 1140, a receiver 1142, a transmitter 1144, and a local oscillator 1166. The receiver 1142 includes a frequency conversion unit 1146, an AGC unit 1148, a quadrature detection unit 1150 and an A-D conversion unit 1152. The transmitter 1144 includes an amplification unit 1164, a frequency conversion unit 1156, a quadrature modulation unit 1158 and a D-A conversion unit 1160.

The switching unit 1140 switches input/output of signals to/from the receiver 1142 and the transmitter 1144 based on the radio-unit control signals 1318 from the control unit 1024, which is not shown in FIG. 13. That is, the switching unit 1140 selects the signal from the transmitter 1144 at the time of transmission, whereas it selects the signal to the receiver 1142 at the time of receiving. The frequency conversion unit 1146 in the receiver 1142 and the frequency conversion unit 1156 in the transmitter 1144 perform frequency conversion on targeted signals between radiofrequencies and intermediate frequencies.

The AGC unit 1148 amplifies a received signal by so controlling gain automatically as to make the amplitude of the received signal an amplitude which is within the dynamic range of the A-D conversion unit 1152. The quadrature detection unit 1150 generates baseband analog signals by performing quadrature detection on intermediate-frequency signals. On the other hand, the quadrature modulation unit 1158 generates intermediate-frequency signals by performing quadrature modulation on the baseband analog signals.

The local oscillator 1166 supplies a local signal having a predetermined frequency to the quadature detection unit 1150 and the quadrature modulation unit 1158. As shown in FIGS. 11 and 13, each radio unit 1012 is provided with each local oscillator 1166. Thus, a plurality of local oscillators 1166 are provided for a plurality of radio units 1012. The A-D conversion unit 1152 converts baseband analog signals into digital signals, whereas the D-A conversion unit 1160 converts baseband digital signals into analog signals. The amplification unit 1164 amplifies radiofrequency signals to be transmitted.

Figure 14:
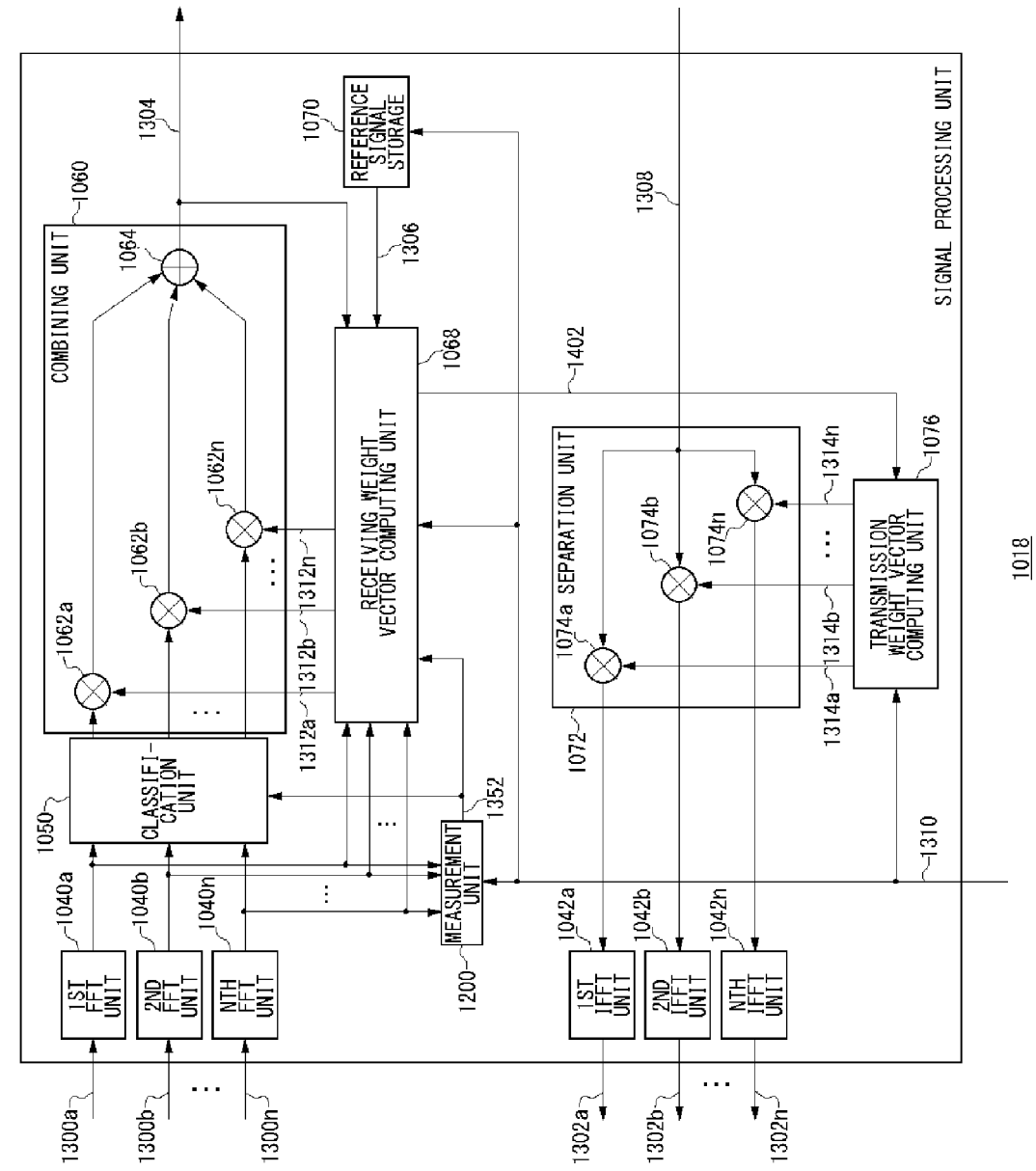
FIG. 14 illustrates a structure of a signal processing unit shown in FIG. 11.

FIG. 14 illustrates a structure of a signal processing unit 1018. The signal processing unit 1018 includes a first FFT unit 1040*a*, a second FFT unit 1040*b*, and an Nth FFT unit 1040*n*, which are generically referred to as "FFT unit 1040", a classification unit 1050, a combining unit 1060, a receiving weight vector computing unit 1068, a reference signal storage 1070, a measurement unit 1200, a separation unit 1072, a transmission weight vector computing unit 1076, and a first IFFT unit 1042*a*, a second IFFT unit 1042*b*, . . . and an Nth IFFT unit 1042*n*, which are generically referred to as "IFFT unit 1042". The combining unit 1060 includes a first multiplier 1062*a*, a second multiplier 1062*b*, . . . and an Nth multiplier 1062*n*, which are generically referred to as "multiplier 1062", and an adder 1064. The separation unit 1072 includes a first multiplier 1074*a*, a second multiplier 1074*b*, . . . and an Nth multiplier 1074*n*, which are generically referred to as "multiplier 1074".

Signals involved include a reference signal 1306, an output receiving weight vector signal 1402, a first receiving weight vector signal 1312*a*, a second receiving weight vector signal 1312*b*, . . . and an Nth receiving weight vector signal 1312*n*, which are generically referred to as "receiving weight vector signal 1312", a first transmission weight vector signal 1314*a*, a second transmission weight vector signal 1314*b*, . . . and an Nth transmission weight vector signal 1314*n*, which are generically referred to as "transmission weight vector signal 1314", and a reference notification signal 1352.

The FFT unit 1040 performs FFT on the inputted digital received signal 1300. That is, the FFT unit 1040 converts a time-domain signal into a frequency-domain signal. Here, the signal converted to the frequency domain is also indicated as the digital received signal 1300. Also, the digital received signal 1300 which has been converted to the frequency domain is structured as shown in FIG. 12.

The measurement unit 1200 measures the received power of a plurality of digital received signals 1300 in a training signal period, respectively, and selects a digital received signal 1300 having the maximum received power as a reference signal. As described earlier, the digital received signal 1300 other than the reference signal are taken as the signals to be processed. That is, the measurement unit 1200 determines the reference signal according to the measured signal strength. Here, a digital received signal 1300 is constructed by a plurality of subcarriers as shown in FIG. 1 and the measurement unit 1200 measures the total value of the received power in a plurality of subcarriers, as the received power for each digital received signal 1300. Information on the selected reference signal is outputted as the reference notification signal 1352. Here, the recognition during a training signal period is done by the signal processor control signal 1310.

The classification unit 1050 classifies the digital receives signals 1300 by interchanging the order of the digital received signals 1300 based on the reference notification signal 1352 after a training signal period has ended. More specifically, an arrangement is such that the digital received signal 1300 which will be the reference signal is inputted to the first multiplier 1062a of the multipliers 1062 described later. That is, the digital received signals 1300 are rearranged so that the above-described reference signal is outputted to a predetermined multiplier 1062. On the other hand, the classification unit 1050 may not interchange the order of the inputted digital received signals 1300 during the training signal period, or the order of the digital received signals 1300 may be interchanged based on the reference notification signal 1352 at a previous burst signal. Here, the classification is done on the digital received signals 1300 per basestation antenna 1014.

In the multiplier 1062, the combining unit 1060 weights the digital received signal 1300 with the receiving weight vector signal 1312 for each of the basestation antennas 1014 and for each subcarrier, and then adds up the result thereof by the adder 1064 so as to output a composite signal 1304. Note that the first receiving weight vector signal 1312a inputted to the first multiplier 1062a corresponds to the above-described reference receiving weight vector and the rest of the receiving weight vector signals 1312 correspond to the above-described receiving weight vectors to be processed. The multiplication in each multiplier 1062 is done per subcarrier. The reference signal storage 1070 outputs a known training signal stored beforehand during the training signal period, as the reference signal 1306.

The receiving weight vector computing unit 1068 computes the receiving weight vector signal 1312 from the digital received signal 1300, the composite signal 1304 and the reference signal 1306, over a training signal period, for each of the basestation antennas 1014 and for each subcarrier by using an adaptive algorithm such as RLS algorithm or LMS algorithm. After the training signal period has ended, the receiving weight vector computing unit 1068 updates the receiving weight vector signal 1312 by using the pilot signal contained in the digital received signals 1300. A method for updating it will be discussed later in detail. The receiving weight vector computing unit 1068 outputs the receiving weight vector signal 1312 as the output receiving weight vector signal 1402, as well.

Based on the output receiving weight vector signal 1402, the transmission weight vector computing unit 1076 derives a transmission weight vector signal 1314 necessary for weighting the pre-separation signal 1308, for each basestation antenna 1014 and for each subcarrier. To simplify the processing, the receiving weight vector signal 1312 and the transmission weight vector signal 1314 may be identical to each other. In the multipliers 1074 the separation unit 1072 weights the pre-separation signal 1308 with the transmission weight vector signal 1314, for each basestation antenna 1014 and for each subcarrier and then outputs the weighted pre-separation signal as a digital transmitted signal 1302. The IFFT unit 1042 performs IFFT on the digital transmitted signal 1302 outputted from the multipliers 1074. That is, the IFFT unit 1042 converts a frequency-domain signal into a time-domain signal. Here, the signal which has been converted to the time domain is represented by the digital transmitted signal 1302, too.

Figure 15:
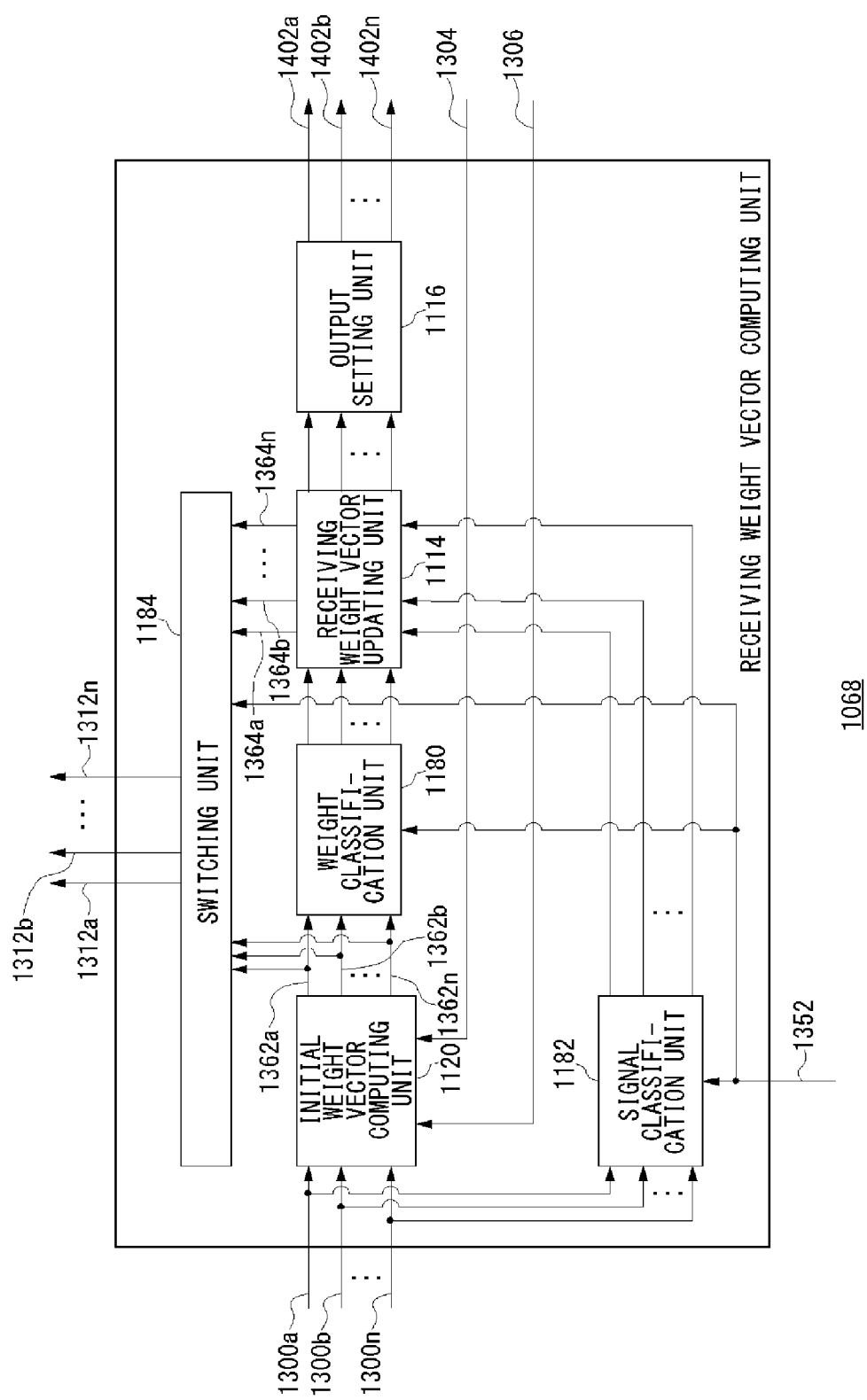
FIG. 15 illustrates a structure of a receiving weight vector computing unit shown in FIG. 14.

FIG. 15 illustrates a structure of the receiving weight vector computing unit 1068. The receiving weight vector computing unit 1068 includes a receiving weight vector updating unit 1114, an output setting unit 1116, an initial weight vector computing unit 1120, a weight classification unit 1180, a signal classification unit 1182, and a switching unit 1184. Signals involved include a first initial weight vector signal 1362a, a second initial weight vector signal 1362b, . . . and an Nth initial weight vector signal 1362n, which are generically referred to as "initial weight vector signal 1362", a first update weight vector signal 1364a, a second update weight vector signal 1364b, . . . and an Nth update weight vector signal 1364n, which are generically referred to as "update weight vector signal 1364", and a first output receiving weight vector signal 1402a, a second output receiving weight vector signal 1402b, . . . and an Nth output receiving weight vector signal 1402n, which are generically referred to as "output receiving weight vector signal 1402".

During a training signal period, the initial weight vector computing unit 1120 computes the initial weight vector signal 1362 from the digital received signal 1300, the composite signal 1304 and the reference signal 1306 by use of the above-mentioned adaptive algorithm, for each basestation antenna 1014 and for each subcarrier. Note that since the initial weight vector computing unit 1120 executes the adaptive algorithm during the training signal period also, the initial weight vector signal 1362 is outputted.

At the time when the training signal period ends, the weight classification unit 1180 selects an initial weight vector signal 1362 corresponding to the reference signal from among the initial weight vector signals 1362, according to the content of the reference notification signal 1352. Hereinafter, the initial weight vector signal 1362 corresponding to the reference signal will be referred to as "reference initial weight vector", whereas the initial weight vector signals 1362 corresponding to the signals to be processed will be referred to as "processing initial weight vector". The weight classification unit 1180 outputs the reference initial weight vector to the receiving weight vector updating unit 1114 as a first initial weight vector signal 1362a. Further, the weight classification unit 1180 outputs the processing initial weight vector to the receiving weight vector updating unit 1114 as a second initial weight vector signal 1362b through an Nth initial weight vector signal 1362.

At the time when the training signal period ends, the signal classification unit 1182 selects the reference signal from among the digital received signals 1300, according to the content of the reference notification signal 1352. The signal classification unit 1182 outputs the reference signal to the receiving weight vector updating unit 1114 as a first digital received signal 1300a. Further, the signal classification unit 1182 outputs the processing signals to the receiving weight vector updating unit 1114 as a second digital received signal 1300b through an Nth digital received signal 1300n.

After the end of a training signal period the receiving weight vector updating unit 1114 updates the receiving weight vector signals 1312 per basestation antenna 1014 wherein the initial weight vector signals 1362 serve as initial values. In other words, the updating with the identical correction value is performed on a plurality of receiving weight vector signals 1312 corresponding to the identical basestation antenna 1014. The detailed processing of the receiving weight vector updating unit 1114 will be described later.

The output setting unit 1116 outputs the receiving weight vector signal 1312 as the output receiving weight vector signal 1402. The output setting unit 1116 may continuously output the output receiving weight vector signals 1402 or output an output receiving weight vector signal 1402 at one particular instant, for example, the receiving weight vector signal 1312 at the instant when a packet signal ends.

In a training signal period, the switching unit 1184 receives the input of the initial weight vector signal 1362, and outputs the inputted initial weight vector signal 1362 as a receiving weight vector signal 1312. After the training signal periods has ended, the switching unit 1184 receives the input of the update weight vector signal 1364 and outputs the inputted update weight vector signal 1364 as a receiving weight vector signal 1312.

Figure 16:
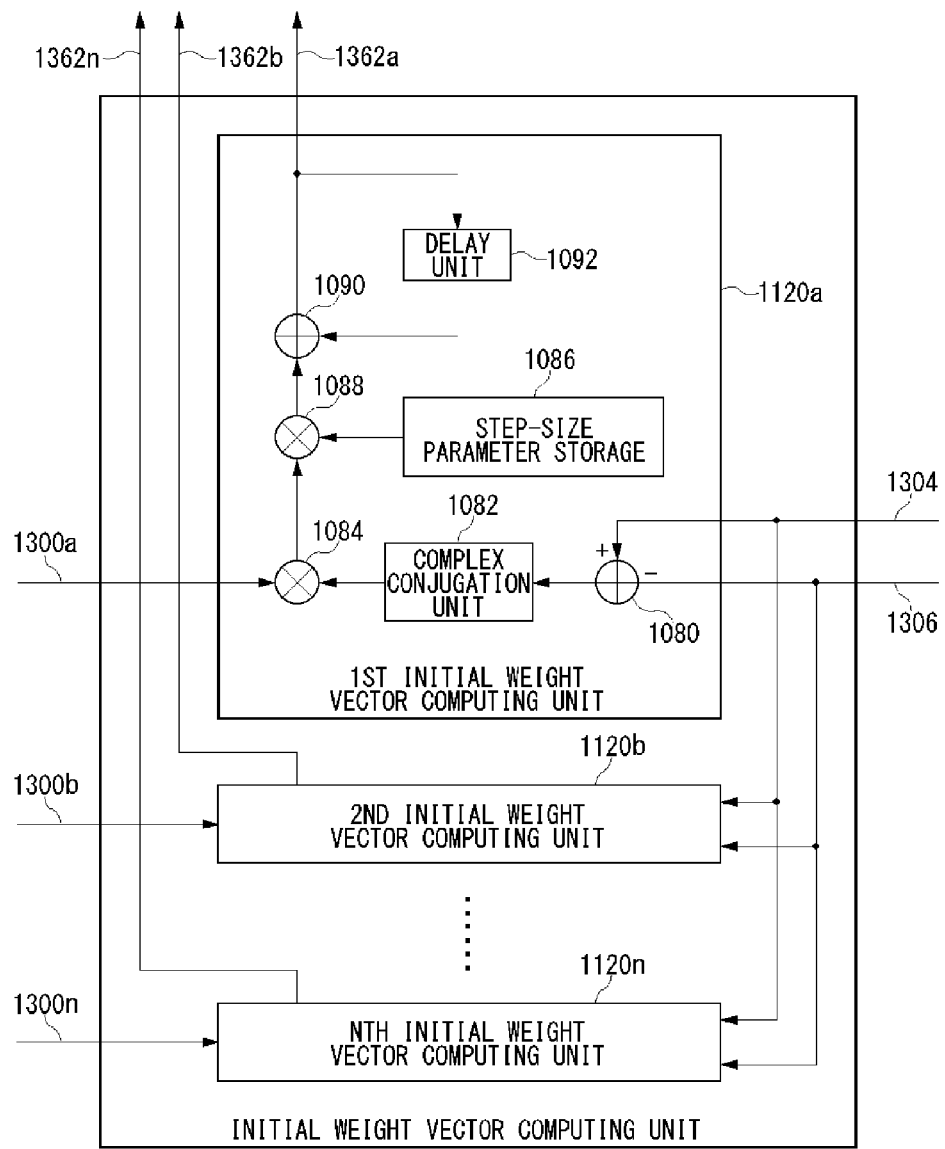
FIG. 16 illustrates a structure of an initial weight vector computing unit shown in FIG. 15.

FIG. 16 illustrates a structure of the initial weight vector computing unit 1120. The initial weight vector computing unit 1120 includes a first initial weight vector computing unit 1120*a*, a second initial weight vector computing unit 1120*b*, . . . and an Nth initial weight vector computing unit 1120*n*. The initial weight vector computing unit 1120*a* includes an adder 1080, a complex conjugation unit 1082, a multiplier 1084, a step-size parameter storage 1086, a multiplier 1088, an adder 1090, and a delay unit 1092. The second initial weight vector computing unit 1120*b* to the Nth initial weight vector computing unit 1120*n* are configured the same way as the first initial weight vector computing unit 1120*a*.

The adder 1080 computes a difference between the composite signal 1304 and the reference signal 1306, and outputs this difference as an error signal. This error signal is complex-conjugated by the complex conjugation unit 1082. The multiplier 1084 multiplies the first digital received signal 1300*a* by the error signal so as to generate a multiplication result.

The multiplier 1088 multiplies a step-size parameter stored in the step-size parameter storage 1086, by the first multiplication result so as to generate a second multiplication result. After the second multiplication result has been fed back by the delay unit 1092 and the adder 1090, this fed-back second multiplication result is added up with a new second multiplication result. By using such an algorithm as an LMS algorithm, the successively updated addition results are outputted as the first receiving weight vector signal 1312*a*. Note that the above-described processing is performed on a subcarrier-by-subcarrier basis.

Figure 17:
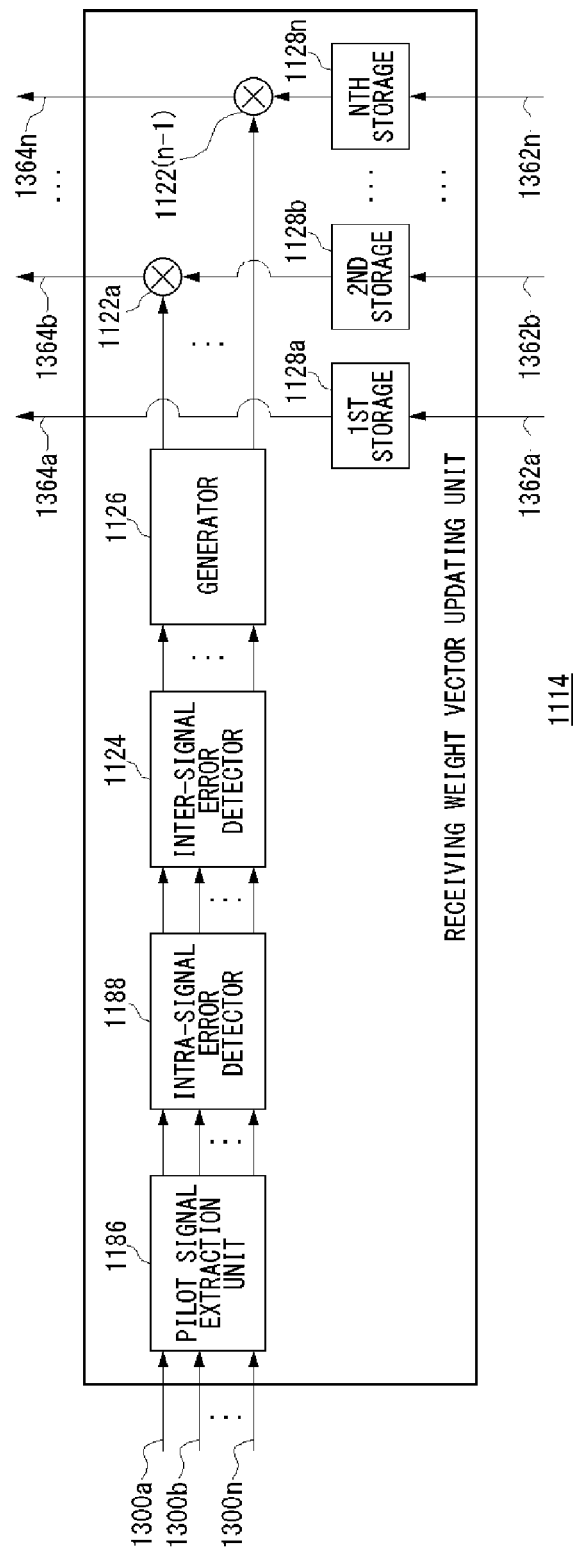
FIG. 17 illustrates a structure of a receiving weight vector updating unit shown in FIG. 15.

FIG. 17 illustrates a structure of the receiving weight vector updating unit 1114. The receiving weight vector updating unit 1114 includes a pilot signal extraction unit 1186, an intrasignal error detector 1188, a first multiplier 1122*a*, . . . and an (N−1)th multiplier 1122(n−1), which are generically referred to as "multiplier 1122, an intersignal error detector 1124, a generator 1126, a first storage 1128*a*, a second storage 1128*b*, . . . and an Nth storage 1128*n*, which are generically referred to as "storage 1128".

The pilot signal extraction unit 1186 extracts pilot signals contained in the digital received signal 1300. For example, since the first digital received signal 1300*a* is constructed as shown in FIG. 12, the pilot signal extraction unit 1186 extracts values contained in the subcarrier numbers "7", "21", "−21" and "−7" for a predetermined OFDM symbol. The similar processing is performed on the OFDM symbol based on this extraction. Further, the pilot signal extraction unit 1186 performs the above processing on the second digital received signal 1300*b* to the Nth digital received signal 1300 as well. That is, the pilot signal extraction unit 1186 extracts pilot signals for each basestation antenna 1014. The pilot signal extraction unit 1186 outputs the extracted pilot signal to the intrasignal error detector 1188.

The intrasignal error detector 1188 detects phase error in the digital received signal 1300, from the pilot signals extracted by the pilot signal extraction unit 1186, per subcarrier. As described earlier, the pilot signal assigned to a subcarrier has a pattern such that the pattern has the identical value in a cycle of four OFDM symbols. Thus, the intrasignal error detector 1188 detects phase errors at intervals of 4 OFDM symbols for the pilot signal assigned to, for example, the subcarrier number "7" of the first digital received signal 1300*a*. Also, the phase error is divided by time to represent a value in unit time.

The error is detected by complex multiplication between a complex-conjugated value of a pilot signal before 4 OFDM symbols and a value of the current pilot signal. The intrasignal error detector 1188 performs the similar processing on the pilot signals assigned to the other subcarriers, so that four phase errors are successively detected for each digital received signal 1300. The intrasignal error detector 1188 performs the similar processing on the other digital received signals 1300 as well.

The intersignal error detector 1124 computes a difference of the phase errors in the signals to be processed against the phase error in the reference signal. That is, the differences of the phase errors of the second digital received signal 1300*b* to the Nth digital received signal 1300*n* against the phase error of the first digital received signal 1300*a* are calculated per basestation antenna 1014. Here, the calculation of the difference of phase error per basestation antenna 1014 is done in a manner, for example, that the difference of phase error is derived for each of four subcarriers corresponding to the second basestation antenna 1014*b* and then those differences are accumulated. Here, the four subcarriers mean the subcarriers to which the pilot signal is assigned. Note that the calculation of difference may be done by an operation using phase values or by vector operation.

The generator 1126 generates correction values from the difference values calculated by the intersignal error detector 1124 per basestation antenna 1014. The correction values are so generated as to correspond to the second basestation antenna 1014*b* to the Nth basestation antenna 1014*n*. More specifically, the correction values are generated in a manner that the phase corresponding to each difference value rotates in the opposite direction. For example, when a difference value is "x degrees", the correction value is "−x degrees".

The multiplier 1122 updates the initial weight vector signal 1362 stored in the storage 1128 by the correction value outputted from the generator 1126 and then outputs the update weight vector signal 1364. The initial weight vector signal 1362 which is to be processed by the multiplier 1122 is an "initial weight vector to be processed". Here, similar to the intersignal error detector 1124, the calculation by the multiplier 1122 may be done by an operation using phase values or may be done by vector operation. If the calculation is done by the operation using phase values, the values of amplitude needs to be stored separately.

The storage 1128 stores the initial weight vector signal 1362 at the time when a training signal period ends, whereas the storage 1128 outputs the initial weight vector signal 1362 after the training signal period has ended. Here, as described above, the first initial weight vector signal 1362*a* serves as the reference initial weight vector.

Figure 18:
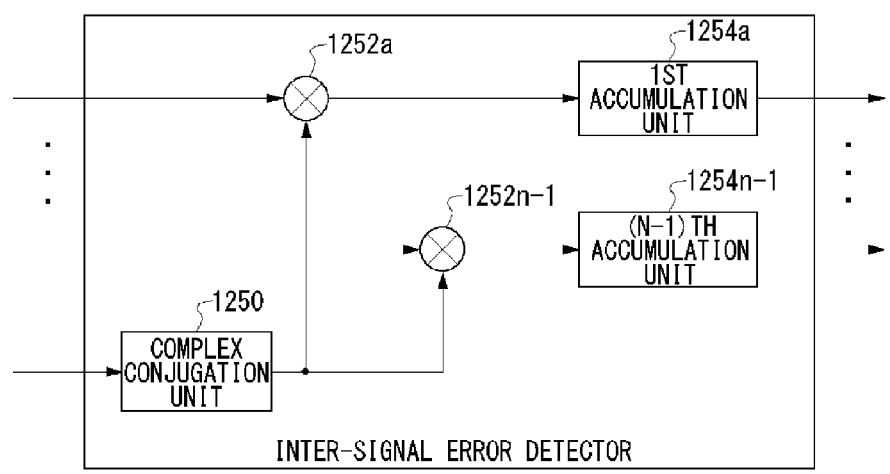
FIG. 18 illustrates a structure of the intersignal error detector shown in FIG. 17.

FIG. 18 illustrates a structure of the intersignal error detector 1124. The intersignal error detector 1124 includes a complex conjugation unit 1250, a first multiplier 1252*a*, . . . and an (N−1)th multiplier 1252*n*−1, which are generically referred to as "multiplier 1252", and a first accumulation unit 1254*a*, . . . and (N−1)th accumulation unit 1254*n*−1, which are generically referred to as "accumulation unit 1254" or "summation unit 1254".

The complex conjugation unit 1250 inputs a phase error value and derives the complex conjugation thereof. This is equivalent to deriving the complex conjugation of the reference signal. Note that if the phase error value is not vector-valued but represented as a phase value, the complex conjugation unit 1250 will invert the sign of the phase error value. The multiplier 1252 multiplies together the phase error value whose complex conjugation has been derived and a phase error value corresponding to the signal to be processed. This multiplication is equivalent to deriving a difference between the phase error corresponding to the reference signal and the phase error corresponding to the signal to be processed. The multiplication in the multiplier 1252 is executed in the order of subcarrier numbers shown in FIG. 12. Since the pilot signals are to be processed here, the multiplication is executed in the order of subcarrier numbers "7", "21", "−7" and "−21".

The accumulation unit 1254 accumulates the multiplication results of the multipliers 1252 across one OFDM symbol period. That is, the accumulation unit 1254 accumulates the differences between the phase error in the reference signal and the signals to be processed, over one OFDM symbol period. If the phase error values are expressed as a vector value, the accumulation will be executed in the accumulation unit 1254; and if the phase error values are represented by phase values, the accumulation unit 1254 will perform averaging processing. Such processings are equivalent to the averaging of phase errors in a plurality of subcarriers as in one OFDM symbol. Thus, the effect of noise can be reduced. The processing in the accumulation unit 1254 is expressed by the following Equation (6).

$$\Delta\theta_i = \arctan\left(\sum_j E_{ij}\right) \quad (6)$$

In Equation (6), $E_{ij}$ is a phase error corresponding to an Ith basestation antenna 1014$i$ and a subcarrier number j and $E_{ij}$ is represented as a vector value. $\Delta\theta_i$ is an accumulated value of phase error corresponding to the Ith basestation antenna 1014$i$. Though $\Delta\theta_i$ is indicated as a phase value but may be a vector value. A not-shown generator 1126 receives $\Delta\theta_i$ and derives $-\Delta\theta_i$ as a correction value. If $\Delta\theta_i$ is vector-valued, the generator 1126 may derive a complex conjugate thereof.

An operation of the base station apparatus 1034 structured as above will now be described. The multicarrier signals received by the basestation antennas 1014 are subjected to quadrature detection by their respective frequency oscillators 1166 which have different frequency offsets. The quadrature-detected signals become digital received signals 1300 through digital conversion. In the training signal period of a received packet signal, the initial weight vector computing unit 1120 computes initial weight vector signals 1362 which contain components for each basestation antenna 1014 and for each subcarrier, based on an adaptive algorithm. The measurement unit 1200 measures the powers of the digital received signals 1300 for each basestation antenna 1014, and performs control so that the digital received signal 1300 with the largest electric power becomes the reference signal.

After the end of a training signal period, the receiving weight vector updating unit 1114 derives the correction value for each basestation antenna 1014, utilizing the periodicity of the pilot signal contained in the digital received signals 1300. And the receiving weight vector updating unit 1114 updates the update weight vector signal 1364 with the correction value. Also, the combining unit 1060 combines them by weighting the digital received signal 1300 with the receiving weight vector signal 1312 and then outputs the composite signal 1304.

A modification of the present embodiment is now described hereinbelow. Although the communication system 1100 is assumed to be a legacy system in this embodiment of the present invention, the communication system 1100 in this modification of the present embodiment is assumed to be a MIMO system instead of the legacy system. A packet signal in the MIMO system is constituted by a plurality of streams. In order to be compatible with this, the terminal apparatus 1010 is therefore provided with a plurality of terminal antennas 1016, a plurality of radio units 1030, and a plurality of modem units 1028. Also, the base station apparatus 1034 includes a plurality of signal processing units 1018 and a plurality of modem units 1020. In such a structure, the terminal apparatus 1010 and the base station apparatus 1034 process a plurality of streams in parallel. A description is first given of the packet signal in a case when the MIMO system is applied.

FIGS. 19A to 19C illustrate packet formats according to a modification of the present embodiment. FIG. 19A represents a case where the number of streams is "4", FIG. 19B a case where the number of streams is "3", and FIG. 19C a case where the number of streams is "2". In FIG. 19A, data contained in four streams are to be transmitted, and the packet formats corresponding to the first to fourth streams are shown in order from the top to the bottom level.

In a packet signal corresponding to the first stream, "L-STF", "HT-LTF" and the like are assigned as preamble signals. "L-STF", "L-LTF", "L-SIG" and "HT-SIG" correspond to a known signal for AGC setting, a known signal for channel estimation and a control signal compatible with a legacy system, and a control signal compatible with a MIMO system, respectively. The control signal compatible with a MIMO system contains information on the number of streams or a destination of a data signal, for example. "HT-STF" and "HT-LTF" corresponds to a known signal for AGC setting and a known signal for channel estimation compatible with a MIMO system, respectively. The above-described training signal corresponds to any of "L-STF", "HT-LTF", "HT-STF" and "HT-LTF" or an arbitrary combination thereof. On the other hand, "Data 1" is a data signal. Note that L-LTF and HT-LTF are used not only for AGC setting but also for timing setting.

In the packet signal corresponding to the second stream, "L-STF(−50 ns)", "HT-LTF(−400 ns)" and the like are assigned as preamble signals. And, in the packet signal corresponding to the third stream, "L-STF(−100 ns)", "HT-LTF(−200 ns)" and the like are assigned as preamble signals. And, in the packet signal corresponding to the fourth stream, "L-STF(−150 ns)", "HT-LTF(−600 ns)" and the like are assigned as preamble signals.

Here, "−400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, "L-STF(−50 ns)" is "L-STF" given a cyclic timing shift by a delay of −50 ns. Note that L-STF and HT-STF are each constructed by a repetition of an 800 ns duration and that the other parts such as HT-LTF and the like are each constituted by a repetition of a 3.2 μs duration. It is also to be noted that "DATA 1" to "DATA 4" also undergo the CDD and the amounts of timing shift are of the same values as those for HT-LTFs assigned anterior thereto.

In the first stream, HT-LTFs are assigned in the order of "HT-LTF", "−HT-LTF", "HT-LTF" and "−HT-LTF" from the top. Here, these in this order are called "a first component", "a second component", "a third component" and "a fourth component" in all the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. The receiving apparatus extracts a desired signal for the third stream by computing "first component−second component−third component+fourth component" for received signals of all the streams. The receiving apparatus extracts a desired signal for the fourth stream by computing "first component+second component−third component−fourth component" for received signals of all the streams. These are equivalent to the fact that the orthogonality relation holds for a combination of signs of predetermined components, among the streams. Note that the addition and subtraction processing is done by vector operation.

As with a legacy system, "52" subcarriers are used for the part from "L-LTF" to "HT-SIG" and so forth. Note that "4" subcarriers out of the "52" subcarriers correspond to pilot signals. On the other hand, the part of "HT-LTF" or the like and thereafter uses "56" subcarriers.

In FIG. 19A, the sign of "HT-LTF" is defined as follows. The signs are arranged in order from the top of the first stream as "+ (plus)", "− (minus)", "+" and "−"; the signs are arranged in order from the top of the second stream as "+", "+", "+" and "+"; the signs are arranged in order from the top of the third stream as "+" "−" a "−" and "+"; and the signs are arranged in order from the top of the fourth stream as "+", "+", "−" and "−". However, the signs may be defied as follows. The signs are arranged in order from the top of the first stream as "+", "−", "+" and "+"; the signs are arranged in order from the top of the second stream as "+", "+", "−" and "+"; the signs are arranged in order from the top of the third stream as "+", "+", "+" and "−"; and the signs are arranged in order from the top of the fourth stream as "−", "+", "+" and "+". In such signs, too, the orthogonal relationship holds in the combination of signs of predetermined components.

FIG. 19B corresponds to the first to the third stream of FIG. 19A. FIG. 19C is similar to the first stream and second stream of the packet formats shown in FIG. 19A. Here, the assignment of "HT-LTFs" in FIG. 19C differs from that of "HT-LTFs" in FIG. 19A. That is, only the first components and the second components of HT-LTFs are contained. In the first stream, HT-LTFs are assigned in the order of "HT-LTF" and "HT-LTF" from the top thereof, whereas in the second stream, HT-LTFs are assigned in the order of "HT-LTF" and "−HT-LTF" from the top thereof. A receiving apparatus extracts a desired signal for the first stream by computing "first component+second component" for received signals of all the streams. Also, the receiving apparatus extracts a desired signal for the second stream by computing "first component−second component" for received signals of all the streams. As described above, the orthogonal relationship also holds between these.

Figure 20:
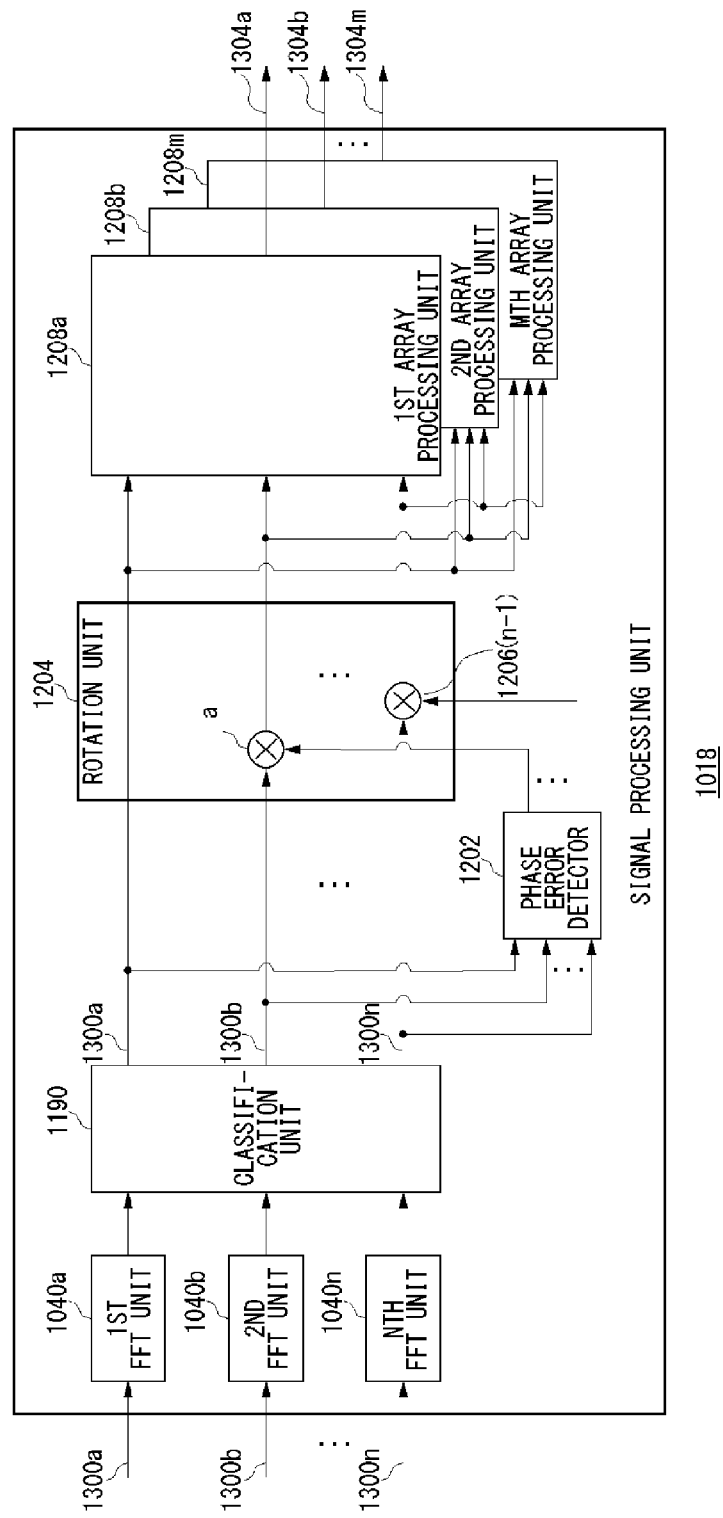
FIG. 20 illustrates a structure of a signal processing unit according to a modification of an exemplary embodiment.

The structure of the base station apparatus 1034 according to the modification is of the same type as with FIG. 11 and therefore the repeated explanation is omitted here. FIG. 20 illustrates a structure of a signal processing unit 1018 according to the modification of the present embodiment. The signal processing unit 1018 includes a first FFT unit 1040a, a second FFT unit 1040b, . . . and an Nth FFT unit 1040n, which are generically referred to as "FFT unit 1040", a classification unit 1190, a phase error detector 1202, a rotation unit 1204, and a first array processing unit 1208a, a second array processing unit 1208b, . . . and and an Mth array processing unit 1208m, which are generically referred to as "array processing unit 1208". The rotation unit 1204 includes a first multiplier 1206a, and an (N−1)th multiplier 1206(n−1), which are generically referred to as "multiplier 1206". Signals involved include a first composite signal 1304a, a second composite signal 1304b, . . . and an Mth composite signal 1304m, which are generically referred to as "composite signal 1304". Note that FIG. 20 shows a part that involves the receiving processing in the signal processing unit 1018.

The signal processing unit 1018 receives the input of digital received signals 1300 corresponding respectively to a plurality of the basestation antennas 1014 wherein the digital received signals 1300 are composed of a plurality of streams as shown in FIGS. 19A to 19C. In the digital received signals 1300, pilot signals are contained in predetermined subcarriers, and the pilot signal is formed by repeating a predetermined pattern in a cycle of four OFDM symbols. The FFT units 1040 and the classification unit 1190 correspond to the FFT units 1040 and the classification unit 1190 shown in FIG. 14, respectively. The classification unit 1190 outputs the reference signal as the first digital received signal 1300.

Using the pilot signals contained in the digital received signals 1300, the phase error detector 1202 derives the phase rotation amounts for the digital received signals 1300 per basestation antenna 10104. In other words, one phase rotation amount is derived for one digital received signal 1300. The structure of the phase error detector 1202 is similar to those of the pilot signal extraction unit 1186, the intrasignal error detector 1188, the intersignal error detector 1124 and the generator 1126 shown in FIG. 17. Since a digital received signal 1300 is composed of a plurality of streams, the demodulation requires the separation of the digital received signal 1300 per stream.

Using the repetition of a pattern periodically regardless of the number of streams, the phase error detector 1202 derives the phase rotation amounts at intervals of 4 OFDM symbols, per basestation antenna 1014. Hence, the phase rotation amounts are derived before separation into a plurality of streams. Similar to the above exemplary embodiment, the phase rotation amount corresponds to the difference of phase errors in the signals to be processed against the phase error in the reference signal.

The multiplier 1206 rotates the phase of the digital received signal 1300 according to the phase rotation amount in a manner that the phase rotation amount derived by the phase error detector 1202 per basestation antenna 1014 is associated, per basestation antenna 1014, with the digital received signal 1300. In the previous exemplary embodiment, the update weight vector signal 1364 is updated using the derived phase rotation amount but in the present exemplary embodiment the phase of digital received signal 1300 is rotated using the derived phase rotation amount. With this processing, the correction of phase rotation by the interantenna frequency offset error and the adaptive array signal processing are executed as two separate processings.

The array processing unit 1208 weights a not-shown receiving weight vector formed by components, per subcarrier, corresponding respectively to a plurality of basestation antennas 1014 and a plurality of streams, for each basestation antenna 1014, for each subcarrier and for each stream, and then combines the weighting results for each subcarrier and for each stream. The structure of the first array processing unit 1208a is similar to those of the receiving weight vector computing unit 1068 and the combining unit 1060 shown in FIG. 14. In so doing, the receiving weight vector signal 1312 is outputted from the initial weight vector computing unit 1120 which is included in the receiving weight vector computing unit 1068. The first composite signal 1304a outputted from the first array processing unit 1208a corresponds to a stream. The similar processing is executed in the other array processing units 1208 as well.

According to the exemplary embodiment of the present invention, the phase rotation amount is derived by using the pilot signal which is formed by repeating a periodic pattern. Thus, the interantenna frequency offset error can be corrected without relying on the derivation of the receiving weight vector. One phase rotation amount is derived from the phase rotation amounts derived in a plurality of pilot signals, so that the effect of noise can be reduced. Since the phase rotation amount is derived without relying on the derivation of the receiving weight vector, the receiving weight vector can be derived regardless of the accuracy of the receiving weight vector. Since it is only necessary to rotate a receiving weight vector using the derived phase rotation amount, a simplified processing can be achieved. The interantenna frequency offset error is corrected in such a manner as to maintain the phase relationship. Thus, the adverse factor in the characteristics in the adaptive array signal processing can be suppressed.

The phase rotation amount is derived using the pilot signals formed by the repetition of a predetermined pattern. Thus the interantenna frequency offset error can be corrected before separating a plurality of streams by the weight vector. As soon as the phase rotation amount has been derived, this phase rotation amount is corrected, so that the processing delay can be restricted. Since the interantenna frequency offset error is corrected before executing the adaptive array signal processing, the effect of the interantenna frequency offset error in the adaptive array signal processing can be reduced. The difference of phase error is derived by combining or averaging a plurality of components per basestation antenna, so that the effect of noise can be reduced. Since the deviation in the phase components can be corrected, the effect of the interantenna frequency offset error can be reduced.

When the digital received signal composed of a plurality of streams is received, in order to derive the phase rotation amount in the conventional practice it is required that the pilot signals be extracted by adaptive array signal processing after the separation into a plurality of streams. That is, the adaptive array signal processing must be performed at a previous stage. However, if the interantenna frequency offset error is present among signals corresponding to a plurality of basestation antennas, error contained the receiving weight vector necessary for the adaptive signal processing will increase and thus the receiving characteristics due to the adaptive array signal processing will degrade. As a result, error contained in the extracted pilot signals increases as well and therefore the correction accuracy in interantenna frequency offset error deteriorates. In contrast thereto, according to the exemplary embodiment, the interantenna frequency offset error is derived before executing the adaptive array signal processing, so that the deterioration of correction accuracy in interantenna frequency offset error can be prevented.

The present invention has been described based on the exemplary embodiments. These embodiments are merely exemplary, and it is understood by those skilled in the art that various modifications to the combination of each component and process thereof are possible and that such modifications are also within the scope of the present invention.

In the exemplary embodiment, the receiving weight vector computing unit 1068 uses an adaptive algorithm in order to estimate the receiving weight vector signal 1312. However, this should not be considered as limiting and, for example, processings other than adaptive algorithms may be executed in the receiving weight vector computing unit 1068 and the receiving weight vector computing unit 1068 may obtain the receiving weight vector signal 1312 by performing correlation processing with known signals. Also, an arrival direction estimation may be executed using MUSIC (MUltiple SIgnal Classification) algorithm or the like which differs from the adaptive algorithms and the correlation processing. According to this modification, desired waves and undesired waves can be identified in more detailed manner. This and other modifications may be acceptable as long as a plurality of received signals are separated in the signal processing with an adaptive array antenna.

In the exemplary embodiment, the communication system 1100 is applied to the CSMA-based communication system 1100. This should not be considered as limiting and, for example, the base station apparatus 1034 may be applied to a communication system other than the CSMA. The example of such a communication system other than the CSMA includes TDMA (Time Division Multiple Access), CDMA (Code Division Multiple Access), SDMA (Space Division Multiple Access) and the like. According to this modification, the present embodiment can be applied to various communication systems. That is, it suffices if the base station apparatus 1034 is a base station apparatus that receives signals from the terminal apparatus 1010.

In the exemplary embodiment, a description has been given of the base station apparatus 1034 but this is not limited thereto, and the description may be applied to the terminal apparatus 1010. In such a case, the terminal apparatus 1010 will be structured the same way as the base station apparatus 1034. Also, the description is not limited to the terminal apparatus 1010 and the base station apparatus 1034 but may be applied to a radio apparatus in general. According to this modification, the present embodiment is applicable to various types of radio apparatuses.

In the exemplary embodiment, in order to derive the difference of the phase error per basestation antenna 1014, the intersignal error detector 1124 accumulates the differences of phase errors corresponding respectively to a plurality of pilot signals over one OFDM symbol. However, this is not limited thereto and, for example, the intersignal error detector 1124 may do the accumulation while performing the weighting. For this weighting, the magnitude of components of the receiving weight vector signals 1312 in the basestation antenna 1014 and subcarriers corresponding to the differences of the phase errors are used. As the magnitude of components of the receiving weight vector signal 1312 becomes larger, the magnitude of the digital received signal 1300 to be multiplied by said component will be smaller. This is also equivalent to the reduced reliability of the differences of the phase errors. Accordingly, if the magnitude of components of the receiving weight vector signal 1312 is large, the differences of the phase errors are accumulated while the weighting is kept small. A phase error $E_{ij'}$ which has been weighted for the Ith basestation antenna 1014i and the subcarrier number j is expressed as follows.

$$E_{ij'} = \frac{E_{ij}}{|W_{ij}^H \cdot W_{ij}|} \quad (7)$$

where $w_{ij}$ is a component corresponding to the Ith basestation antenna 14i and the subcarrier number j in a receiving weight vector. As described earlier, "j" takes values of "7", "21", "−21" and "−7". Based on the weighted phase error $E_{ij'}$, $\Delta\theta_i$ is derived as follows.

$$\Delta\theta_i = \arctan\left(\sum_j E_{ij'}\right) \quad (8)$$

Note that even if the weighting operation is not executed, the intersignal error detector 1124 will monitor the magnitude of components of the receiving weight vector signal 1312. And if the magnitude of components of the receiving weight vector signal 1312 becomes larger than a threshold value, the difference of phase errors corresponding to the components of said receiving weight vector signal 1312 may be set aside from the accumulation. According to this modification, the effect of the differences of phase errors whose reliability is low is small, so that the accuracy of the accumulation can be enhanced. That is, it suffices if the effect of noise is reduced when the accumulation is executed.

In the exemplary embodiment, the intersignal error detector 1124 derives the differences of phase errors in the signals to be processed, against the phase error in the reference signal, and the radio unit 1012 derives the correction values as phase rotation amounts for the signals to be processed. That is, phase errors between the basestation antennas 1014 are derived. However, this should not be considered as limiting. For example, the intersignal error detector 1124 may not be provided at all, and the generator 1126 may derive the phase error amount per basestation antenna 1014 based on the phase error per basestation antenna 1014 derived by the intrasignal error detector 1188 so as to correct the phase rotation per basestation antenna 1014. In such a case, in the intrasignal error detector 1188 the phase error for the basestation antennas 1014 is derived by averaging processing or the like, based on the phase errors for a plurality of pilot signals. The above-described processing is also applicable to the above-described modifications. According to this modification, the frequency offset is corrected for each basestation antenna 1014, so that absolute frequency offsets can be corrected.

In the exemplary embodiment, the signal processing unit 1018 performs processing on the digital received signal 1300 formed by one stream, and rotates the phase of the receiving weight vector. In a modification, on the other hand, the signal processing unit 1018 performs processing on the digital received signal 1300 formed by a plurality of streams and rotates the phase of the digital received signal 1300. That is, the phase has been rotated before an operation by the receiving weight vector is executed. However, this should not be considered as limiting and, for example, any of the above processings may be combined together. That is, the signal processing unit 1018 may perform processing on the digital received signal 1300 formed by a plurality of streams and rotate the phase of the receiving weight vector.

Here, the initial weight vector signal 1362 which is to be phase-rotated by the multiplier 1122 is formed by components that correspond respectively to a plurality of streams. That is, as with the processing performed by the array processing unit 1208 of FIG. 20, the receiving weight vector signal 1312 is derived for each of a plurality of streams. On the other hand, the processings executed in the pilot signal extraction unit 1186, the intrasignal error detector 1188 and the intersignal error detector 1124 and the generator 1126 are similar to those described in the above exemplary embodiment. That is, regardless of the number of streams, they derive the phase rotation amounts in unit time for the digital received signal 1300, for each basestation antenna 1014. The combining unit 1060 weights the digital received signal 1300 with the receiving weight vector signal 1312 per basestation antenna 1014, per subcarrier and per stream and then combine them per subcarrier and per stream. According to this modification, although the multicarrier signal is formed by a plurality of streams, the phase rotation amounts can be derived without relying on the derivation of the receiving weight vectors. Hence, the phase rotation amounts can be derived before the separation of a plurality of streams.

Third Embodiment

Before describing the present invention in detail, an outline of the present invention will be described first. Still another exemplary embodiment of the present invention relates to a base station apparatus, to which a terminal apparatus is accessible, such as one used in a communication system like a wireless LAN (Local Area Network). An OFDM modulation scheme is used in the communication system. The base station apparatus according to the exemplary embodiment of the present invention is comprised of a plurality of antennas and local oscillators corresponding respectively to the plurality of antennas. The base station apparatus receives multicarrier signals received from a terminal apparatus to be communicated with, by a plurality of antennas, and the thus received multicarrier signals are subjected to quadrature detection by the local oscillator. Further, the base station apparatus computes weight factors from a plurality of quadrature-detected multicarriers, for each antenna and for each carrier. Hereinafter, a generic term for the thus computed weight factors or a set of weight factors in units of carrier is called "receiving weight vector" but no clear distinction will be made therebetween.

The base station apparatus performs an adaptive array signal processing on the received multicarrier signals by using the computed receiving weight vectors. Multicarrier signals from the terminal apparatus constitute a packet signal, and a known signal (also called "training signal") is assigned to a header portion of the packet signal. Subsequence to this training signal, a data signal is assigned. In a period where the training signal is contained in the received packet signal, the base station apparatus computes a receiving weight vector. The stability of frequency in a plurality of local oscillators is not high. Thus the respective frequencies are considered to have deviated from one another. As a result thereof, in a data signal period, a phase error is caused among a plurality of received signals.

While weighting the received multicarrier signals, the base station apparatus according to the exemplary embodiment performs array synthesis by the derived receiving weight vector. The base station apparatus derives channel characteristics from the received multicarrier signals and then derives receiving weight vectors from the derived channel characteristics. The base station apparatus determines the array combined signal and remodulates the determined signal by the channel characteristics. Based on the received multicarrier signal and remodulated signal, the base station apparatus derives the phase error for each of the antennas. The base station apparatus further derives the phase rotation amounts based on the phase errors and then updates the receiving weight vector by the phase rotation amounts.

Figure 21:
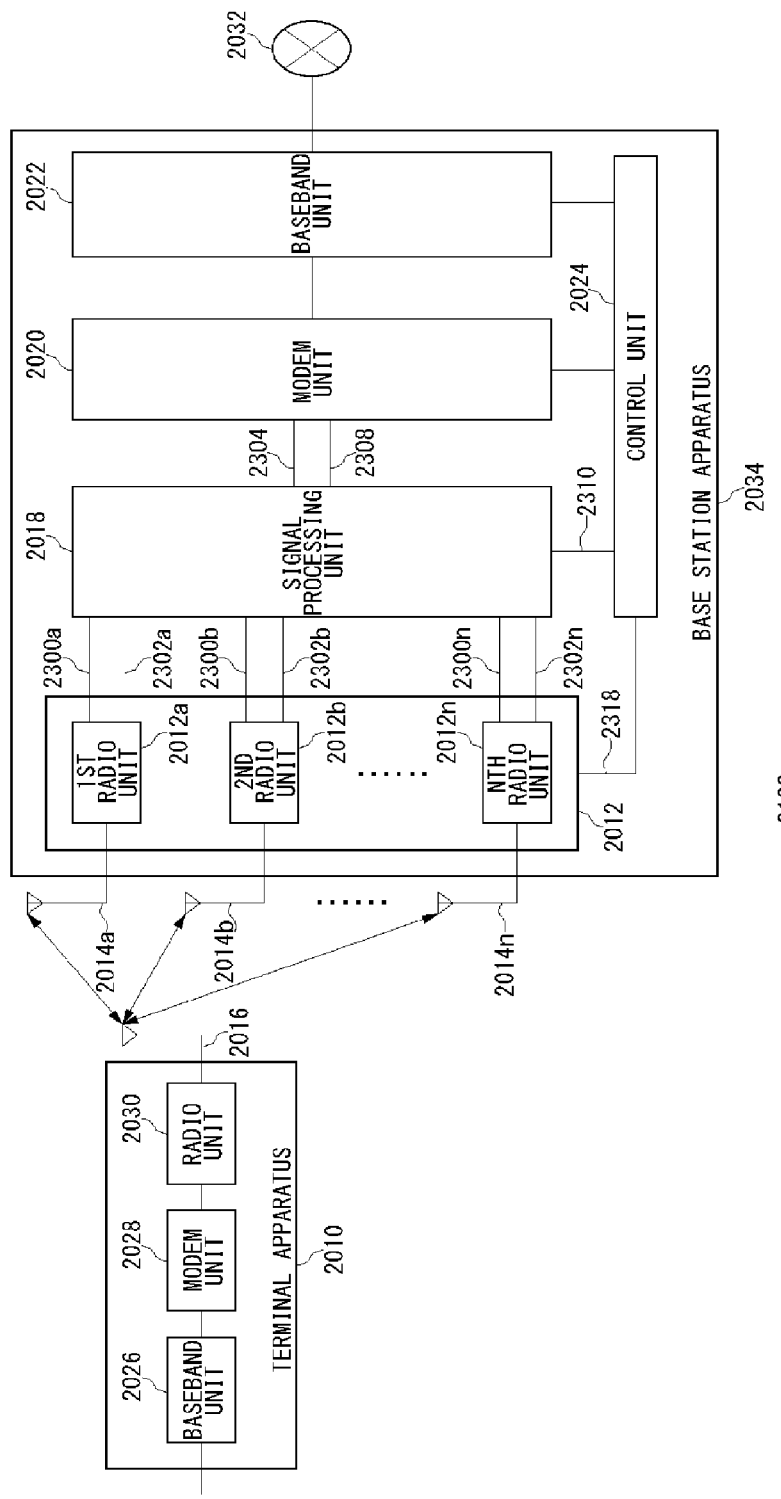
FIG. 21 illustrates a structure of a communication system according to a modification of an exemplary embodiment of the present invention.

FIG. 21 illustrates a structure of a communication system 2100 according to an embodiment of the present invention. The communication system 2100 includes a terminal apparatus 2010, a base station apparatus 2034, and a network 2032. The terminal apparatus 2010 includes a baseband unit 2026, a modem unit 2028, a radio unit 2030, and an antenna 2016 for use with the terminal (hereinafter referred to as "terminal antenna 2016" also). The base station apparatus 2034 includes a first basestation antenna 2014*a*, a second basestation antenna 2014*b*, . . . and an Nth basestation antenna 2014*n*, which are generically called "antenna 2014 for use with base station apparatus" or "basestation antenna 2014", a first radio unit 2012*a*, a second radio unit 2012*b*, . . . and an Nth radio unit 2012*n*, which are generically called "radio unit 2012", a signal processing unit 2018, a modem unit 2020, a baseband unit 2022 and a control unit 2024. Signals involved include a first digital received signal 2300*a*, a second digital received signal 2300*b*, . . . and an Nth digital received signal 2300*n*, which are generically called "digital received signal 2300", a first digital transmitted signal 2302*a*, a second digital transmitted signal 2302*b*, . . . and an Nth digital transmitted signal 2302*n*, which are generically called "digital transmitted signal 2302", a composite signal 2304, a pre-separation signal 2308, a signal processor control signal 2310 and a radio-unit control signal 2318.

The terminal apparatus 2010 is connected to the base station apparatus 2034, and performs communications with the base station apparatus 2034. The baseband unit 2026 is an interface with a PC connected to the terminal apparatus 2010 or with an application inside the terminal apparatus 2010, and performs receive/transmit processing of information signals which are to be transmitted in the communication system 2100. Error correction or automatic retransmission processing may also be carried out, but the description of such processings is omitted here. As a transmission processing, the modem unit 2028 executes mapping to the above-described BPSK or the like, IFFT (Inverse Fast Fourier Transform) and quadrature modulation so as to generate a transmission signal.

On the other hand, the modem unit 2028 performs quadrature detection, FFT and demodulation as a receiving processing and thereby reproduces the information signals transmitted from the base station apparatus 2034. Here, a signal outputted from the modem unit 2028 in the transmission processing and a signal inputted to the modem unit 2028 in the receiving processing constitute multicarrier signals as in an OFDM signal. The multicarrier signals constitute a packet signal. The radio unit 2030 performs frequency conversion processing. The radio unit 2030 also performs amplifying processing and A-D or D-A conversion processing. The radio unit 2030 receives and transmits radiofrequency signals from and to the base station apparatus 2034 via the terminal antenna 2016.

There are provided a plurality of basestation antennas 2014. Here, assume that the number of basestation antennas 2014 is N. As a receiving operation, the radio unit 2012 carries out frequency conversion of the radiofrequency multicarrier signals so as to derive baseband signals. As described above, the multicarrier signals constitute a packet signal, and training signals are contained contiguously in the header portion of the packet signal. Also, in the multicarrier signal, a pilot signal is contained in a predetermined subcarrier. The pilot signal is formed by repeating a predetermined pattern. Here, each of a plurality of multicarrier signals correspond to any of a plurality of basestation antennas 2014. Local oscillators corresponding respectively to a plurality of basestation antennas 2014 are contained in a plurality of radio units 2012. The radio unit 2012 performs frequency conversion on each of a plurality of multicarrier signals by a local signal outputted from the local oscillator.

The radio unit 2012 outputs the baseband signals to the signal processing unit 1018 as the digital received signals 2300. The baseband signal, which is composed of in-phase components and quadrature components, shall generally be transmitted by two signal lines. For the clarity of figure, the baseband signal is presented here by a single signal line only. An AGC (Automatic Gain Control) unit and an A-D conversion unit are also included.

As a transmission operation, the radio unit 2012 carries out frequency conversion of baseband signals from the signal processing unit 2018 so as to derive radiofrequency signals. Here, the baseband signal from the signal processing unit 2018 is indicated as the digital transmitted signals 2302. The radio unit 2012 outputs the radiofrequency signals to the basestation antennas 2014. That is, the radio unit 2012 outputs the radiofrequency signals to the basestation antennas 2014. A PA (Power Amplifier) and a D-A conversion unit are also included in the radio unit 2012. The digital transmitted signal 2302 is s a multicarrier signal converted to the time domain and is a digital signal.

As a receiving operation, the signal processing unit 2018 converts a plurality of digital received signals 2300 into those in the frequency domain and performs adaptive array signal processing on the frequency-domain signals. The signal processing unit 2018 outputs a result of the adaptive array signal processing as a composite signal 2304. As a transmission operation, the signal processing unit 2018 inputs from the modem unit 2020 the pre-separation signal 2308 which is a signal in the frequency domain, converts frequency-domain signals into time-domain signals, and outputs them as the digital transmitted signals 2302 by associating them with a plurality of basestation antennas 2014, respectively. It is assumed herein that the composite signal 2304 and the pre-separation signal 2308, which are signals in the frequency domain, each contains a plurality of subcarrier components as shown in FIG. 1. For the clarity of figure, the frequency-domain signal is arranged in the order of the subcarrier numbers, and forms serial signals.

Figure 22:
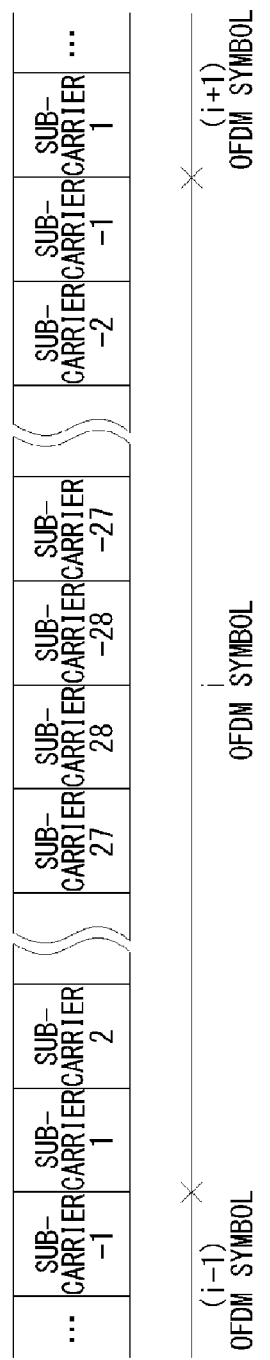
FIG. 22 illustrates a structure of a frequency-domain signal in FIG. 21.

FIG. 22 illustrates a structure of a frequency-domain signal. Assume herein that a combination of subcarrier numbers "−28" to "28" shown in FIG. 1 constitutes a so-called "OFDM symbol". Note that the unit of each frequency-domain signal is also called "OFDM symbol" here. An "i"th OFDM symbol is such that subcarriers components are arranged in the order of subcarrier numbers "1" to "28" and subcarrier numbers "−28" to "−1". Assume also that an "(i−1)" th OFDM symbol is placed before the "i"th OFDM symbol, and an "(i+1)" th OFDM symbol is placed after the "i"th OFDM symbol. Note that, in a legacy system, a combination of the subcarrier numbers "−26" to "26" is used for each "OFDM symbol". Now refer back to FIG. 21.

A further detail on the receiving processing in the signal processing unit 2018 is now described. The signal processing unit 2018 derives receiving weight vectors 2300 for a plurality of digital received signals 2300, over a training signal period of a packet signal. A receiving weight vector is derived based on a channel characteristic. The channel characteristic is defined per subcarrier and the channel characteristic includes a signal attenuation and an amount of phase rotation in a channel between the terminal antenna 2016 and the basestation antenna 2014. Accordingly, the channel characteristic per subcarrier has components corresponding to channels between the terminal antennas 2016 and the basestation antennas 2014. For example, in the case of FIG. 21, there are a single terminal antenna 2016 and N basestation antennas 2014 and therefore the characteristic for each subcarrier contains N components. As a result, in the present exemplary embodiment, the channel characteristic per subcarrier has components corresponding to the number of the basestation antennas 2014.

The receiving weight vector derived from the channel characteristic also has the same number of components as that of channel characteristics. That is, a receiving weight vector per subcarrier has components corresponding respectively to the basestation antennas 2014. Hereinbelow, this will be called "component per basestation antenna 2014". The basestation antenna 2014 per basestation antenna 2014 corresponds to the basestation antenna 2014 having received the digital received signals 2300 per basestation antenna 2014, and the signal per basestation antenna 2014 is also called simply "basestation antenna 2014 unit", "per basestation antenna 2014" or the like. The signal processing unit 2018 weights the digital received signals 2300 with the receiving weight vector, per basestation antenna 2014 and per subcarrier, and combines the weighting results per subcarrier. Here, the result combined per subcarrier also contains the pilot signal. Finally, the signal processing unit 2018 outputs the combined result as a composite signal 2304.

The signal processing unit 2018 determines the composite signal 2304 per subcarrier. The signal processing unit 2018 remodulates, for each basestation antenna 2014, a decision result and a channel characteristic per subcarrier by associating them per subcarrier. In other words, the channel characteristic and the decision result corresponding to an identical subcarrier are multiplied together. The signal processing unit 2018 derives, for each basestation antenna 2014, a phase difference between a digital received signal 2300 and a remodulation result so as to derive a phase rotation amount per basestation antenna 2014. Though the processing will be described in detail later, the phase difference between the digital received signal 2300 and the remodulation result is derived by associating them with the subcarriers. Subsequent to this derivation, the phase differences in a plurality of subcarriers for the same basestation antenna 2014 are accumulated. Assume here that the phase difference is vector-valued and the accumulation is an vector operation. With the above processing, the signal processing unit 2018 derives the phase rotation amount for the digital received signal 2300 per basestation antenna 2014.

While associating, per basestation antenna 2014, the phase rotation amount per basestation antenna 2014 with the receiving weight vector, the signal processing unit 2018 rotates the receiving weight vector according to the phase rotation amount. Here, a receiving weight vector is formed on a subcarrier-by-subcarrier basis. The signal processing unit 2018 weights the digital received signal 2300 per basestation antenna 2014 and per subcarrier with the phase-rotated receiving weight vector, and combines the weighting results per subcarrier. The weighting result is regarded as a composite signal 2304 the same way as above.

As a receiving processing, the modem unit 2020 corrects the phase error of the composite signal 2304 by using the pilot signal contained in the composite signal 2304 from the signal processing unit 2018. A known technique may be used for the correction of the phase error using the pilot error and thus the description thereof is omitted here. The modem unit 2020 also executes demodulation and deinterleaving. The demodulation is carried out per subcarrier. The modem unit 2020 outputs the demodulated signal to the baseband unit 2022. As a transmission processing, the modem unit 2020 carries out interleaving and modulation. The modem unit 2020 outputs the modulated signal to the signal processing unit 2018 as a pre-separation signal 2308. When the transmission processing is carried out, the modulation scheme is specified by the control unit 2024. The baseband unit 2022 serves as an interface between the signals to be processed in the base station apparatus 2034 and the network 2032. The control unit 2024 controls the timing and the like of the base station apparatus 2034.

In terms of hardware, this structure can be realized by a CPU, a memory of an arbitrary computer and other LSIs. In terms of software, it is realized by memory-loaded programs which have communication functions and the like, but drawn and described herein are function blocks that are realized in cooperation with those. Thus, it is understood by those skilled in the art that these function blocks can be realized in a variety of forms such as by hardware only, software only or the combination thereof.

Figure 23:
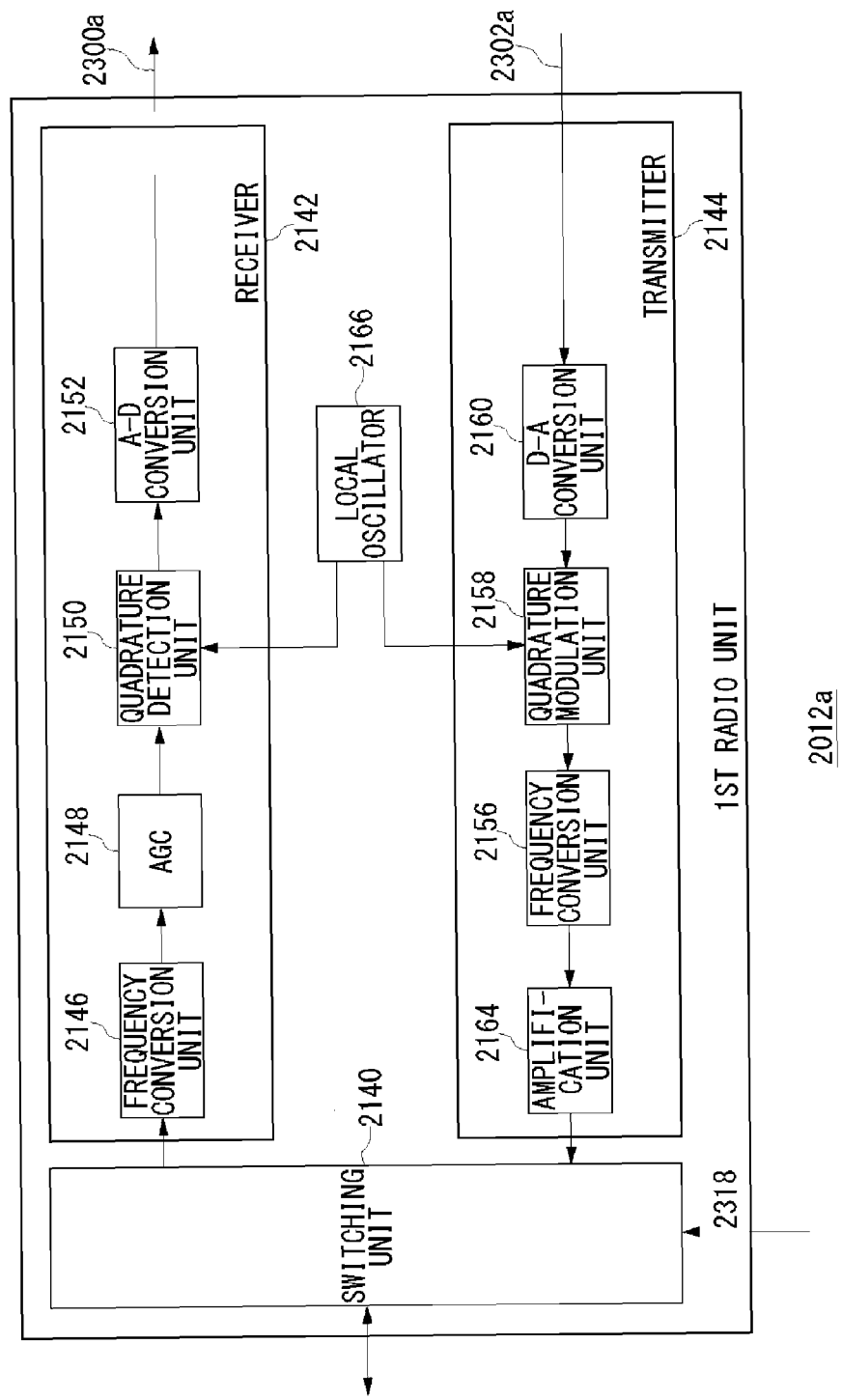
FIG. 23 illustrates a structure of a first radio unit shown in FIG. 21.

FIG. 23 illustrates a structure of a first radio unit 2012a. The first radio unit 2012a includes a switching unit 2140, a receiver 2142, a transmitter 2144, and a local oscillator 2166. The receiver 2142 includes a frequency conversion unit 2146, an AGC unit 2148, a quadrature detection unit 2150 and an A-D conversion unit 2152. The transmitter 2144 includes an amplification unit 2164, a frequency conversion unit 2156, a quadrature modulation unit 2158 and a D-A conversion unit 2160.

The switching unit 2140 switches input/output of signals to/from the receiver 2142 and the transmitter 2144 based on the radio-unit control signals 2318 from the control unit 2024, which is not shown in FIG. 23. That is, the switching unit 2140 selects the signal from the transmitter 2144 at the time of transmission, whereas it selects the signal to the receiver 2142 at the time of receiving. The frequency conversion unit 2146 in the receiver 2142 and the frequency conversion unit 2156 in the transmitter 2144 perform frequency conversion on targeted signals between radiofrequencies and intermediate frequencies.

The AGC unit 2148 amplifies a received signal by so controlling gain automatically as to make the amplitude of the received signal an amplitude which is within the dynamic range of the A-D conversion unit 2152. The quadrature detection unit 2150 generates baseband analog signals by performing quadrature detection on intermediate-frequency signals. On the other hand, the quadrature modulation unit 2158 generates intermediate-frequency signals by performing quadrature modulation on the baseband analog signals.

The local oscillator 2166 supplies a local signal having a predetermined frequency to the quadature detection unit 2150 and the quadrature modulation unit 2158. As shown in FIGS. 21 and 23, each radio unit 2012 is provided with each local oscillator 2166. Thus, a plurality of local oscillators 2166 are provided for a plurality of radio units 2012. The A-D conversion unit 2152 converts baseband analog signals into digital signals, whereas the D-A conversion unit 2160 converts baseband digital signals into analog signals. The amplification unit 2164 amplifies radiofrequency signals to be transmitted.

Figure 24:
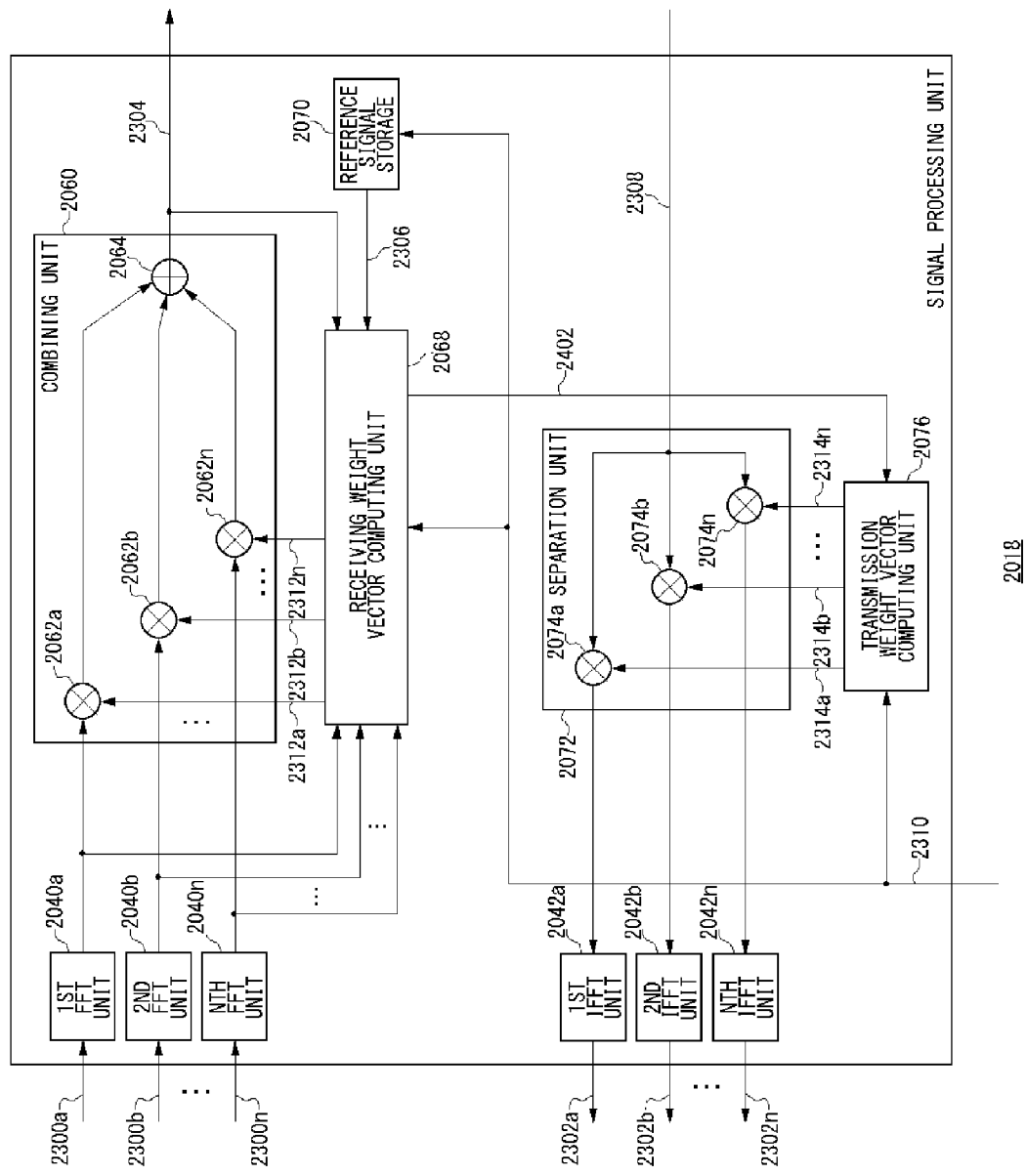
FIG. 24 illustrates a structure of a signal processing unit shown in FIG. 21.

FIG. 24 illustrates a structure of a signal processing unit 2018. The signal processing unit 2018 includes a first FFT unit 2040a, a second FFT unit 2040b, and an Nth FFT unit 2040n, which are generically referred to as "FFT unit 2040", a classification unit 2050, a combining unit 2060, a receiving weight vector computing unit 2068, a reference signal storage 2070, a measurement unit 2200, a separation unit 2072, a transmission weight vector computing unit 2076, and a first IFFT unit 2042a, a second IFFT unit 2042b, . . . and an Nth IFFT unit 2042n, which are generically referred to as "IFFT unit 2042". The combining unit 2060 includes a first multiplier 2062a, a second multiplier 2062b, . . . and an Nth multiplier 2062n, which are generically referred to as "multiplier 2062", and an adder 2064. The separation unit 2072 includes a first multiplier 2074a, a second multiplier 2074b, . . . and an Nth multiplier 2074n, which are generically referred to as "multiplier 2074".

Signals involved include a reference signal 2306, an output receiving weight vector signal 2402, a first receiving weight vector signal 2312a, a second receiving weight vector signal 2312b, . . . and an Nth receiving weight vector signal 2312n, which are generically referred to as "receiving weight vector signal 2312", and a first transmission weight vector signal 2314*a*, a second transmission weight vector signal 2314*b*, . . . and an Nth transmission weight vector signal 2314*n*, which are generically referred to as "transmission weight vector signal 2314".

The FFT unit 2040 performs FFT on the inputted digital received signal 2300. That is, the FFT unit 2040 converts a time-domain signal into a frequency-domain signal. Here, the signal converted to the frequency domain is also indicated as the digital received signal 2300. Also, the digital received signal 2300 which has been converted to the frequency domain is structured as shown in FIG. 22.

In the multiplier 2062, the combining unit 2060 weights the digital received signal 2300 with the receiving weight vector signal 2312 for each basestation antenna 2014 and for each subcarrier, and then adds up the result thereof by the adder 2064 so as to output a composite signal 2304. Note that the multiplication in each multiplier 2062 is done per subcarrier. The reference signal storage 2070 outputs a known training signal stored beforehand during the training signal period, as the reference signal 2306.

The receiving weight vector computing unit 2068 derives channel characteristics from the digital received signal 2300 and the reference signal 2306, over a training signal period. Since a known technique may be used for the derivation of the channel characteristics, the description thereof is omitted here. As described earlier, the channel characteristics have components corresponding respectively to the basestation antennas 2014 and the subcarriers wherein each of the components has an in-phase component and a quadrature component. The receiving weight vector computing unit 2068 derives the receiving weight vector 2312 from the channel characteristics. A known technique may be used for the derivation of the receiving weight vector signals 2312 as well and thus the description thereof is omitted here. The receiving weight vector signal 2312 is formed by the same number of components as that of the charnel characteristic. After the training signal period has ended, the receiving weight vector computing unit 2068 updates the receiving weight vector signal 2312 based on a signal obtained after having determined the composite signal 2304 and the digital received signal 2300. A method for updating it will be discussed later in detail. The receiving weight vector computing unit 2068 outputs the receiving weight vector signal 2312 as the output receiving weight vector signal 2402, as well.

Based on the output receiving weight vector signal 2402, the transmission weight vector computing unit 2076 derives a transmission weight vector signal 2314 necessary for weighting the pre-separation signal 2308, for each basestation antenna 2014 and for each subcarrier. To simplify the processing, the receiving weight vector signal 2312 and the transmission weight vector signal 2314 may be identical to each other. In the multipliers 2074 the separation unit 2072 weights the pre-separation signal 2308 with the transmission weight vector signal 2314, for each basestation antenna 2014 and for each subcarrier and then outputs the weighted pre-separation signal as a digital transmitted signal 2302. The IFFT unit 2042 performs IFFT on the digital transmitted signal 2302 outputted from the multipliers 2074. That is, the IFFT unit 2042 converts a frequency-domain signal into a time-domain signal. Here, the signal which has been converted to the time domain is represented by the digital transmitted signal 2302, too.

Figure 25:
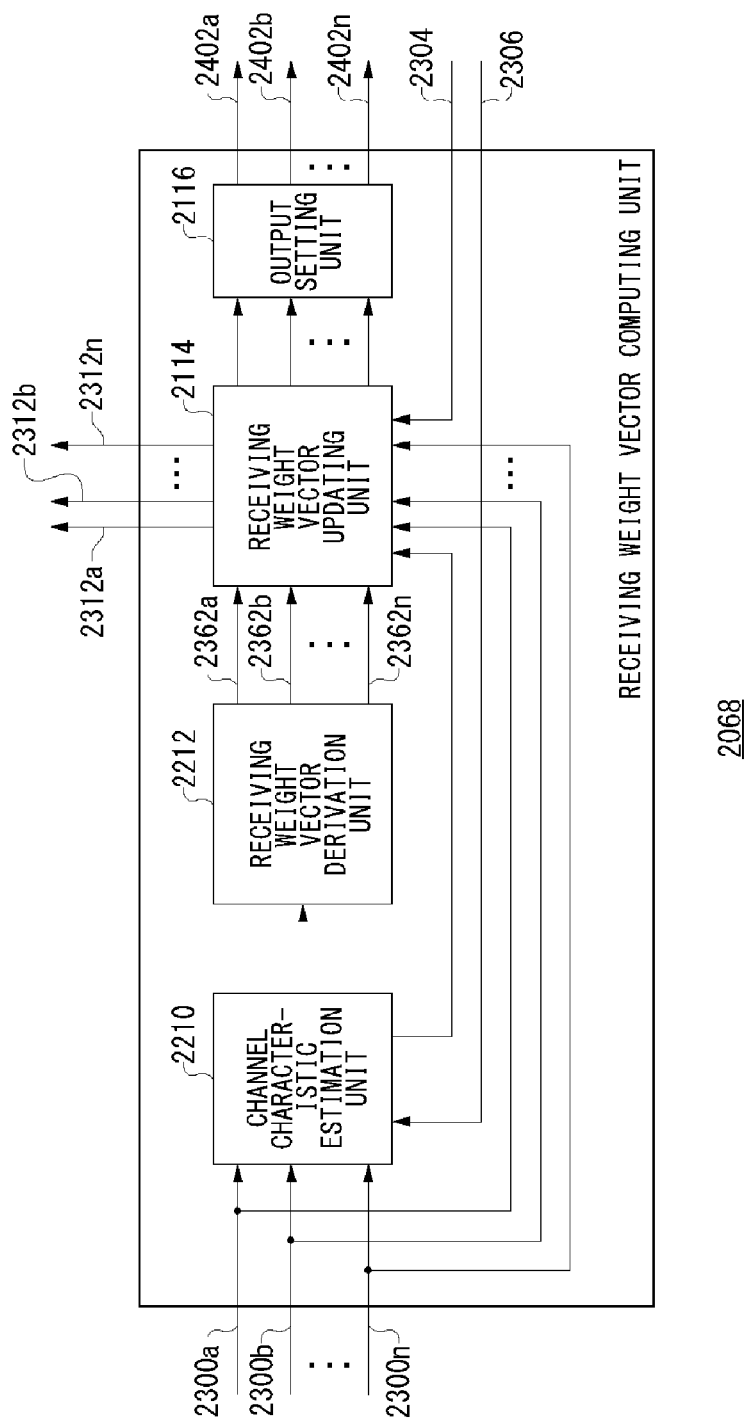
FIG. 25 illustrates a structure of a receiving weight vector computing unit shown in FIG. 24.

FIG. 25 illustrates a structure of the receiving weight vector computing unit 2068. The receiving weight vector computing unit 2068 includes a channel characteristic estimation unit 2210, a receiving weight vector derivation unit 2212, a receiving weight vector updating unit 2114, and an output setting unit 2116. Signals involved include a first initial weight vector signal 2362*a*, a second initial weight vector signal 2362*b*, . . . and an Nth initial weight vector signal 2362*n*, which are generically referred to as "initial weight vector signal 2362", and a first output receiving weight vector signal 2402*a*, a second output receiving weight vector signal 2402*b*, . . . and an Nth output receiving weight vector signal 2402*n*, which are generically referred to as "output receiving weight vector signal 2402".

The channel characteristic estimation unit 2210 derives channel characteristics, based on the reference signal 2306 and the digital received signals 2300. Here, the reference signal 2306 and the digital received signals 2300 are both frequency-domain signals, so that the channel characteristic is derived per basestation antenna 2014 by executing correlation processing per subcarrier. The channel characteristic estimation unit 2210 outputs the estimated channel characteristic to the receiving weight vector derivation unit 2212 and the receiving weight vector updating unit 2114. Note that the channel characteristics are outputted at the end timing of training signal.

The receiving weight vector derivation unit 2212 derives the initial weight vector signal 2362, based on the channel characteristics from the channel characteristic estimation unit 2210. Here, the first initial weight vector signal 2362*a* to the Nth initial weight vector signal 2362*n* correspond to the basestation antennas 2014, respectively. One initial weight vector signal 2362 is constructed as shown in FIG. 22.

After the end of a training signal period the receiving weight vector updating unit 2114 updates the receiving weight vector signals 2312 per basestation antenna 2014 wherein the initial weight vector signals 2362 serve as initial values. In other words, the updating with the identical correction value is performed on a plurality of receiving weight vector signals 1312 corresponding to the identical basestation antenna 2014. As described earlier, the channel characteristics from the channel characteristic estimation unit 2210 and the composite signal 2304 are used to update the receiving weight vector signal 2312. The detailed processing of the receiving weight vector updating unit 2114 will be described later.

The output setting unit 2116 outputs the receiving weight vector signal 2312 as the output receiving weight vector signal 2402. The output setting unit 2116 may continuously output the output receiving weight vector signals 2402 or output an output receiving weight vector signal 2402 at one particular instant, for example, the receiving weight vector signal 2312 at the instant when a packet signal ends.

Figure 26:
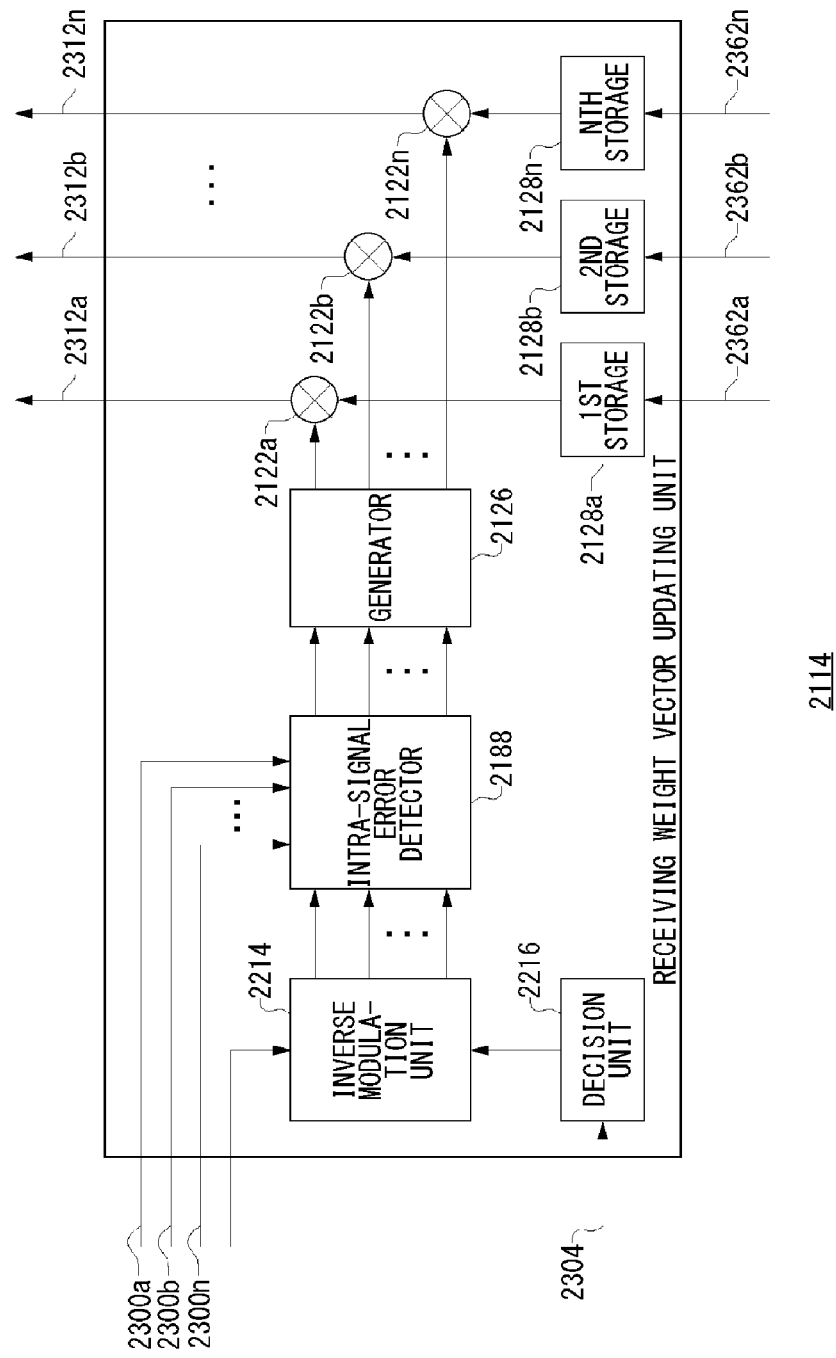
FIG. 26 illustrates a structure of a receiving weight vector updating unit shown in FIG. 25.

FIG. 26 illustrates a structure of the receiving weight vector updating unit 2114. The receiving weight vector updating unit 2114 includes a decision unit 2216, an inverse modulation unit 2214, an intrasignal error detector 2188, a first multiplier 2122*a*, a second multiplier 2122*b*, and an Nth multiplier 2122*n*, which are generically referred to as "multiplier 2122", a generator 2126, and a first storage 2128*a*, a second storage 2128*b*, . . . and an Nth storage 2128*n*, which are generically referred to as "storage 2128".

The decision unit 2216 determines the composite signal 2304. Since the composite signal 2304 is constituted by components corresponding respectively to a plurality of subcarriers as shown in FIG. 22, the decision unit 2216 performs hard-decision per subcarrier. The inverse modulation unit 2214 performs an inverse modulation, based on the channel characteristics from the channel characteristic estimation unit 2210 (not shown in FIG. 26) and a decision result from the decision unit 2216. The inverse modulation is carried out in a manner that the channel characteristics and the decision results are brought into correspondence with each other per subcarrier and then the thus associated channel characteristics and decision results are multiplied together. Also, the channel characteristics have components different for each of the basestation antennas 2014, and inverse modulation results corresponding respectively to the basestation antennas 2014 are derived by varying a channel characteristic which is to be multiplied to a decision result. That is, the inverse modulation results have components the number of which is equal to the number of subcarriers and the number of basestation antennas 2014.

The intrasignal error detector 2188 receives the input of the inverse modulation results from the inverse modulation unit 2214 and the digital received signals 2300. The both have components corresponding to the number of subcarriers and the number of basestation antennas 2014, so that the both are brought into correspondence with each other for the combination of each subcarrier and each basestation antenna 2014. The intrasignal error detector 2188 derives error between them which are brought into correspondence with each other. Here, the both have in-phase components and quadrature components, so that the error is derived if complex-conjugated values of the inverse modulation results are multiplied by the digiral received signals 2300. The intrasignal error detector 2188 derives the derived error to the generator 2126. Note that the phase errors derived by the intrasignal error detector 2188 are equivalent to the phase errors in a plurality of digital received signals, respectively.

From the errors derived in the intrasignal error detector 2188, the generator 2126 generates a correction value per basestation antenna 2014, namely, a phase rotation amount. Though the detailed description will be given later, errors are accumulated per basestation antenna 2014. Further, the generator 2126 generates the correction value in a manner that the phase corresponding to an accumulated value rotates in the opposite direction. For example, when the accumulated value is "x degrees", the correction value is "-x degrees".

The multiplier 2122 updates the initial weight vector signal 2362 stored in the storage 2128 by the correction value outputted from the generator 2126 and then outputs the receiving weight vector signal 2312. Here, the calculation by the multiplier 2122 may be done by an operation using phase values or may be done by vector operation. If the calculation is done by the operation using phase values, the values of amplitude needs to be stored separately. When the training signal period ends, the storage unit 2128 stores the initial weight vector signal 2362; and after the end of the training signal period, the initial weight vector signal 2362 is outputted.

An operation of the base station apparatus 2034 structured as above will now be described. The multicarrier signals received by the basestation antennas 2014 are subjected to quadrature detection by their respective frequency oscillators 2166 which have different frequency offsets. The quadrature-detected signals become digital received signals 2300 through digital conversion. In the training signal period of a received packet signal, the channel characteristic estimation unit 2210 derives channel characteristics and the receiving weight vector derivation unit 2212 computes initial weight vector signals 2362 from the channel characteristics. The receiving weight vector updating unit 2114 receives the input of the initial weight vector signal 2362 and outputs the receiving weight vector signal 2312.

The combining unit 2060 combines them by weighting the digital received signal 2300 with the receiving weight vector signal 2312 and then outputs the composite signal 2304. Further, the receiving weight vector updating unit 2114 executes inverse modulation based on a decition result of the composite signal 2304 and the channel characteristic, and derives a phase rotation amount from the phase error between the digital received signal 2300 and the inverse modulation result. Also, the receiving weight vector updating unit 2114 updates the receiving weight vector signal 2312 by the phase rotation value.

A modification of the present embodiment is now described hereinbelow. In the exemplary embodiment, the receiving weight vector updating unit 2114 derives phase rotation amounts so that the phase rotation amounts correspond to all of the basestation antennas 2014. In a modification, the signal corresponding to one of the basestation antennas 2014 is set as a reference, and phase rotation amounts by which to correct the error of the other basestation antennas 2014 relative to the reference are derived. Accordingly, the signal serving as the reference in the receiving weight vector signals 2312 is not updated while the signals other than the signal serving as the reference are updated. That is, the phase rotation amounts are derived in such a manner as to maintain a phase relation among the basestation antennas 2014.

In other words, the base station apparatus according this modification selects a signal whose received power is maximum (hereinafter this signal will be referred to as "reference signal") among a plurality of multicarrier signals received by a plurality of basestation antennas 2014, and regards signals other this reference signal as those to be processed. Also, in a known signal period, a receiving weight vector corresponding to the reference signal (hereinafter this vector will be referred to as "reference receiving weight vector) and a receiving weight vector corresponding to the signals to be processed (hereinafter this vector will be referred to as "receiving weight vector to be processed" are derived.

Figure 27:
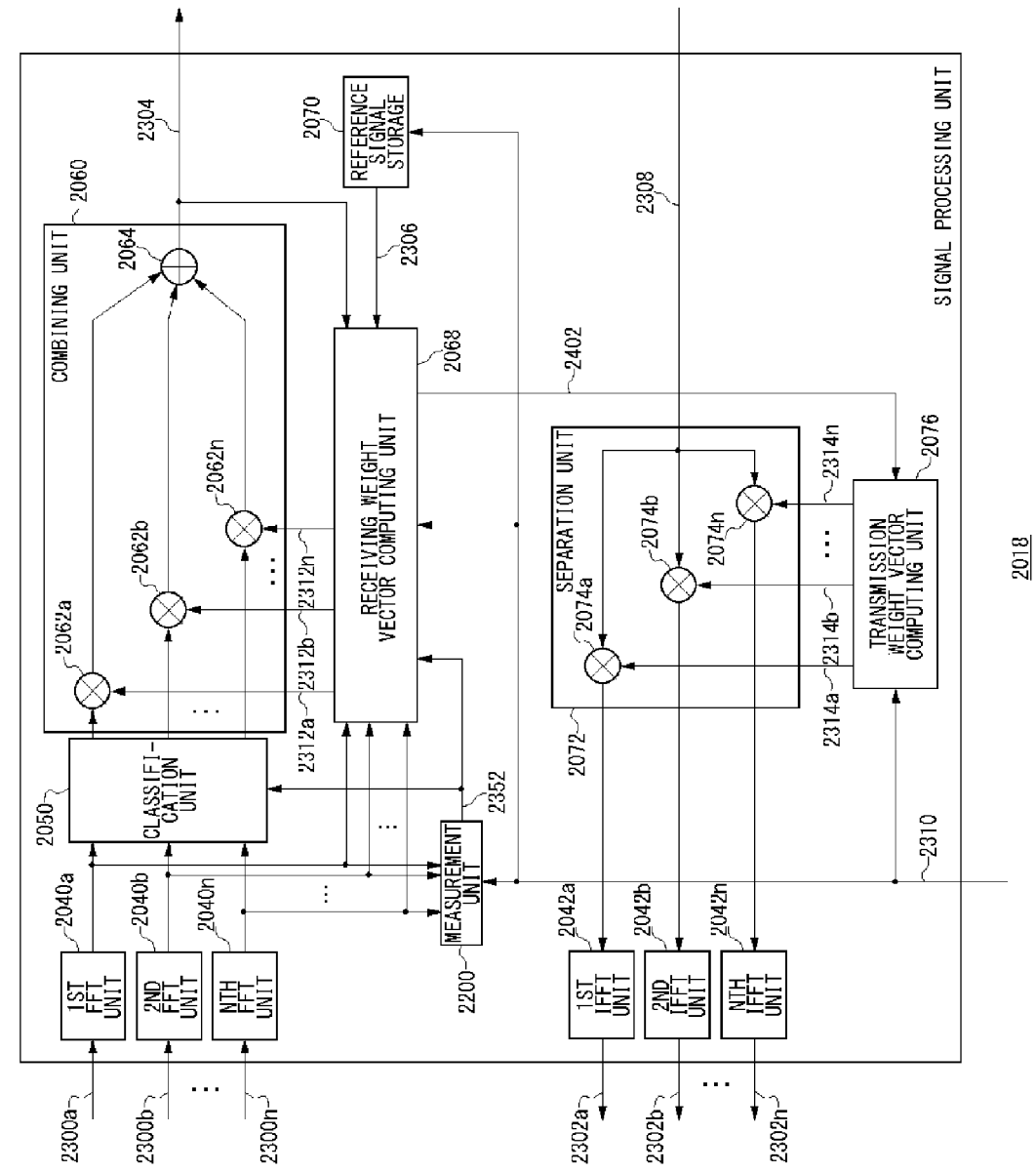
FIG. 27 illustrates a structure of a signal processing unit according to a modification of an exemplary embodiment.

The structure of the base station apparatus 2034 according to the modification is of the same type as with FIG. 21 and therefore the repeated explanation is omitted here. FIG. 27 illustrates a structure of the signal processing unit 2018 according to a modification of the exemplary embodiment. In comparison with the signal processing unit 2018 shown in FIG. 24, a classification unit 2050 and a measurement unit 2200 are added in the signal processing unit 2018 shown in FIG. 27.

The measurement unit 2200 measures the received power of a plurality of digital received signals 2300 in a training signal period, respectively, and selects a digital received signal 2300 having the maximum received power as the reference signal. As described earlier, the digital received signal 2300 other than the reference signal are taken as the signals to be processed. That is, the measurement unit 2200 determines the reference signal according to the measured signal strength. Here, a digital received signal 2300 is constructed by a plurality of subcarriers as shown in FIG. 1 and the measurement unit 2200 measures the total value of the received power in a plurality of subcarriers, as the received power for each digital received signal 2300. Information on the selected reference signal is outputted as a reference notification signal 2352. Here, the recognition during a training signal period is done by the signal processor control signal 2310.

The classification unit 2050 classifies the digital receives signals 2300 by interchanging the order of the digital received signals 2300 based on the reference notification signal 2352 after a training signal period has ended. More specifically, an arrangement is such that the digital received signal 2300 which will be the reference signal is inputted to the first multiplier 2062a of the multipliers 2062 described later. That is, the digital received signals 2300 are rearranged so that the above-described reference signal is outputted to a predetermined multiplier 2062. On the other hand, the classification unit 2050 may not interchange the order of the inputted digital received signals 2300 during the training signal period, or the order of the digital received signals 2300 may be interchanged based on the reference notification signal 2352 at a previous burst signal. Here, the classification is done on the digital received signals 2300 per basestation antenna 1014.

The receiving weight vector computing unit 2068 updates the receiving weight vector signals 2312 but does not update the first receiving weight vector signal 2312a. In so doing, in the receiving weight vector computing unit 2068, too, the classification is performed in such a manner that one of the phase rotation amounts per basestation antenna 2014 is a reference amount and the remaining of the phase rotation amounts per basestation antenna 2014 are the amounts to be processed. The phase rotation amounts are derived for the second basestation antenna 2014b to the Nth basestation antenna 2014n, based on the amounts to be processed and the reference amount. Thereby, the second receiving weight vector signal 2312b to the Nth receiving weight vector signal 2312n are updated. Here, the first receiving weight vector signal 2312a inputted to the first multiplier 2062a corresponds to the above-described reference weight vector, whereas the receiving weight vector signals 2312 other than the first receiving weight vector signal 2312a correspond to the above-described receiving weight vectors to be processed.

Figure 28:
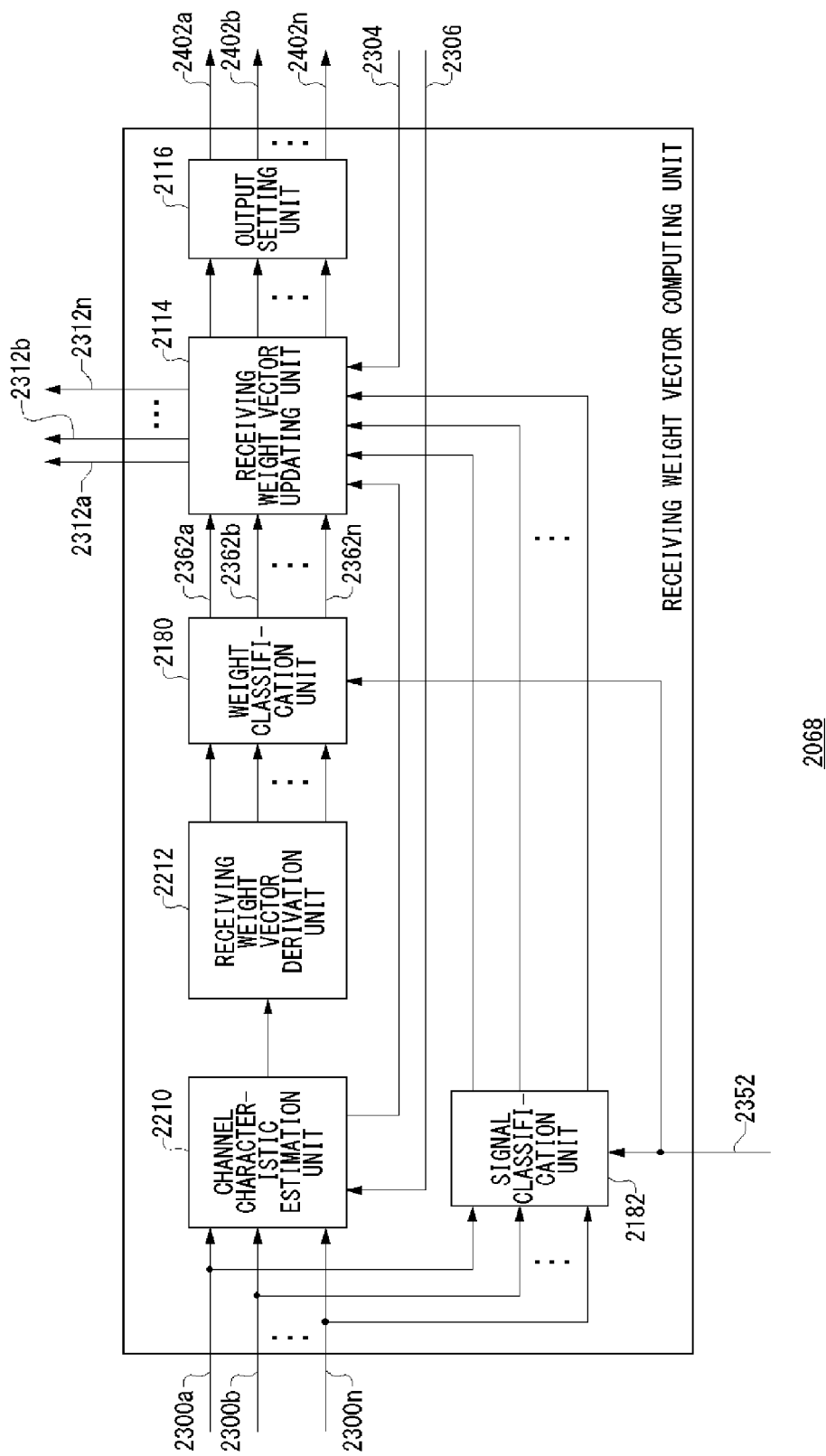
FIG. 28 illustrates a structure of a receiving weight vector computing unit shown in FIG. 27.

FIG. 28 illustrates a structure of the receiving weight vector computing unit 2068. In comparison with the receiving weight vector computing unit 2068 shown in FIG. 25, a weight classification unit 2180, a weight classification unit 2180 and a signal classification unit 2182 are added.

At the time when the training signal period ends, the weight classification unit 2180 selects an initial weight vector signal 2362 corresponding to the reference signal from among the initial weight vector signals 2362, according to the content of the reference notification signal 2352. Hereinafter, the initial weight vector signal 2362 corresponding to the reference signal will be referred to as "reference initial weight vector", whereas the initial weight vector signals 2362 corresponding to the signals to be processed will be referred to as "processing initial weight vector". The weight classification unit 2180 outputs the reference initial weight vector to the receiving weight vector updating unit 2114 as a first initial weight vector signal 2362a. Further, the weight classification unit 2180 outputs the processing initial weight vector to the receiving weight vector updating unit 2114 as a second initial weight vector signal 1362b through an Nth initial weight vector signal 2362.

At the time when the training signal period ends, the signal classification unit 2182 selects the reference signal from among the digital received signals 2300, according to the content of the reference notification signal 2352. The signal classification unit 2182 outputs the reference signal to the receiving weight vector updating unit 2114 as a first digital received signal 2300a. Further, the signal classification unit 2182 outputs the processing signals to the receiving weight vector updating unit 2114 as a second digital received signal 2300b through an Nth digital received signal 2300n.

The receiving weight vector updating unit 2114 updates the receiving weight vector signals 2312 the same way as described above wherein the initial weight vector signals 2362 serve as initial values. Note that the first receiving weight vector 2312a is not updated.

Figure 29:
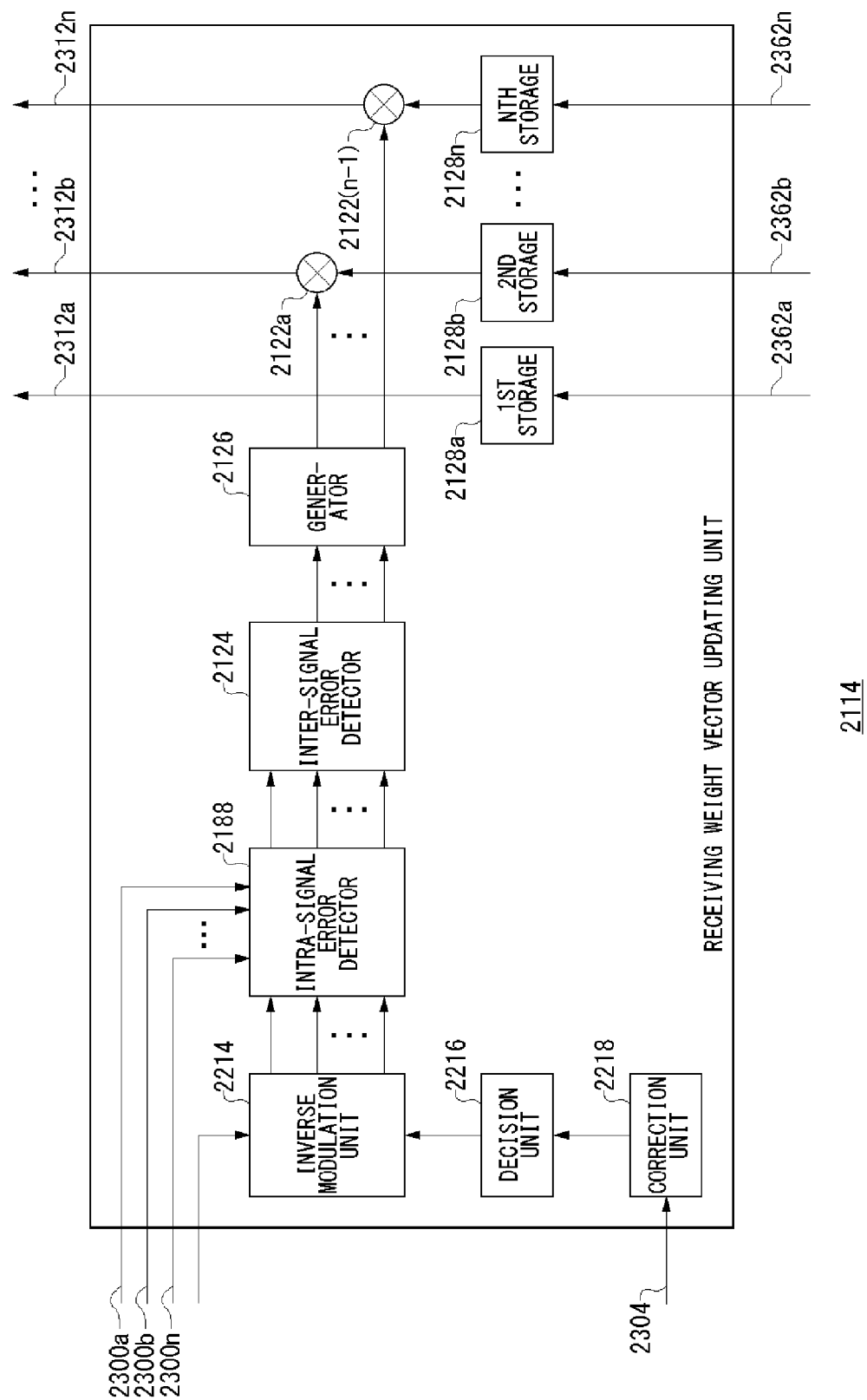
FIG. 29 illustrates a receiving weight vector updating unit shown in FIG. 28.

FIG. 29 illustrates a structure of the receiving weight vector updating unit 2114. In comparison with the receiving weight vector updating unit shown in FIG. 26, a correction unit 2218 and an intersignal error detector 2124 are added.

While using the pilot signals contained in the composite signal 2304, the correction unit 2218 corrects the phase of the composite signal 2304. The correction of the phase using the pilot signals is the same as the processing performed in the not-shown modem unit 2020. Accordingly, even if the correction unit 2218 is not included in the receiving weight vector updating unit 2114, the composite signal 2304 whose phase has been corrected in the modem unit 2020 may be inputted to the receiving weight vector updating unit 2114.

The intersignal error detector 2124 computes a difference of the phase errors in the signals to be processed against the phase error in the reference signal. That is, the differences of the phase errors of the second digital received signal 2300b to the Nth digital received signal 2300n against the phase error of the first digital received signal 2300a are calculated per basestation antenna 2014. Here, the calculation of the difference of phase error per basestation antenna 2014 is done in a manner, for example, that the difference of phase error corresponding to each of a plurality of subcarriers is derived for the phase error corresponding to the second basestation antenna 2014b and the phase error corresponding to the first basestation antenna 2014a and then those differences are accumulated. Note that the calculation of difference may be done by an operation using phase values or by vector operation.

Since the phase rotation amount of the first receiving weight vector signal 2312a is not derived in the generator 2126, the number of multipliers 2122 is one less than that in the structure shown in FIG. 26.

Figure 30:
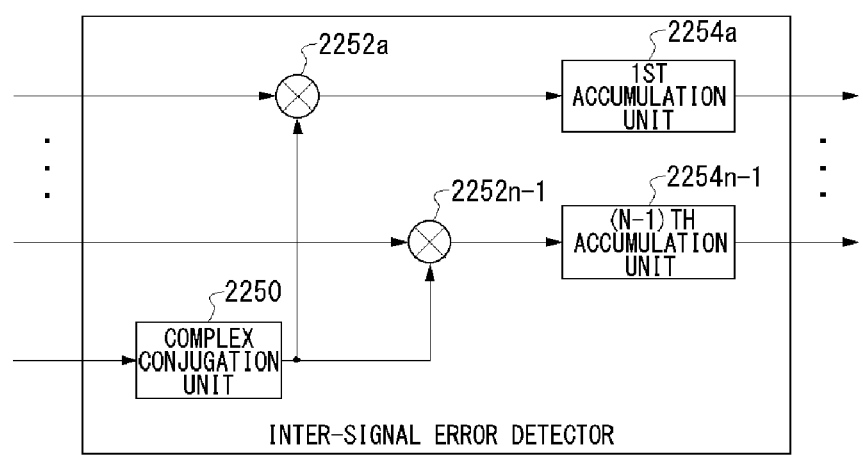
FIG. 30 illustrates a structure of an intersignal error detector shown in FIG. 29.

FIG. 30 illustrates a structure of the intersignal error detector 2124. The intersignal error detector 2124 includes a complex conjugation unit 2250, a first multiplier 2252a, . . . and an (N−1)th multiplier 2252n−1, which are generically referred to as "multiplier 2252", and a first accumulation unit 2254a, . . . and (N−1)th accumulation unit 2254n−1, which are generically referred to as "accumulation unit 2254" or "summation unit 2254".

The complex conjugation unit 2250 inputs a phase error value and derives the complex conjugation thereof. This is equivalent to deriving the complex conjugation of the reference signal. Note that if the phase error value is not vector-valued but represented as a phase value, the complex conjugation unit 2250 will invert the sign of the phase error value. The multiplier 2252 multiplies together the phase error value whose complex conjugation has been derived and a phase error value corresponding to the signal to be processed. This multiplication is equivalent to deriving a difference between the phase error corresponding to the reference signal and the phase error corresponding to the signal to be processed. The multiplication in the multiplier 2252 is executed in the order of subcarrier numbers shown in FIG. 22.

The accumulation unit 2254 accumulates the multiplication results of the multipliers 2252 across one OFDM symbol period. That is, the accumulation unit 2254 accumulates the differences between the phase error in the reference signal and the signals to be processed, over one OFDM symbol period. If phase error values are expressed as a vector value, the accumulation will be executed in the accumulation unit 2254; and if the phase error values are represented by phase values, the accumulation unit 2254 will perform averaging processing. Such processing drives the difference per basestation antenna 2014 but this is equivalent to the averaging of phase errors in a plurality of subcarriers. Thus, the effect of noise can be reduced. The processing in the accumulation unit 2254 is expressed by the following Equation (9).

$$\Delta\theta_i = \arctan\left(\sum_j E_{ij}\right) \quad (9)$$

In Equation (9), $E_{ij}$ is a phase error corresponding to an Ith basestation antenna 2014$i$ and a subcarrier number j and $E_{ij}$ is represented as a vector value. $\Delta\theta_i$ is an accumulated difference value corresponding to the Ith basestation antenna 2014$i$. Though $\Delta\theta_i$ is indicated as a phase value but may be a vector value. A not-shown generator 2126 receives $\Delta\theta_i$ and derives $-\Delta\theta_i$ as a correction value. If $\Delta\theta_i$ is vector-valued, the generator 2126 may derive a complex conjugate thereof. Here, the accumulation unit 2254 is included in the intersignal error detector 2124. However, if a structure is such that no intersignal error detector 2124 is provided in an exemplary embodiment, it will be preferred that the accumulation unit 2254 is included in a not-shown generator 2126.

Another modification of the present embodiment is now described hereinbelow. Although the communication system 2100 is assumed to be a legacy system in this embodiment of the present invention, the communication system 2100 in this modification of the present embodiment is assumed to be a MIMO system instead of the legacy system. A packet signal in the MIMO system is constituted by a plurality of streams. In order to be compatible with this, the terminal apparatus 1010 is therefore provided with a plurality of terminal antennas 2016, a plurality of radio units 2030, and a plurality of modem units 2028. Also, the base station apparatus 2034 includes a plurality of signal processing units 2018 and a plurality of modem units 2020. In such a structure, the terminal apparatus 2010 and the base station apparatus 2034 process a plurality of streams in parallel. A description is first given of the packet signal in a case when the MIMO system is applied.

FIGS. 31A to 31C illustrate packet formats according to another modification of the present embodiment. FIG. 31A represents a case where the number of streams is "4", FIG. 31B a case where the number of streams is "3", and FIG. 31C a case where the number of streams is "2". In FIG. 31A, data contained in four streams are to be transmitted, and the packet formats corresponding to the first to fourth streams are shown in order from the top to the bottom level.

In a packet signal corresponding to the first stream, "L-STF", "HT-LTF" and the like are assigned as preamble signals. "L-STF", "L-LTF", "L-SIG" and "HT-SIG" correspond to a known signal for AGC setting, a known signal for channel estimation and a control signal compatible with a legacy system, and a control signal compatible with a MIMO system, respectively. The control signal compatible with a MIMO system contains information on the number of streams or a destination of a data signal, for example. "HT-STF" and "HT-LTF" corresponds to a known signal for AGC setting and a known signal for channel estimation compatible with a MIMO system, respectively. The above-described training signal corresponds to any of "L-STF", "HT-LTF", "HT-STF" and "HT-LTF" or an arbitrary combination thereof. On the other hand, "Data 1" is a data signal. Note that L-LTF and HT-LTF are used not only for AGC setting but also for timing setting.

In the packet signal corresponding to the second stream, "L-STF(-50 ns)", "HT-LTF(-400 ns)" and the like are assigned as preamble signals. And, in the packet signal corresponding to the third stream, "L-STF(-100 ns)", "HT-LTF (-200 ns)" and the like are assigned as preamble signals. And, in the packet signal corresponding to the fourth stream, "L-STF(-150 ns)", "HT-LTF(-600 ns)" and the like are assigned as preamble signals.

Here, "-400 ns" and the like indicate the amounts of timing shift in CDD (Cyclic Delay Diversity). The CDD is a processing where in a predetermined interval a time-domain waveform is shifted, by a shift amount, in a posterior direction and then the waveform pushed out of the rearmost part in the predetermined interval is assigned cyclically in a header portion of the predetermined interval. That is, "L-STF(-50 ns)" is "L-STF" given a cyclic timing shift by a delay of -50 ns. Note that L-STF and HT-STF are each constructed by a repetition of an 800 ns duration and that the other parts such as HT-LTF and the like are each constituted by a repetition of a 3.2 µs duration. It is also to be noted that "DATA 1" to "DATA 4" also undergo the CDD and the amounts of timing shift are of the same values as those for HT-LTFs assigned anterior thereto.

In the first stream, HT-LTFs are assigned in the order of "HT-LTF", "-HT-LTF", "HT-LTF" and "-HT-LTF" from the top. Here, these in this order are called "a first component", "a second component", "a third component" and "a fourth component" in all the streams. A receiving apparatus extracts a desired signal for the first stream by computing "first component minus (−) second component plus (+) third component minus (−) fourth component" for received signals of all the streams. The receiving apparatus extracts a desired signal for the second stream by computing "first component+second component+third component+fourth component" for received signals of all the streams. The receiving apparatus extracts a desired signal for the third stream by computing "first component−second component−third component+ fourth component" for received signals of all the streams. The receiving apparatus extracts a desired signal for the fourth stream by computing "first component+second component− third component−fourth component" for received signals of all the streams. These are equivalent to the fact that the orthogonality relation holds for a combination of signs of predetermined components, among the streams. Note that the addition and subtraction processing is done by vector operation.

As with a legacy system, "52" subcarriers are used for the part from "L-LTF" to "HT-SIG" and so forth. Note that "4" subcarriers out of the "52" subcarriers correspond to pilot signals. On the other hand, the part of "HT-LTF" or the like and thereafter uses "56" subcarriers.

In FIG. 31A, the sign of "HT-LTF" is defined as follows. The signs are arranged in order from the top of the first stream as "+ (plus)", "− (minus)", "+" and "−"; the signs are arranged in order from the top of the second stream as "+", "+", "+" and "+"; the signs are arranged in order from the top of the third stream as "+" "−" a "−" and "+"; and the signs are arranged in order from the top of the fourth stream as "+", "+", "−" and "−". However, the signs may be defied as follows. The signs are arranged in order from the top of the first stream as "+", "−", "+" and "+"; the signs are arranged in order from the top of the second stream as "+", "+", "−" and "+"; the signs are arranged in order from the top of the third stream as "+", "+", "+" and "−"; and the signs are arranged in order from the top of the fourth stream as "−", "+", "+" and "+". In such signs, too, the orthogonal relationship holds in the combination of signs of predetermined components.

FIG. 31B corresponds to the first to the third stream of FIG. 31A. FIG. 31C is similar to the first stream and second stream of the packet formats shown in FIG. 31A. Here, the assignment of "HT-LTFs" in FIG. 31C differs from that of "HT-LTFs" in FIG. 31A. That is, only the first components and the second components of HT-LTFs are contained. In the first stream, HT-LTFs are assigned in the order of "HT-LTF" and "HT-LTF" from the top thereof, whereas in the second stream, HT-LTFs are assigned in the order of "HT-LTF" and "−HT-LTF" from the top thereof. A receiving apparatus extracts a desired signal for the first stream by computing "first component+second component" for received signals of all the streams. Also, the receiving apparatus extracts a desired signal for the second stream by computing "first component−second component" for received signals of all the streams. As described above, the orthogonal relationship also holds between these.

Figure 32:
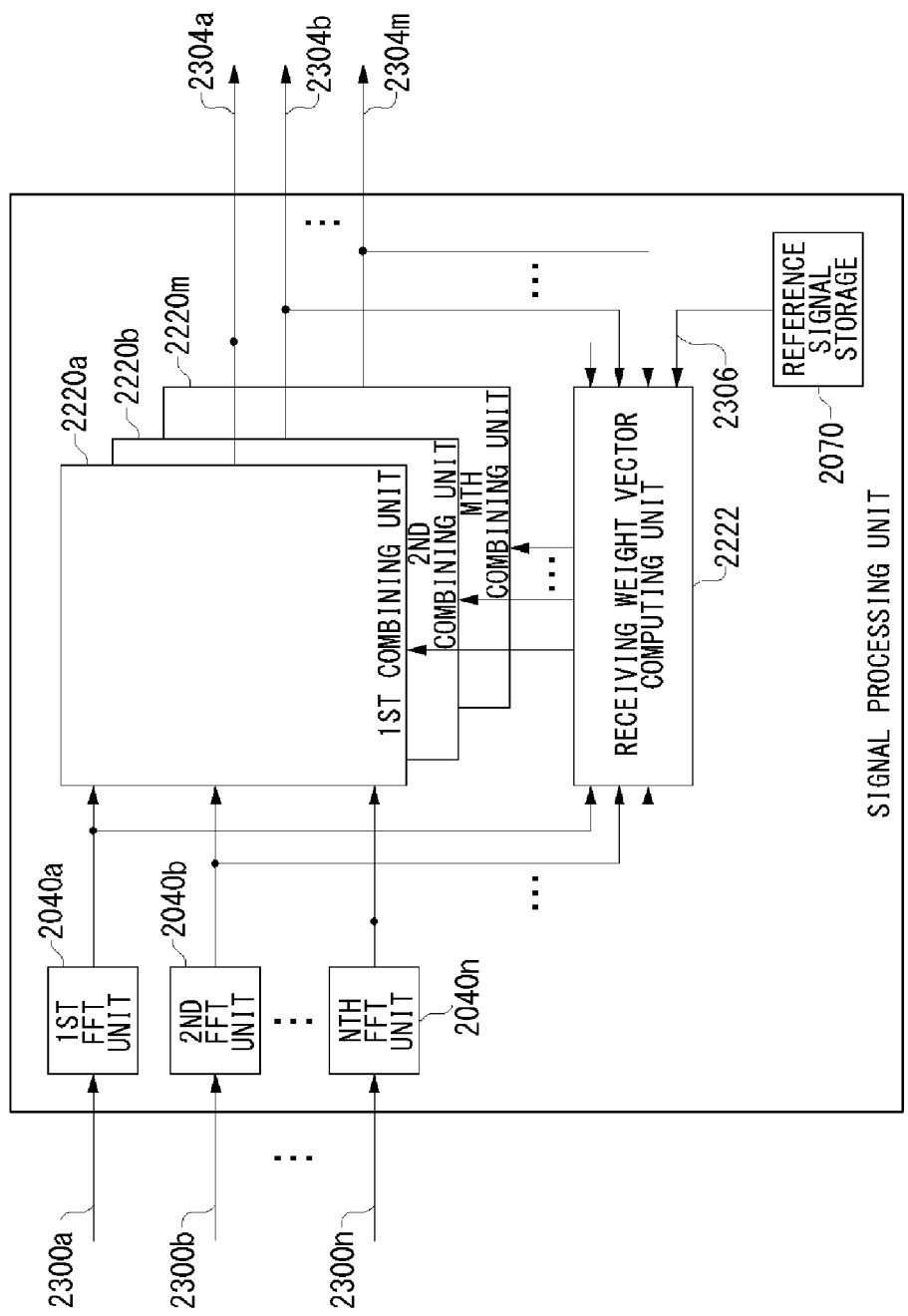
FIG. 32 illustrates a structure of a signal processing unit according to a modification of an exemplary embodiment.

The structure of the base station apparatus 2034 according to the modification is of the same type as with FIG. 21 and therefore the repeated explanation is omitted here. FIG. 32 illustrates a structure of a signal processing unit 2018 according to the modification of the present embodiment. The signal processing unit 2018 includes a first FFT unit 2040a, a second FFT unit 2040b, . . . and an Nth FFT unit 2040n, which are generically referred to as "FFT unit 2040", a first combining unit 2220a, a second combining unit 2220b, . . . and an Mth combining unit 2220m, which are generically referred to as "combining unit 2220", a receiving weight vector computing unit 2222, and a reference signal storage 2070. Note that FIG. 32 shows a part that involves the receiving processing in the signal processing unit 2018.

The signal processing unit 2018 receives the input of digital received signals 2300 corresponding respectively to a plurality of the basestation antennas 2014 wherein the digital received signals 2300 are composed of a plurality of streams as shown in FIGS. 31A to 31C. The FFT units 2040 correspond to the FFT units 2040 shown in FIG. 24. The combining unit 2220 performs array synthesis. The total of M combining units 2220 is provided according to the number of streams. Each combining unit 2220 weights the digital received signal 2300 per basestation antenna 2014 and per subcarrier, and then carries out the synthesis per subcarrier. The weighting and combining processings in each combining unit 2220 are done the same way as in the combining unit 2060 of FIG. 24.

The receiving weight vector computing unit 2222 generates a receiving weight vector used in the weighting in the combining unit 2220. Since M combining units 2220 correspond respectively to M streams, the receiving weight vector computing unit 2222 derives receiving weight vectors corresponding respectively to the M streams. Similar to the receiving weight vector signal 2312 explained so far, a receiving weight vector corresponding to one combining unit 2220 has components the number of which corresponds to the number of basestation antennas 2014. In order to derive such a receiving weight vector, the receiving weight vector computing unit 2222 is provided with M channel characteristic estimation units 2210 and M receiving weight vector derivation units 2212.

Similar to the receiving weight vector updating unit 2114, the receiving weight vector computing unit 2222 updates the receiving weight vector. In so doing, the decision unit 2216, the inverse modulation unit 2214 and the intrasignal error detector 2188 shown in FIG. 26 are extended to a processing for the M streams. That is, they are extended to the processing performed in units of stream. On the other hand, the generator 2126 puts together the phase errors for an identical basestation antenna 2014. That is, although the receiving weight vector computing unit 2222 also executes remodulation according to the number of streams, the receiving weight vector computing unit 2222 derives the phase rotation amounts for the digital received signals 2300 per antenna 2014, regardless of the number of streams.

According to the present embodiment and modifications, the remodulation is performed on the result of array synthesis and the remodulation result is taken as the reference signal. Thus, the accuracy of the reference signal can be enhanced. The phase rotation amount is derived using the reference signal whose accuracy has been improved, so that the estimation accuracy of the phase rotation amount can be enhanced. The phase rotation amounts are derived by accumulating the phase errors derived per subcarrier. Thus, the effect of noise on the phase rotation amounts can be reduced. Since the estimation accuracy of the phase rotation amounts is enhanced, the accuracy of correction of frequency offset can be enhanced. Since the accuracy of correction of frequency offset is enhanced, the receiving characteristics can be improved even if the frequency offset value differs for each of the basestation antennas. Since it is only necessary to rotate a receiving weight vector using the derived phase rotation amount, a simplified processing can be achieved.

The frequency offset can be corrected in such a manner as to maintain a phase relation among signals corresponding respectively to a plurality of basestation antennas. The frequency offset is corrected in such a manner as to maintain the phase relationship. Thus, the adverse factor in the characteristics in the adaptive array signal processing can be suppressed. The processing according to the number of streams is performed and thus a plurality of streams can be dealt with. Since the phase rotation amount per antenna is derived regardless of the number of streams, statistical processing such as averaging or accumulation can be performed on the phase errors corresponding to a plurality of streams. The execution of statistical processing makes it possible to reduce the effect of noise on the rotation amounts.

The present invention has been described based on the exemplary embodiments and modifications. These embodiments and modifications are merely exemplary, and it is understood by those skilled in the art that various other modifications to the combination of each component and process thereof are possible and that such modifications are also within the scope of the present invention.

In the exemplary embodiment, the receiving weight vector computing unit 2068 derives channel characteristics in order to estimate the receiving weight vector signal 2312. However, this should not be considered as limiting and, for example, an adaptive algorithm may be executed in the receiving weight vector computing unit 2068 and processings other than adaptive algorithms may be executed. For example, an adaptive algorithm such as LMS algorithm or RLS algorithm may be executed in the receiving weight vector computing unit 2068. Also, an arrival direction estimation may be executed using MUSIC (MUltiple SIgnal Classification) algorithm. According to this modification, various techniques for estimating a receiving weight vector is applicable to the embodiments. This and other modifications may be acceptable as long as a plurality of received signals are separated in the signal processing with an adaptive array antenna.

In the exemplary embodiment, the communication system 2100 is applied to the CSMA-based communication system 2100. This should not be considered as limiting and, for example, the base station apparatus 2034 may be applied to a communication system other than the CSMA. The example of such a communication system other than the CSMA includes TDMA (Time Division Multiple Access), CDMA (Code Division Multiple Access), SDMA (Space Division Multiple Access) and the like. According to this modification, the present embodiment can be applied to various communication systems. That is, it suffices if the base station apparatus 2034 is a base station apparatus that receives signals from the terminal apparatus 2010.

In the exemplary embodiment, a description has been given of the base station apparatus 2034 but this is not limited thereto, and the description may be applied to the terminal apparatus 2010. In such a case, the terminal apparatus 2010 will be structured the same way as the base station apparatus 2034. Also, the description is not limited to the terminal apparatus 2010 and the base station apparatus 2034 but may be applied to a radio apparatus in general. According to this modification, the present embodiment is applicable to various types of radio apparatuses.

In the exemplary embodiment, in order to put together the phase errors corresponding respectively to a plurality of subcarriers, the accumulation unit 2254 accumulates the phase errors over one OFDM symbol. However, this is not limited thereto and, for example, the accumulation unit 2254 may do the accumulation while performing the weighting. For this weighting, the magnitude of components of the receiving weight vector signals 2312 in the basestation antenna 2014 and subcarriers corresponding to the differences of the phase errors are used. As the magnitude of components of the receiving weight vector signal 2312 becomes larger, the magnitude of the digital received signal 2300 to be multiplied by said component will be smaller. This is also equivalent to the reduced reliability of the differences of the phase errors. Accordingly, if the magnitude of components of the receiving weight vector signal 2312 is large, the differences of the phase errors are accumulated while the weighting is kept small. A phase error $E_{ij'}$ which has been weighted for the Ith basestation antenna 2014i and the subcarrier number j is expressed as follows.

$$E_{ij'} = \frac{E_{ij}}{|W_{ij}^H \cdot W_{ij}|} \quad (10)$$

where $w_{ij}$ is a component corresponding to the Ith basestation antenna 14i and the subcarrier number j in a receiving weight vector. Based on the weighted phase error $E_{ij'}$, $\Delta\theta_i$ is derived as follows.

$$\Delta\theta_i = \arctan\left(\sum_j E_{ij'}\right) \quad (11)$$

Note that even if the weighting operation is not executed, the accumulation unit 2254 will monitor the magnitude of components of the receiving weight vector signal 2312. And if the magnitude of components of the receiving weight vector signal 2312 becomes larger than a threshold value, a phase error corresponding to the component of said receiving weight vector signal 2312 may be set aside from the summation. According to this modification, the effect of phase errors whose reliability is low is small, so that the accuracy of the accumulation can be enhanced. That is, it suffices if the effect of noise is reduced when the accumulation is executed.

In the exemplary embodiment, the signals processed in the terminal apparatus 2010 and the base station apparatus 2034 are multicarrier signals. However, this is not limited thereto and, for example, the signals processed in the terminal apparatus 2010 and the base station apparatus 2034 may be single-carrier signals. In such a case, the accumulation in the accumulation unit 2254 will not be executed. According to this modification, the present embodiment can be applied to various communication systems. That is, it suffices if there are provided a plurality of basestation antennas 2014.

In the exemplary embodiment, the receiving weight vector updating unit 2114 derives phase rotation amounts and updates the receiving weight vector signals 2312 by the phase rotation amounts. However, this is not limited thereto and, for example, the generator 2126 in the receiving weight vector updating unit 2114 may derive the phase rotation amounts the same way as with the exemplary embodiment and rotate the phase of the digital received signals 2300 by the derived phase rotation amounts. In so doing, the processings for the decision unit 2216, the inverse modulation unit 2214, the intrasignal error detector 2188 and the generator 2126 in the receiving weight vector updating unit 2114 are executed the same way as with the exemplary embodiment. Also, at a preceding stage of the combining unit 2060 there are provided rotation units in such a manner as to correspond respectively to the digital received signals 2300. While associating, per basestation antenna 2014, the phase rotation amounts derived per basestation antenna 2014 in the generator 2126 and the digital received signals 2300, the rotation units rotates the phase of the digital received signals 2300 according to the phase rotation amounts. Then the combining unit 2060 weights the digital received signals 2300 phase-rotated by the rotation units, with the receiving weight vector signals 2312 per basestation antenna 2014 and per subcarrier so as to combine the weighting results. Here, the receiving weight vector signals 2312 are not updated. Note that this modification is applicable to the multicarrier signals and MIMO system. According to this modification, the array synthesis is performed in a state where the frequency offset has been corrected. Hence, the deterioration of receiving characteristics due to the frequency offset can be suppressed.

In the exemplary embodiment, the generator 2126 derives phase rotation amounts, based on the phase error detected at a predetermined timing. However, this should not be considered as limiting and, for example, the generator 2126 may derive a phase rotation amount used for phase rotation, from the phase rotation amount which has already been used and that which has been derived anew. This processing is expressed as follows, for example.

$$\theta_c = \alpha\theta_{new} + \beta\theta'_c \quad (12)$$

where $\theta_{new}$ is a phase rotation which has been derived anew, $\theta'_c$ is a phase rotation amount which has already been used, and $\theta_c$ is a phase rotation amount used for phase rotation. Here, $\alpha$ and $\beta$ are each a coefficient less than or equal to 1. According to this modification, the phase rotation amounts in the past are also taken into account and therefore the effect of noise can be reduced.

While the preferred embodiments of the present invention have been described using specific terms, such description is for illustrative purposes only, and it is to be understood that changes and variations may be further made without departing from the spirit or scope of the appended claims.

What is claimed is:
1. A receiving apparatus, comprising:
 a receiver which receives a plurality of multicarrier signals corresponding respectively to a plurality of antennas wherein a pilot signal is assigned to at least one subcarrier in the multicarrier signals;
 a derivation unit which derives amounts of phase rotation for the plurality of multicarrier signals received in said receiver, respectively:
 a rotation unit which rotates a phase of weight vectors to be multiplied by the plurality of multicarrier signals received in said receiver, by the amounts of phase rotation derived in said derivation unit; and a combining unit which weights respectively the plurality of multicarrier signals received in said receiver, with the weight vectors rotated by said rotation unit and which combines results of weighting, wherein said combining unit determines the combined results, said derivation unit including:

means for executing remodulation based on the results determined by said combining unit and a channel characteristic and deriving a first phase difference between the plurality of multicarrier signals received in said receiver and a result of the remodulation;

means for executing remodulation based on a value of the pilot signal and the channel characteristic and deriving a second phase difference between the plurality of multicarrier signals received in said receiver and a result of the remodulation; and means for deriving an amount of phase rotation based on the first phase difference and the second phase difference.

2. A receiving apparatus according to claim 1, wherein the multicarrier signal received by said receiver is formed of a plurality of streams, wherein said derivation unit derives a common phase rotation amount over the streams, wherein the weight vectors to be rotated in said rotation unit correspond respectively to the plurality of streams, wherein said combining unit performs weighting, combining and decision on the plurality of streams, respectively.

3. A receiving apparatus according to claim 1, wherein said derivation unit derives the first phase difference for each subcarrier, and derives the second phase difference by expanding a phase difference in a subcarrier to which the pilot signal is assigned, to a plurality of subcarriers.

4. A receiving apparatus according to claim 1, wherein said derivation unit derives the phase rotation amount, based on the second phase difference derived in a predetermined symbol and the first phase difference derived in a symbol before the symbol from which the second phase difference has been derived.

5. A radio apparatus, comprising:

a plurality of antennas a receiver which receives a plurality of multicarrier signals corresponding respectively to a plurality of antennas wherein a pilot signal is assigned to at least one subcarrier in the multicarrier signals;

a derivation unit which derives amounts of phase rotation for the plurality of multicarrier signals received in said receiver, respectively;

a rotation unit which rotates a phase of weight vectors to be multiplied by the plurality of multicarrier signals received in said receiver, by the amounts of phase rotation derived in said derivation unit; and a combining unit which weights respectively the plurality of multicarrier signals received in said receiver, with the weight vectors rotated by said rotation unit and which combines results of weighting, wherein said combining unit determines the combined results, said derivation unit including:

means for executing remodulation based on the results determined by said combining unit and a channel characteristic and deriving a first phase difference between the plurality of multicarrier signals received in said receiver and a result of the remodulation;

means for executing remodulation based on a value of the pilot signal and the channel characteristic and deriving a second phase difference between the plurality of multicarrier signals received in said receiver and a result of the remodulation; and means for deriving an amount of phase rotation based on the first phase difference and the second phase difference.

6. A receiving method, comprising:

receiving a plurality of multicarrier signals corresponding respectively to a plurality of antennas wherein a pilot signal is assigned to at least one subcarrier in the multicarrier signals;

deriving amounts of phase rotation for the received plurality of multicarrier signals, respectively;

rotating a phase of weight vectors to be multiplied by the received plurality of multicarrier signals, by the amounts of phase rotation derived in said deriving; and weighting respectively the received plurality of multicarrier signals with the weight vectors rotated by said rotating and combining results of weighting, wherein said combining determines the combined results, said deriving including:

executing remodulation based on the determined results and a channel characteristic and deriving a first phase difference between the received plurality of multicarrier and a result of the remodulation;

executing remodulation based on a value of the pilot signal and the channel characteristic and deriving a second phase difference between the received plurality of multicarrier signals and a result of the remodulation; and deriving an amount of phase rotation based on the first phase difference and the second phase difference.

7. A receiving apparatus, comprising:

a receiver which receives signals corresponding respectively to a plurality of antennas;

a derivation unit which derives, per antenna, amounts of phase rotation for the signals received in said receiver;

a rotation unit which rotates the phase of a weight vector according to the phase rotation amounts by associating, per antenna, the phase rotation amounts derived by said derivation unit per antenna with a per-subcarrier weight vector which is to be multiplied by the signals received in said receiver and which is formed by components corresponding respectively to the plurality of antennas; and a combining unit which weights per antenna the signals received in said receiver with the weight vector which has been phase-rotated by said rotation unit and which combines results of weighting, wherein said combining unit determines a combined result, and wherein said derivation unit executes remodulation per antenna based on the result determined by said combining unit and a channel characteristic per antenna, and derives per antenna the phase rotation amount by deriving per antenna a phase difference between the signals received in said receiver and a result of the remodulation.

8. A receiving apparatus, comprising:

a receiver which receives multicarrier signals corresponding respectively to a plurality of antennas:

a derivation unit which derives, per antenna, amounts of phase rotation for the multicarrier signals received in said receiver;

a rotation unit which rotates the phase of a weight vector per subcarrier according to the phase rotation amounts by associating, per antenna, the phase rotation amounts derived by said derivation unit per antenna with a per-subcarrier weight vector which is to be multiplied by the multicarrier signals received in said receiver and which is formed by components corresponding respectively to the plurality of antennas; and a combining unit which weights per antenna and per subcarrier the multicarrier signals received in said receiver with the weight vector which has been phase-rotated by said rotation unit per subcarrier and which combines results of weighting per subcarrier, wherein said combining unit determines a combined result per subcarrier, and wherein said derivation unit executes remodulation per antenna by associating, per subcarrier, the result determined per subcarrier by said combining unit and a channel characteristic per antenna and per subcarrier, and derives per antenna the phase rotation amount by deriving per antenna a phase difference between the multicarrier signals received in said receiver and a result of the remodulation.

9. A receiving apparatus according to claim 8, wherein the multicarrier signal received in said receiver is formed by a plurality of streams, wherein the weight vector which is to be phase-rotated in said rotation unit per subcarrier is formed by components corresponding respectively to the plurality of streams, wherein said combining unit performs the weighting per antenna, per subcarrier and per stream and makes a decision per subcarrier and per stream, and wherein said derivation unit executes remodulation according to the number of streams, and derives the phase rotation amounts for the multicarrier signals per antenna, regardless of the number of streams.

10. A receiving apparatus, comprising:
a receiver which receives signals corresponding respectively to a plurality of antennas;
a derivation unit which derives, per antenna, amounts of phase rotation for the signals received in said receiver;
a rotation unit which rotates the phase of the signals according to the phase rotation amounts by associating, per antenna, the phase rotation amounts derived by said derivation unit per antenna with the signals received in said receiver; and
a combining unit which weights per antenna the signals which have been phase-rotated by said rotation unit with a weight vector formed by components corresponding respectively to the plurality of antennas and which combines results of weighting,
wherein said combining unit determines a combined result, and
wherein said derivation unit executes remodulation per antenna based on the result determined by said combining unit and a channel characteristic per antenna, and derives per antenna the phase rotation amount by deriving per antenna a phase difference between the signals received in said receiver and a result of the remodulation.

11. A receiving apparatus according to claim 7, said derivation unit including:
means for classifying one of the rotation amounts per antenna as a reference amount and classifying the remaining rotation amounts as amounts to be processed; and
means for outputting an error between the amount to be processed and the reference amount as a per-antenna phase rotation amount,
wherein said rotation unit rotates the phase of an antenna which has been classified, as the amount to be processed, by said derivation unit.

12. A radio apparatus, comprising:
a plurality of antennas;
a receiver which receives signals corresponding respectively to the plurality of antennas;
a derivation unit which derives, per antenna, amounts of phase rotation for the signals received in said receiver;
a rotation unit which rotates the phase of a weight vector per subcarrier according to the phase rotation amounts by associating, per antenna, the phase rotation amounts derived by said derivation unit per antenna with a weight vector which is to be multiplied by the signals received in said receiver and which is formed by components corresponding respectively to the plurality of antennas; and
a combining unit which weights per antenna the signals received in said receiver with the weight vector which has been phase-rotated by said rotation unit and which combines results of weighting,
wherein said combining unit determines a combined result, and
wherein said derivation unit executes remodulation per antenna based on the result determined by said combining unit and a channel characteristic per antenna, and derives per antenna the phase rotation amount by deriving per antenna a phase difference between the signals received in said receiver and a result of the remodulation.

13. A receiving method, comprising:
receiving signals corresponding respectively to a plurality of antennas;
deriving, per antenna, amounts of phase rotation for the received signals;
rotating the phase of a weight vector per subcarrier according to the phase rotation amounts by associating, per antenna, the phase rotation amounts derived per antenna with a weight vector which is to be multiplied by the received signals and which is formed by components corresponding respectively to the plurality of antennas; and
weighting per antenna the received signals with the weight vector which has been phase-rotated in said rotating and combining results of weighting,
wherein said combining determines a combined result, and
wherein said deriving executes remodulation per antenna based on the determined result and a channel characteristic per antenna, and derives per antenna the phase rotation amount by deriving per antenna a phase difference between the received signals received and a result of the remodulation.

* * * * *